United States Patent [19]

Wu

[11] Patent Number: 4,670,366
[45] Date of Patent: * Jun. 2, 1987

[54] HIGH ENERGY BEAM SENSITIVE GLASSES

[75] Inventor: Che-Kuang Wu, Riverside, Calif.

[73] Assignee: Canyon Materials Research & Engineering, Riverside, Calif.

[ * ] Notice: The portion of the term of this patent subsequent to Jan. 28, 2003 has been disclaimed.

[21] Appl. No.: 619,809

[22] Filed: Jun. 12, 1984

Related U.S. Application Data

[63] Continuation-in-part of Ser. No. 507,681, Jun. 24, 1983, Pat. No. 4,567,104.

[51] Int. Cl.$^4$ .......................... G03C 1/02; G03C 1/49; G03C 1/04
[52] U.S. Cl. ......................................... 430/13; 430/19; 430/323; 430/346; 430/567; 430/616; 430/617; 65/30.11; 501/13
[58] Field of Search .................. 430/19, 346, 616, 617, 430/567, 13, 323; 65/30.11; 501/13; 346/135.1

[56] References Cited

U.S. PATENT DOCUMENTS

| | | | |
|---|---|---|---|
| 1,669,908 | 5/1928 | Long . | |
| 2,245,783 | 6/1941 | Hyde | 8/8 |
| 2,494,591 | 1/1950 | Nordberg | 106/50 |
| 2,554,952 | 5/1951 | Mockrin et al. | 106/52 |
| 2,566,134 | 8/1951 | Mockrin et al. | 106/52 |
| 2,604,410 | 7/1952 | Bryant | 106/48 |
| 2,683,666 | 7/1954 | Duncan et al. | 106/52 |
| 2,701,215 | 2/1955 | Kroeck | 117/65 |
| 2,799,590 | 7/1957 | Armistead | 106/53 |
| 2,913,345 | 11/1959 | Duncan | 106/52 |
| 2,920,971 | 1/1960 | Stockey | 106/39 |
| 2,943,059 | 6/1960 | Beck et al. | 252/179 |
| 3,001,880 | 9/1961 | Raskin | 106/50 |

(List continued on next page.)

FOREIGN PATENT DOCUMENTS 0074157  4/1982  European Pat. Off. .

OTHER PUBLICATIONS

Reprint from Journal of Non-Crystalline Solids, vol. 41, No. 3, Dec. 1980, pp. 381-398, "Stable Silicate Glasses Containing up to 10 Weight Percent of Water", Che-Kuang Wu.

Reprint from Journal of The American Ceramic Society, 63[7-8], 453-457 (1980), "Nature of Incorporated Water in Hydrated Silicate Glasses", Che-Kuang Wu.

Reprint from Chemical Abstracts, vol. 94, No. 20, May 1981, p. 281, abstract 161254s, Columbus, Ohio, US; P. Balta et al.: "Crystallized photosensitive glass properties".

Primary Examiner—Richard L. Schilling
Attorney, Agent, or Firm—Christie, Parker & Hale

[57] ABSTRACT

The invention relates to high energy beam-sensitive glass articles exhibiting insensitivity and/or inertness to actinic radiation, i.e., glass articles which are darkened and/or colored within a thin surface layer of, e.g., about 0.1-3 μm upon exposure to a high energy beam, electron beam, and ion beams in particular, without a subsequent development step, and which need no fixing to stabilize the colored image, since both the recorded image and the glass article are sensitive to radiation in the spectral range of uv and longer wavelengths. More particularly, the instant invention is concerned with Ag$^+$ ion-exchanged glass articles having base glass within alkali metal silicate composition fields containing at least one of the oxides of transition metals which have one to four d-electrons in an atomic state. Whereas the base glass composition can be varied widely, spontaneous reduction as well as photo-reduction of Ag$^+$ ions are inhibited and/or eliminated due to the presence of said transition metal oxides in the -lass article. The product of the invention is suitable for use as recording and archival storage medium and as phototools. The recorded images and/or masking patterns are up-datable, can be any single color seen in the visible spectrum, and is erasable by heat at temperatures above about 200° C.

126 Claims, 10 Drawing Figures

U.S. PATENT DOCUMENTS
(See top sheet.)

| Patent No. | Date | Inventor | Class |
|---|---|---|---|
| 3,007,806 | 11/1961 | Hartwig | 106/50 |
| 3,022,182 | 2/1962 | Cleek et al. | 106/52 |
| 3,077,414 | 2/1963 | Wiker | 106/52 |
| 3,397,076 | 8/1968 | Little et al. | 117/70 |
| 3,419,370 | 12/1968 | Cramer et al. | 161/1 |
| 3,504,819 | 2/1970 | Veres | 220/2.1 |
| 3,528,847 | 9/1970 | Grego et al. | 117/124 |
| 3,558,528 | 1/1971 | Buck et al. | 252/520 |
| 3,589,918 | 6/1971 | Jahn | 106/53 |
| 3,656,923 | 4/1972 | Garfinkel et al. | 65/30.11 |
| 3,677,960 | 7/1972 | Ishiyama | 252/301.4 F |
| 3,704,467 | 11/1972 | Frock | 346/1 |
| 3,713,819 | 1/1973 | Hagenbach et al. | 106/53 |
| 3,840,379 | 10/1974 | Wolf | 106/50 |
| 3,861,926 | 1/1975 | Iriam et al. | 106/50 |
| 3,873,328 | 3/1975 | Brueggemann et al. | 106/39.6 |
| 3,873,408 | 3/1975 | Hensler | 161/165 |
| 3,887,348 | 6/1975 | Plumat et al. | 65/30 |
| 3,888,648 | 6/1975 | West et al. | 65/30 |
| 3,904,425 | 9/1975 | Young et al. | 106/52 |
| 3,944,697 | 3/1976 | Ichimura et al. | 428/210 |
| 4,002,482 | 1/1977 | Coenen | 106/40 V |
| 4,026,715 | 5/1977 | Erickson et al. | 106/50 |
| 4,036,623 | 7/1977 | Deeg et al. | 65/30 E |
| 4,057,408 | 11/1977 | Pierson et al. | 65/30.11 |
| 4,086,073 | 4/1978 | Loukes | 65/30 E |
| 4,102,665 | 7/1978 | Plumat et al. | 65/30 E |
| 4,106,946 | 8/1978 | Ritze | 106/52 |
| 4,160,654 | 7/1979 | Bartholomew | 65/30.11 |
| 4,179,300 | 12/1979 | Sagara | 106/47 Q |
| 4,190,451 | 2/1980 | Hares et al. | 106/47 Q |
| 4,191,547 | 3/1980 | Wu | 65/30 R |
| 4,192,689 | 3/1980 | Rinehart | 106/52 |
| 4,290,794 | 9/1981 | Wedding | 65/30 |
| 4,297,417 | 10/1981 | Wu | 430/19 |
| 4,311,504 | 1/1982 | Nigrin | 65/32 |
| 4,405,672 | 9/1983 | Araujo et al. | 528/68 |

HIGH ENERGY BEAM SENSITIVE GLASSES

This is a continuation-in-part application of pending U.S. patent application Ser. No. 507,681, filed June 24, 1983, now U.S. Pat. No. 4,567,104, on HIGH ENERGY BEAM COLORED GLASSES EXHIBITING INSENSITIVITY TO ACTINIC RADIATION by Che-Kuang Wu which is incorporated herein by this reference.

BACKGROUND OF THE INVENTION

In many applications in the field of recording and archival storage medium, e.g., direct-read-after-write archival storage medium for recording high density data and high quality images in particular, a recording life time for data substantially longer than ten years is desirable. It is also desirable to produce phototools, such as photomasks and reticles, that are substantially more durable than chrome-phototools.

These objectives may be achieved by having the recorded image and/or the masking pattern and/or the information bearing layer present within (that is, not coated on) the glass substrate of the recording medium. Such a recording medium would improve the durability of the phototool and the recorded image and eliminate the need of thin film coatings, such as the chromium film on photomasks and ablative thin film materials, e.g. Tellurium film on optical disks.

There are many types of glasses in which optical images can be produced within the glass, such as the glasses of the following patents:

U.S. Pat. No. 4,017,318 discloses photosensitive colored glasses which are sodium halide-silver halide containing photosensitive glasses based on sodium silicate. The photosensitive colored glasses contain a significant amount of fluoride, 1–4% by weight, and a second halide, usually about 1% by weight of Br. On cooling from melts, the glasses become supersaturated with NaF. They also contain 0.0005–0.1% by weight of Ag as sensitizer and colorant, 0.01–0.2% $CeO_2$ as optical sensitizer, about 1% $Sb_2O_3$ and/or up to about 0.1% SnO as thermal sensitizer and redox agent.

Through a unique sequence of ultraviolet exposures and heat treatments, a full spectrum of visible colors can be developed in a photosensitive colored glass of U.S. Pat. No. 4,017,318. While the intensity of colors depends on the exposure dosage of a second uv exposure, the hue is primarily a function of the first uv exposure dose. Thus, optical transmission curves for a fully developed glass show a progressive series of absorption bands moving from the infrared across the visible spectrum as a function of the increasing dosage of first ultraviolet exposures. These photosensitive colored glasses are often yellow colored in the regions/areas which are not exposed to ultraviolet radiation, after a sequence of heat treatments. In order to prevent the spontaneous yellow background coloration, the silver concentration in the photosensitive colored glass melts of U.S. Pat. No. 4,017,318 is kept below 0.025% by weight. As a result, the required thickness of the image bearing glass layer is at least about 100 micrometers to secure an optical density of unity. Thus these glasses are not suitable for use as a recording medium to store data having bit sizes of less than about 10 micrometers or as photomasks to print IC patterns having minimum geometries of less than about 10 micrometers.

U.S. Pat. No. 2,515,936 discloses silver-photosensitive glasses which are exposed to short wave radiation, such as ultraviolet (310 nm). The irradiated areas of the glass are capable of heat developed coloration while non-irradiated areas remain substantially unchanged on heating. The heat developed image is permanent and is yellow to amber in color due to an absorption band centered at about 420 nm. The glass batches on the weight percent basis contain about 75% $SiO_2$, 15% alkali metal oxide and 10% divalent metal oxide, 0.05 to 0.3% silver computed as AgCl, and up to 0.05% $CeO_2$. $CeO_2$ is stated to act as a photosensitizing agent. Although up to 0.3% of silver can be retained in the glass melt, the thickness of the silver-photosensitive glass, required to secure 1 unit of optical density at 420 nm, is not less than that of the photosensitive colored glasses of U.S. Pat. No. 4,017,318. Apparently a smaller fraction of silver ions in the silver-photosensitive glass of U.S. Pat. No. 2,515,936 is reduced and precipitated out as colloidal silver metal particles in glass as a result of a radiation step followed by a heat treatment.

U.S. Pat. No. 2,732,298 discloses a method of producing a permanent two dimensional photographic image within the surface of a silicate glass containing an alkali metal oxide. The method consists of first forming on the surface of a silicate glass by conventional procedures a chemically fixed photographic image. The glass, together with the image, is then heated either in air alone or with an additional oxidizing agent present at a temperature between about 125° C. below the strain point of the glass and just below its softening point for a time sufficient to oxidize and ionize the silver and to cause the migration of silver ions into the glass in exchange for alkali metal ions therein. A visible image which is usually of a yellowish to brownish color is produced due to the spontaneous reduction of a portion of the silver ions in the glass to metallic particles. If desired, a more complete reduction of silver ions and intensification of the color to dark amber or brown can be accomplished by subsequently heating the glass in a reducing atmosphere containing a reducing gas such as hydrogen, carbon monoxide or methane. Due to the lateral or sideway diffusion of the photographic silver image, the minimum geometry and/or line width reproducible in glass according to this method is in general greater than about 20 micrometers.

A modification of the method of U.S. Pat. No. 2,732,298 is found in U.S. Pat. No. 4,286,052 wherein the photographic silver image is driven into a glass article by electrical means.

Besides being not suitable for recording optical images or information with bit sizes or minimum geometries of less than a couple of micrometers, images in the three types of glasses cited above are developed through at least a heat treatment step, there is thus no direct-read-after-write capability.

Applicant's U.S. Pat. Nos. 4,191,547 and 4,296,479 are directed to alterable photosensitive glasses, that is, photosensitive colored glasses exhibiting alterable photo-anisotropic effects. These glasses may be employed as erasable recording media having limited read applications. The alterable photosensitive glasses comprise a body portion and a photosensitive surface layer exhibiting alterable photo-anisotropic effects. The surface layer, having photosensitive and photo-anisotropic Ag-AgCl-containing crystals therein, is prepared by subjecting a glass article having base glass compositions within the $Na_2O$ and/or $K_2O$-ZnO-$Al_2O_3$-$SiO_2$-Cl field to an ion-exchange reaction in a silver containing aqueous solution, and subsequently exposing the glass article to radiation within the spectral ranges of uv and blue light. Write and erasure are done with polarized red light, and are based on the phenomena of photo-polarization and optical bleaching.

The alterable photosensitive glasses of U.S. Pat. Nos. 4,191,547 and 4,296,479 are not suitable for use as a permanent recording medium and/or as a phototool because there is no method and/or mechanism for fixing recorded images. The recorded image, as well as the alterable photo-anisotropic surface layer, are unstable in the presence of radiation in the uv, blue light and longer wavelength range, and are particularly sensitive to polarized red light. The required thickness of the image-/information bearing layer of the alterable photosensitive glasses to secure an optical density of 2 is at least 30 micrometers.

SUMMARY OF THE INVENTION

The high energy beam-sensitive glass article ("HEBS glass article" herein) of the present invention comprises a body portion and an integral ion-exchanged surface layer ("IIES layer" herein) containing a high concentration of silver ions, which upon exposure to high energy beams becomes darkened and/or colored instantaneously without resorting to heat or other development step. The net optical density of the colored image confined within a thin surface glass layer should exceed 1.2 and is preferably in excess of 1.8 and is most preferably in excess of 3. The colored image should be confined within a surface glass layer of less than about 3 micrometers. The high energy beams used to expose the HEBS glass article include electron beams, various ion beams, various molecular beams, X-ray and deep ultraviolet of wavelengths less than about 200 or 300 nm.

The HEBS glass articles are highly sensitive to high energy beams, are colorless and totally transparent to actinic radiation before exposure to high energy beams, and not darkened (i.e., not colored) by actinic radiation at intensities within, above and/or below those commonly employed in photolithography and/or in optical retrieval (optical read) applications. Actinic radiation is defined herein as radiations in the wavelength range of ultraviolet and/or longer wavelengths.

It is an objective of the present invention that the colored image produced in the HEBS glass articles upon exposure to the high energy beams is not bleached by the actinic radiation at intensities within, above and/or below those commonly employed in photo-fabrication and/or in optical read out.

It is an objective of the present invention that the image recorded by the high energy beams as well as the unexposed colorless areas of the glass are stable, indefinitely, in all possible ambient thermal, lighting and humidity conditions. For example, there will be no thermal fading of the colored image, no thermal darkening of the unexposed colorless areas, and no degradation of the sensitivity toward high energy beams due to long term storage in ambient conditions.

It is a further objective of the present invention that the required charge density of the high energy beam in a direct writing mode to secure an optical density of more than 2 within the integral surface layer is less than $1 \times 10^{-3}$ coulomb/cm$^2$ and preferably less than $1 \times 10^{-4}$ coulomb/cm$^2$ and most preferably less than about $1 \times 10^{-5}$ coulomb/cm$^2$ when the high energy beam is an electron beam having an accelerating voltage ranging between about 10-100 kv. The terminology "electron-beam" is herein denoted as E-beam.

A direct writing mode is herein defined as a mode of recording wherein an image with a high/good contrast is produced by exposure to a high energy beam without any requirement for a subsequent development and/or a contrast enhancement step.

The integral ion-exchanged surface layer, which is darkened and/or colored upon exposure to high energy beams, contains a high concentration of Ag$^+$ ions. The nature of the Ag$^+$ ion in the ion-exchanged surface layer is not fully understood, but it is believed that the surface or integral ion-exchanged layer contains a high concentration of Ag$^+$ ions and/or a large number density of AgCl containing and/or Ag$_2$O containing and-/or Ag$^+$ ion containing microcrystals and/or microphases, and also contains silanol groups and/or water in the concentration range between about 0.01–12% by weight H$_2$O.

The concentration of silanol groups and water in the IIES layer are measured as the percentage, by weight, of H$_2$O loss from the IIES layer when the glasses are heated at an elevated temperature, such as 800° C., to constant weight.

One method of making the HEBS glass articles consists of the following:

(a) melting a batch for a base glass composition useful for preparing a HEBS glass article comprising in mole percent on the oxide basis, of about 3–25% total of Li$_2$O+Na$_2$O+K$_2$O+Cs$_2$O+Rb$_2$O, 0–6% Cl, 0.5–35% total of at least one oxide selected from the oxides of transition metals which have one to four d-electrons in an atomic state, up to 35% total concentration of ZnO+MgO+CaO+SrO+PbO+Al$_2$O$_3$, up to 20% BaO, up to 25% P$_2$O$_5$, up to 25% B$_2$O$_3$, up to 4% F, up to 2% Br, up to 2% I and 20–93% SiO$_2$;

(b) forming said base glass melt into a glass article, such as a glass sheet or plate;

(c) contacting the surface of the glass article with a Ag$^+$ ion-containing material, such as an aqueous solution containing Ag$^+$ ions;

(d) heating the glass article together with the Ag$^+$ ion-containing material in contact therewith to a temperature sufficient to effect ion-exchange reactions and form an integral ion-exchange surface layer on the body portion of the glass article which has not undergone ion-exchange reactions. The resulting product, a HEBS glass article, comprises an integral ion-exchanged surface layer and anhydrous base or body portion. It is believed that the ion-exchange reactions result in the formation of AgCl-containing and/or Ag$_2$O-containing and/or Ag$^+$ ion-containing microcrystals and/or microphases within an ion-exchanged surface layer of the glass article. The ion-exchange reactions include an exchange of Ag$^+$ for the alkali metal ions in at least the surface of the glass article. Hydration and/or an exchange of H$^+$ ions for alkali metal ions in glass may also take place to various extents depending primarily on the ingredients of the aqueous ion-exchange solution, temperature of the ion-exchange reaction and the base glass composition. The reactions are allowed to proceed at least 0.1 micrometer, in thickness dimension, into the surface of said glass article. The concentrations of alkali metal ions in the ion-exchanged surface layer decrease with an increase in the concentration of Ag$^+$ ions in the layer; and (e) cooling the glass article to room temperature either in contact or out of contact with the Ag+ ion-containing material.

The inventive method, because of the unique combinations of the glass compositions and the composition and conditions of the ion-exchange reactions, effectively suppresses and/or eliminates within the integral ion-exchanged surface layer, photo-reduction of the microcrystals and/or microphases as well as the spontaneous reduction of Ag+ ions upon being exchanged into glass.

The E-beam darkened images within the integral ion-exchanged surface layer of the HEBS glass article can be erased by heat at temperatures substantially below the softening point of the integral ion-exchanged surface layer and/or below the strain point of the body portion of the HEBS glass article. The sensitivity of the HEBS glass article to electron beam is unchanged by the heat erasure treatment.

Latent images and/or latent patterns, delineated or recorded on the HEBS glass article by electron beams, which have little or no detectable optical density, can be developed into surface relief images and/or relief patterns of very high quality through selective etching means. The minimum charge density of the electron beam to produce surface relief images can be a factor of more than 100 times lower than that required to produce colored images of high/good contrast in a direct E-beam writing mode.

The HEBS glass articles are useful as high energy beam recording media for permanent storage of images or data having a full range of gray scales. Analog as well as digital recording are done in a direct writing mode. Optical images with feature sizes down to below 1 micrometer can be recorded with an electron beam within a CRT or scanning electron beam system or parallel exposure system, such as a 1:1 photo cathode projection system or a demagnifying electron image projection system.

Electron beam lithography machines and replication techniques were reviewed by G. Brewer, et al. in the book, "Electron-Beam Technology in Microelectronic Fabrication," 1980, Academic Press, New York. Scanning electron beam systems utilizing a shaped probe concept have recently been described by E. V. Weber in *Optical Engineering*, 1983, Vol. 22, No. 2, pages 190-194.

Optical software disks, and the like, as well as digital audio disks, digital video disks and ultra high density microfilm of superior durability and permanence can be mass produced from the HEBS glass articles in a direct E-beam writing mode with one of the various types of electron-beam systems. The permanent image, information and/or data recorded on the HEBS glass article can be optically read in a transmission mode with a semiconductor laser, a He-Ne laser or any light source within the spectral ranges of near-infrared, visible and near-uv. Such optical software disks/plates/slides may be employed to load programs into various micro- and mini-computers as well as supply a recording medium to serve the market for personal computers, video games, office systems, data distribution systems and other information systems. Such recording media may also be employed to record financial transactions.

Digital data can be recorded in and on the HEBS glass article in the form of surface relief through exposures of the glass article to electron beams and a subsequent surface-relief-development in HF solution. A reflective coating deposited thereafter on the surface relief renders the recorded data optically retrievable in a reflection mode.

The HEBS glass article is suitable for use as a photomask blank. Utilizing the article as a photomask blank, phototools, including photomasks, 1×/5×/10× step-and-repeat-reticles, and reticles for optical instruments are prepared by writing or recording masking patterns with a high energy beam in a direct writing mode. Permanent masking patterns having a net optical density in excess of 2 can be obtained instantaneously without resorting to any subsequent development or etching process. Immediately after the high energy beam pattern generation, IC device patterns in a photomask may be printed on any photoresist coated or photosensitive surface through many of the various photolithographic techniques, e.g., step and repeat camera, contact printing and/or projection printing. Photomask blanks of the present invention will contribute to the needs of phototools and photofabrication particularly in the fields of microelectronics. Photomask blanks of the present invention have the following advantages over the conventional chrome photomask blanks:

1. Reduction in time and cost for mask making. Many, if not all, processing steps in traditional photomask making, such as developing resist, pre-baking and post-baking resist, etching the chrome and stripping the resist are totally eliminated.

2. Elimination of undesirable features of the traditional photomask making, including swelling of resist, limited process latitude, scum left from resist development, and line distortion and rough edges due to development and etching.

3. Longer mask life and high wafer yield. The photomask blanks of the present invention are monolithic, namely, the information bearing surface is an integral part of, not coated on the surface of, a glass substrate. The photomask of the present invention is highly durable and wear-resistant. There will be no problem of pattern missing due to repeated cleaning and/or washing because the pattern is in the glass substate rather than on the surface of the glass.

4. Elimination of pin-holes in the photomask. The numerous mechanisms of pin-hole formation in the traditional photomask processing steps are eliminated. Moreover, other defects, such as unetched chrome and under cuts which are inherently associated with the coated masking layer and photoresist, are eliminated.

5. The photomask of the present invention is easily cleaned and can be washed repeatedly without generating defects. Consequently, the need and the cost for reinspections are minimized.

6. White light is a safe light for the photomasks and photomask blanks of the present invention; allowing inspection of the mask and the mask-blank with intense white light before, during and after the IC pattern is generated.

7. Allows add-on and correction of device patterns.

8. Reduction of reflectivity to, or near, zero reflectivity on the front as well as on the back side of the masking layer.

9. Allows see-through, e.g., red images for ease of alignment.

The body portion of the HEBS glass article has a base glass composition comprising, in mole percent, 5-25% of one or more alkali metal oxides, 0.5-35% of photosensitivity inhibitors (PI agents), RS-Suppression agents (RSS agents) and mixtures thereof, 0-6% Cl, and 50–89% $SiO_2$. The IIES layer is an ion-exchanged glass of the base glass composition of the body portion. The base glass composition is ion exchanged with an acidic aqueous solution containing soluble ionic silver to substitute silver ion for the alkali metal ions in said IIES layer and leach alkali metal ions out of said IIES layer. Said ion-exchanged glass composition comprising silver ions and/or silver salts, and silanol and/or water in a concentration greater than about 0.01% by weight percent $H_2O$, the concentration of the alkali metal oxides in the ion-exchanged glass of the IIES layer being less than in said glass composition of the body portion. The ion-exchange reaction changes the chemical composition of the glass composition of the body portion to produce the IIES layer. The glass composition of the IIES layer comprises silanol, water and combinations thereof in a concentration of between about 0.01 and 12 weight percent $H_2O$, and, in mole percent, 0–24% of one or more alkali metal oxides, 0.5–35% of PI agents, RSS agents or combinations thereof, 0–6% Cl, 50–89% $SiO_2$, and 0.1–25% $Ag_2O$.

For the base glass compositions containing Cl, it is believed that at least a portion of the silver ions in the IIES layer are in microcrystals and/or microphases of AgCl in said IIES layer. The AgCl containing microcrystals and/or microphases also contain at least trace amounts of alkali metal ions, and/or PI agents, and/or RSS agents. Preferably, the average grain size of the microcrystals and microphases in the IIES layer are less than 0.1 micrometer. Even more preferably, the average grain size of the microcrystals and microphases in the IIES layer are less than 0.03 micrometer in diameter. In the most preferred embodiment, at least a portion of said microcrystals and microphases in the IIES layer have grain size of less than about 80 angstroms.

The PI agents and RSS agents are selected from one or more of the oxides of transition metals having 1 to 4 d-electrons in the atomic state.

In general, a portion of the silver ion in the IIES layer is present as glass-network-modifiers and a portion is associated with halides. In an especially preferred embodiment, the portion of silver ions present as glass-network-modifiers in said IIES layer are present in amounts up to 18% $Ag_2O$ on the mole percent oxide basis, and the portion of silver ions directly associated with halides in said IIES layer are present in amounts up to 6% $Ag_2O$ on the mole percent oxide basis. In another preferred embodiment, the silanol groups and/or water in said integral surface layer ranges between about 0.1–6% by weight $H_2O$.

In an alternative embodiment of the present invention, the base glass composition, that is the glass composition of the body portion, can be fully ion exchanged through its entire thickness or depth to produce a HEBS glass article that consists of an IIES layer alone without a body portion. A thin sheet or film of the anhydrous base glass can be conveniently ion exchanged to produce such a HEBS glass article. For mechanical durability, such thin sheet or film of glass can be affixed to a support, such as a glass, quartz or plastic sheet or plate, by means well known in the glass art.

Preferably the base glass consists essentially of, in mole percent on the oxide basis, of about 3–25% total of $Li_2O+Na_2O+K_2O+Cs_2O+Rb_2O$, up to 6% Cl, 0.5–35% total concentration of photosensitivity inhibitors (PI agents) and RS-suppression agents (RSS agents), up to 35% total concentration of acid durability-and-glass-network-strengtheners, up to 20% BaO, up to 25% $PO_2O_5$, up to 25% $B_2O_3$, up to 4% F, up to 2Br, up to 2% I and 20–93% $SiO_2$; whereas the photosensitivity inhibitors are necessary constituents of chloride-containing glasses, the RS-suppressant agents are necessary constituents of chloride-free glasses, the photosensitivity inhibitors as well as the RS-suppressant agents are usually included in halide-containing glasses. The integral ion-exchanged surface layer having $Ag^+$ ions therein and/or a large number of AgCl-containing and/or $Ag_2O$-containing and/or $Ag^+$ ion-containing microcrystals and/or microphases, containing silanol groups and/or water in the concentration range of between about 0.01–12% by weight $H_2O$, the concentrations of alkali metal ions in said integral ion-exchanged surface layer being less with an increase in the concentration of $Ag^+$ ions, said integral ion-exchanged surface layer containing total or at least part of the contents of each of the photosensitivity-inhibitors, the RS-suppressant agents, the glass network formers and chloride of said body portion. Said microcrystals and/or microphases may also contain at least trace amounts of alkali metal ions, and/or photosensitivity inhibitors, and/or RS-suppresant agents, and/or other ingredients contained in said integral surface layer.

In a more preferred embodiment of the present invention, the base glass consists essentially. in mole percent on the oxide basis, of about 5–25% total of $Li_2O+Na_2O+K_2O+Cs_2O+Rb_2O$, up to 6% Cl, 0.5–35% total concentration of photosensitivity-inhibitors and RS-suppressant agents, up to 20% MgO, up to 20% CaO, up to 20% ZnO, up to 15% $Al_2O_3$, up to 20% PbO, 2–35% total of $ZnO+CaO+MgO+PbO+Al_2O_3$, up to 4% F, up to 2% Br, up to 2% I, and 50–89% $SiO_2$. The preferred alkali metal oxides are $Li_2O$, $Na_2O$ and $K_2O$. Preferably, the base glass will contain at least 1.2% $TiO_2$. The preferred halide is Cl and preferably the composition will contain only the halide Cl.

A more preferred base glass consists essentially. in mole percent on the oxide basis, of about 5–25% total of $Li_2O+Na_2O+K_2O$, up to 6% Cl, 1.2–25% $TiO_2$, 1.2–35% total of $TiO_2+Ta_2O_5+ZrO_2+Nb_2OO_5+La_2O_3+Y_2O_3+WO_3$, 2–20% ZnO, up to 10% $Al_2O_3$, up to 3% total of $F+Br+I$ and 50–89% $SiO_2$. Preferably, said base glass contains at least two of the alkali metal oxides selected from $Li_2O$, $Na_2O$ and $K_2O$, preferably the base glass will contain more than 1% $Li_2O$. In a preferred embodiment of the composition, said base glass has a molar concentration ratio of ($Li_2O+Na_2O$) to $K_2O$ of more than 0.6. In another preferred embodiment, said base glass will have a total content of $Li_2O+Na_2O+K_2O$ of between 10 and 20%, and a Cl content of between about 0.8 and 6%. In another preferred embodiment, said base glass will contain between about 60 and 82% $SiO_2$ and between about 3 and 10% $TiO_2$.

In most Preferred embodiments of the present invention, the base glass consists essentially of, in mole percent on the oxide basis, of about 12–16% total of $Li_2O+Na_2O+K_2O$, 0.8–6% Cl, 3–10% $TiO_2$, 4–10% ZnO, 0.5–5% $Al_2O_3$, and 68–75% $SiO_2$ where the $TiO_2$ functions as a photosensitivity-inhibitor and as a RS-suppressant agent.

The base glass is prepared from glass melts. Preferably the glass melts are prepared in an atmosphere containing at least a partial presure of chlorine and/or chlorides.

Silver is incorporated in the integral ion-exchange surface layer by ion-exchange. Preferably the portion of $Ag^+$ ions are present as glass-network-modifiers in the integral ion-exchange layer in amounts up to 25% $Ag_2O$ on the mole percent oxide basis, and the portion of $Ag^+$ ions directly associated with halides in said integral ion-exchange surface layer ranges up to 6% $Ag_2O$ on the mole percent oxide basis. In one embodiment of the present invention, the ion-exchange integral surface layer contains at least a trace amount of ion-exchange cuprous ions, and/or cupric ions and/or cuprous oxide and/or cupric oxide.

The glass article prepared from the base glass by ion exchange as described herein is insensitive to at least a spectral portion of actinic radiation. Preferably, the glass article is insensitive to actinic radiation of about 400 nm and/or longer wavelengths. More preferably, the glass article will be insensitive to actinic radiation of about 300 nm and/or longer wavelengths.

The glass articles are sensitive to high energy beams. The depth of the colored images delineated and/or replicated by the high energy beam is limited by the thickness of said ion exchange integral surface layer and/or by the penetration depth of the high energy beam. Preferably, the integral ion exchange surface layer (IIES layer) is more than about 0.1 micrometers. More preferably, the IIES layer is less than about 10 micrometers in thickness. Most preferably, the IIES layer is less than about 3 micrometers. The preferred content of the silanol groups and/or water in the integral surface layer ranges between about 0.1-6% by weight $H_2O$.

The ion exchange is carried out in aqueous solution containing $Ag^+$ ions having a concentration ranging from $10^{-4}$ mole per liter up to the concentration of a saturated $AgNO_3$ solution and $H^+$ ions ranging from about $10^{-6}$ to 5 moles/per liter. A preferred ion exchange solution contains about 200 g $AgNO_3$/liter of the aqueous solution and is acidified with about 10–200 cc of 16N $HNO_3$/per liter of the aqueous solution.

Another preferred aqueous ion exchange solution contains about 20 gms $AgNO_3$/per liter of the aqueous solution and is acidified to a pH between about 1 to 6. Preferably, the aqueous ion-exchange solution is a buffered solution having more or less a constant pH throughout the ion exchange reaction. When the pH of the ion exchange aqueous solution is kept at a value of more than about 2, preferably the aqueous solution has a $[Ag^+]{:}[H^+]$ mole ratio of more than 5, and most preferably, the mole ratio of $[Ag^+]{:}8 H^+]$ in the aqueous ion-exchange solution is more than 50. In one preferred embodiment of the present invention, the pH of the aqueous ion-exchange solution is buffered at a constant value ranging between about 2 and 3, and the $Ag^+$ ion concentration of the solution ranges between about 0.01 and 2 moles/per liter of solution. The aqueous ion exchange solution can be buffered due to the presence of $Cu_2O$ and/or $Cu^{++}$ ions in a strong acid-containing solution. Preferably, the aqueous ion-exchange solution also contains $Li^+$ ions up to the concentration of a saturated $LiNO_3$ aqueous solution. Said aqueous ion-exchange solution preferably contains up to saturation of dissolved $SiO_2$ and/or silica gel and/or water soluble silicates and/or other constituent cations of the base glass.

One of the products of the present invention is a high energy beam recording medium exhibiting insensitivity and/or inertness to actinic radiation, colored images delineated and/or replicated therein by said high energy beam are also insensitive and/or inert to the actinic radiation, said recording medium comprises a supported thin film of glass matrix having $Ag^+$ ions therein and/or a large number of AgCl-containing and/or $Ag_2O$-containing and/or $Ag^+$ ion-containing microcrystals and/or microphases therein containing at least one of photosensitivity-inhibitors and/or RS-suppression agents, at least one glass network former, and up to saturation of chloride in the glass matrix, total concentration of glass network modifiers including $Ag^+$, $H^+$ and alkali metal ions ranges between about 3-25% on the mole percent oxide basis, a portion of $Ag^+$ ions being directly associated with halides in said glass matrix, said portion ranges up to 6% $Ag_2O$ on the mole percent oxide basis; whereas the photosensitivity-inhibitors are necessary consituents of chloride-containing glass matrix, and the RS-suppression agents are necessary constituents of chloride-free glass matrix, the photo-sensitivity-inhibitors as well as the RS-suppression agents are usuallly included in halide-containing glass matrix.

DESCRIPTION OF THE INVENTION

Figure 1:
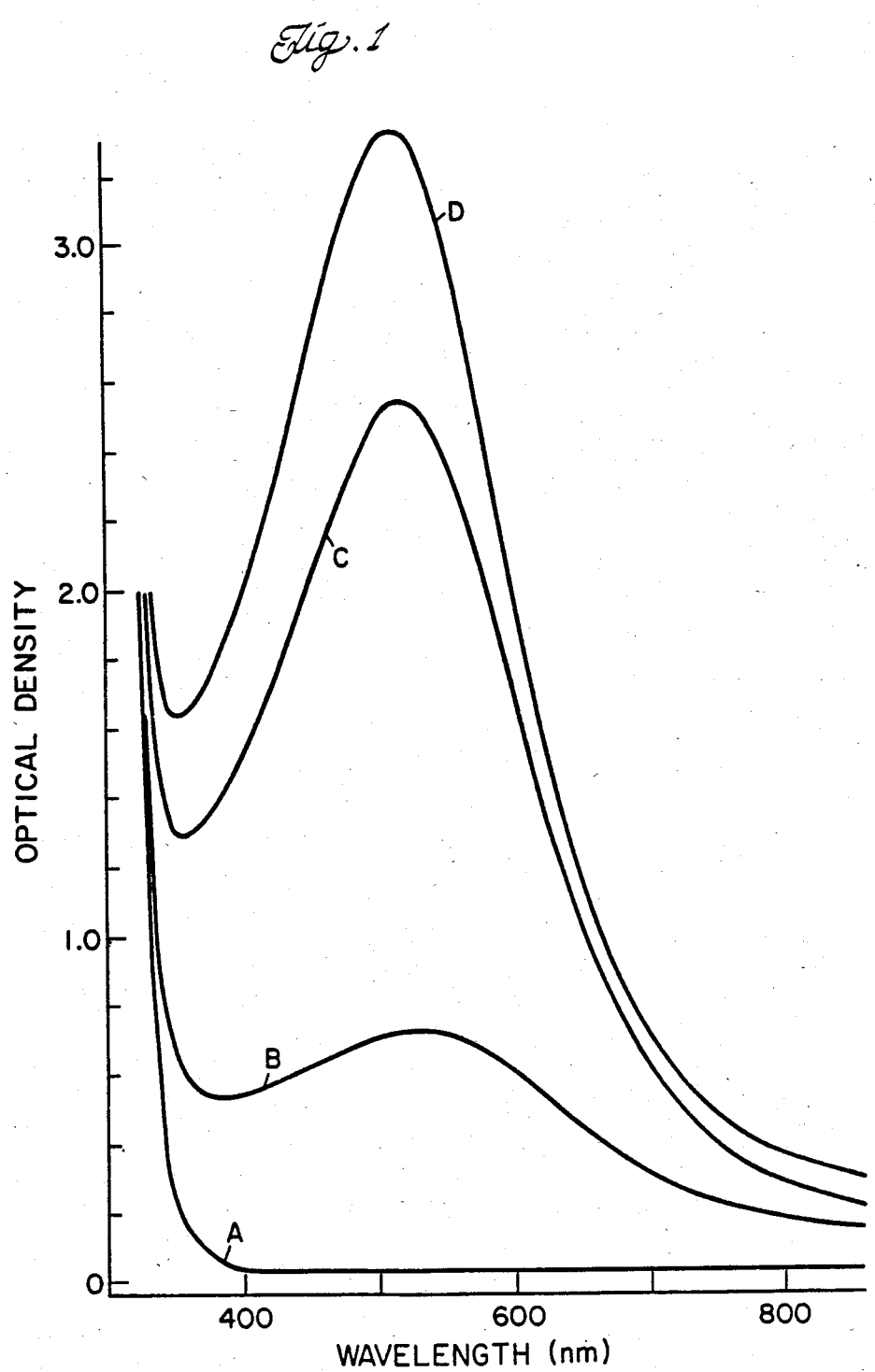
FIG. 1 graphically records the spectral absorption curves of a HEBS glass article plate sample after being exposed to E-beam charge densities of O, $3.2 \times 10^{-5}$, $1.6 \times 10^{-4}$ and $3.2 \times 10^{-4}$ coulomb/cm$^2$ at 35 kv.

A method of preparing the base glass or the parent anhydrous glass composition useful for preparing a HEBS glass article comprises the steps of:

(a) preparing a pre-melt batch for the base glass composition by thoroughly combining and mixing powdered oxides or salts of the alkali metals, PI agents, RSS agents, silicon and halides in appropriate portions to yield a glass composition, following the melt step described below, of the desired composition;

(b) melting the pre-melt batch or mixture to form a glass melt; and (c) cooling the glass melt.

Prior to cooling the glass melt, the glass melt may be formed into a glass article, such as a glass sheet or plate before cooling. Preferably, the glass melt is stirred during the melt to form a uniform glass composition. Oxides and salts are used in the preparation of the premelt batch, such as oxides, halide salts, nitrate salts, carbonate salts, bicarbonate salts, silicate salts and the like of alkali metals, PI agents, and RSS agents.

To obtain the maximum Cl in the base glass, the base glass pre-melt batch is compounded with an excess of Cl salt. During the melting, some Cl will be evaporated off but the resulting melt and cooled glass will be saturated or super saturated with respect to Cl. Cl saturation can be increased by conducting the melt under a partial or complete Cl or chloride atmosphere. In a preferred embodiment, the melting is done in an atmosphere containing at least a partial pressure of chlorine or chlorides.

The surfaces of the glass articles formed from the melt, after cooling and annealing, can be ground and polished to any desired surface figure or to any desired optical quality surface. If the glass article is a glass sheet plate, the major opposing surfaces of the glass sheet can be ground to form a plate or sheet of the desired uniform thickness, and then polished to form smooth, planar surfaces.

Volatilization of halides can be quite high during melting, particularly where temperatures in the upper extreme of the melting range are employed. Thus, halide losses of about 20 to 60% are common. Besides being essential ingredients, halides also are a fining agent for the glass melts.

It will be appreciated that large melts of glass can be made in pots or continuous melting units in accordance with known commerical glass making practice. Where glass of optical quality is to be produced from commercial continuous melting tanks, the melt will be stirred in accordance with conventional practice. Volatilization of halides in such commercial melting practices can be held below 20% and with care, below 10%. Retention of halides can be further increased via melting in halogen-containing atmosphere.

The base glass compositions useful for preparing a HEBS glass article comprises in mole percent, 5-25% of one or more alkali metal oxides, 0.5-35% of one or more photosensitivity inhibitors (PI agents), one or more RS-Suppression agents (RSS agents) or mixtures thereof, 0-6% Cl, and 50-89% $SiO_2$, the composition containing PI agents when the composition contains Cl, and the composition containing RSS agents when the composition is free of Cl. The total quantity of constituents in the base glass composition shall equal 100 mole percent. All mole percents are based on a mole percent oxide basis except for Cl, F, Br and I which are based on a mole percent element basis.

The base glass composition contains, preferably, at least one of the following constituents, in mole percent, 0-about 20% MgO, 0-about 20% CaO, 0-about 20% ZnO, 0-about 15% $Al_2O_3$, 0-about 20% PbO, 0-about 20% BaO, 0-about 25% $P_2O_5$, 0-about 35% $B_2O_3$ and/or 0-about 4% F, Br, I or a mixture thereof. Preferably the total mole percent of ZnO, $Al_2O_3$, CaO, MgO and/or PbO in the base glass is from about 2% to about 35%. Most preferably the base glass will contain ZnO, $Al_2O_3$ or a mixture thereof as an acid-durability-and-glass network strengthener ("ADAGNS" herein).

One of the preferred base glasses of the above composition will include, in mole percent, about 2%-about 20% ZnO, 0-about 10% $Al_2O_3$ and about 1.2-about 25% $TiO_2$. Another preferred base glass includes, in mole percent, about 3%-about 10% $TiO_2$ and about 60%-about 82% $SiO_2$.

The PI agents and RSS agents are selected from the oxides of the transition metals having 1 to 4 d-electrons in the atomic state. Preferred PI agents and RSS agents are $TiO_2$, $Ta_2O_5$, $ZrO_2$, $Nb_2O_5$, $La_2O_3$, $Y_2O_3$, $WO_3$ and a mixture thereof.

The alkali metal oxides are $Li_2O$, $Na_2O$, $K_2O$, $Rb_2O$ and $Cs_2O$. The preferred alkali metal oxides for the base glasses are $Li_2O$, $Na_2O$ and $K_2O$. Preferably the base glass contains at least two of the alkali metal oxides of $Li_2O$, $Na_2O$ and $K_2O$. When the glass contains $Li_2O$, $Na_2O$ and $K_2O$, the molar concentration ratio of $Li_2O$ and $Na_2O$ to $K_2O$ is preferably more than about 0.6. Preferably the glass contains about 10-20%, mole percent, that is, about 10 to about 20 mole percent, $Li_2O$, $Na_2O$, $K_2O$ or a mixture thereof and about 0.2-6%, mole percent, Cl.

Although the constituents of the anhydrous base glass compositions are identified as specific chemical oxides or elements pursuant to the practice of the glass art, it is to be understood that such identification is for convenience in accordance with the practice of the glass art. As those skilled in the glass art recognize, the chemical structure and coordination of all cations in glass are not known with complete certainty at present.

An especially preferred class of base glass composition useful for preparing a HEBS glass article comprise, in mole percent, about 12-18% $Li_2O$, $Na_2O$, $K_2O$ or a mixture thereof, about 3-10% $TiO_2$, 0-about 25% transition metal oxides, about 4-10% ZnO, about 0.5-5% $Al_2O_3$, about 0.4-3% Cl, and about 65-75% $SiO_2$.

The glass composition can include, in mole percent, 0-about 15% MgO, 0-about 15% CaO, 0-about 15% SrO, 0-about 15% BaO, 0-about 15% PbO, 0-about 15% $B_2O_3$ and/or 0-about 3% F, Br, I or a mixture thereof. Preferably the base glass contains at least 1 mole percent $Li_2O$.

A most preferred base glass composition useful for preparing HEBS glass articles comprises, in mole percent, about 13.0-15.5% of a mixture of $Li_2O$, $Na_2O$ and $K_2O$; about 4-5% $TiO_2$; about 6.5-7.5% ZnO; about 1-2% $Al_2O_3$; about 0.7-3% Cl and about 69-72% $SiO_2$. Most preferably, the base glass composition contains an amount of Cl equivalent to the Cl saturation point or value of the melt of the base glass composition.

It has been found that the base glass composition has a profound effect on the properties of the HEBS glass articles (ion-exchanged products) regarding particularly E-beam sensitivity and the insensitivity and/or inertness to actinic radiations, and that addition or subtraction of certain constituents even in small concentrations often alter many or all of the properties of the HEBS glass articles. It has been determined that the production of HEBS glass articles (E-beam sensitive glass articles) exhibiting insensitivity and/or inertness to uv radiation and longer wavelengths, involves a complex combination of relationships among various components of the base glass composition, the ingredients of the ion-exchange solution and the conditions of the ion-exchange reactions. Nevertheless, there exists a very wide range of glass compositions in the general composition fields of alkali metal silicate glasses that are operable for the products of the present invention.

It has been found that the sensitivity to electron beams as well as the insensitivity and/or inertness to actinic radiation of the ion-exchanged products are strongly dependent upon the ingredients of the aqueous ion-exchange solution, in particular, the concentrations of silver ion, hydrogen ion and cuprous oxide.

The HEBS glass articles are prepared from the glass composition useful for preparing a HEBS glass article by treating the glass composition with a silver salt-containing material at a temperature sufficient to effect an ion exchange reaction between the silver ions in the silver salt-containing material and the alkali metal ions in the surface layer of the glass composition to substitute silver ion for the alkali metal ions and diffuse alkali metal ions out of the surface layer. The ion exchange reaction is continued for a period of time sufficient to have the ion-exchange reaction proceed to a depth of at least 0.1 micrometer into the surface of the glass composition to produce a HEBS glass article having a body portion composed of the base glass composition and an integral ion-exchange surface layer composed of an ion-exchanged glass of said glass composition comprising silver ions and/or silver salts, and silanol and/or water in a concentration greater than about 0.01% by weight $H_2O$. The concentration of the alkali metal oxides in the ion-exchange glass of the integral ion-exchange surface layer is less than the concentration of the alkali metal oxides in the glass composition of the body portion.

Hydration and/or an exchange of $H^+$ and/or $H_3O^+$ ions for alkali metal ions in at least the surface of the glass article is expected to take place when the ion exchange reactions are carried out in an aqueous solution containing $Ag^+$ ions.

In cases where other ingredients such as cupric and/or cuprous oxide are included in an aqueous ion exchange solution, additional reactions that exchange the alkali metal ions in the surface layer of the parent silicate glass by the other cations in the aqueous solution are also expected to take place, but to a lesser extent than with $Ag^+$ ion.

The ion-exchange reactions can be carried out as follows. The glass articles are immersed into an aqueous ion-exchange solution containing $Ag^+$ ions and other ingredients, the glass articles together with the aqueous solution are sealed in an autoclave, and heated to a temperature sufficient to effect an ion-exchange reaction between the silver ions in the aqueous solution and the alkali metal ions in the surface layer of the glass, usually above 200° C., and held at the reaction temperatures for a duration of more than about 1 minute. Thereafter, the HEBS glass articles are removed from the autoclave and washed with distilled water.

The concentration of silver ions in the aqueous ion-exchange-solution operable in the present invention is found to range from less than $10^{-3}$ mole/liter up to the concentration of a saturated $AgNO_3$ aqueous solution, and the concentration of hydrogen ion/hydronium ion is operable from $10^{-6}$ to more than 3 moles per liter of the aqueous ion-exchange solution. The optimum concentration silver ions in the aqueous ion-exchange solution, in general, increases with the concentration of hydrogen ion for preparing HEBS glass articles. The hydrogen ions are added to the aqueous ion-exchange solution in the form of one or more acids, such as $HNO_3$, $H_2SO_4$, HCl, $HClO_3$, $HClO_4$, acetic acid, and the like.

The concentration of $Ag^+$ ions in the ion-exchanged surface layer can be varied from practically zero up to more than 50% by weight of $Ag_2O$ through various combinations of the concentrations of $Ag^+$ ions and $H^+$ ions in the aqueous ion-exchange solution. One way to ensure a large concentration of $Ag^+$ ions within an ion-exchanged surface layer is to utilize an aqueous ion-exchange solution having a large concentration of $Ag^+$ ions, e.g., greater than about 100 g $AgNO_3$/liter of the aqueous solution. Another way to ensure a large concentration of $Ag^+$ ions within an ion-exchanged surface layer is to employ an aqueous ion-exchange solution having a large mole ratio of $[Ag^+]:[H^+]$, e.g., in excess of 10 which is readily obtainable by buffering the aqueous solution at a pH value in excess of about 2 with a buffering agent.

Cuprous oxide can be advantageously added to the aqueous ion-exchange solution to cause the solution to buffer at a desirable pH, particularly in the pH range of 1 to 3, and most effectively in the pH range of 2 to 3. It has been further determined that the inclusion of cuprous and/or cupric ions in the aqueous ion-exchange-solution can have some effect on the E-beam exposure-induced coloration and the E-beam sensitivity of the HEBS glass articles.

Ion-exchange temperatures in excess of 150° C. up to the softening point of the ion-exchanged surface glass layer and/or up to the strain point of the anhydrous base glass are operable. The duration of the ion-exchange reaction required to obtain a thin ion-exchanged surface layer, e.g., less than about 3 micro-meters, decreases with an increasing temperature, and can place a practical upper limit on the temperature of the ion-exchange reactions because at a sufficiently high temperature the desired extent of the reaction might be completed within a matter of seconds. The temperature and duration of the ion-exchange reaction effect the depth of penetration of the ion-exchange reaction into the body portion of the glass article.

As a matter of convenience, the ion-exchange reactions of the present invention will preferably be carried out in an autoclave, because such an apparatus permits relatively easy control of the ion-exchange temperature, pressure, and atmosphere. To prevent the water in the aqueous ion-exchange solution from evaporating off during the ion-exchange reaction when conducted at elevated temperatures, the pressure of the autoclave can be maintained at the saturated vapor pressure of the ion-exchange solution or higher. Very high pressures can be utilized, although they are not required. Inert and oxidizing gases including $Cl_2$, $N_2$, air, $O_2$ and Ar can be advantageously added, usually at room temperature, to the vapor phase above the aqueous ion-exchange solution in the autoclave.

The filling factor, which is herein defined as the fractional volume of the autoclave occupied by the aqueous ion-exchange solution at room temperature, is another ion-exchange reaction parameter. The maximum allowable filling factor which is herein defined as the filling factor at which the volume of the vapor phase in the autoclave diminishes at the ion-exchange temperature, should never be approached for safety reasons. However, when the filling factor is kept excessively below the maximum allowable filling factor, the concentration of the ingredients in the aqueous ion-exchange solution, at elevated temperatures can be significantly different from the concentration at room temperature.

Exemplary compositions 37 and 46 of Table I of Example 1, in the form of glass plates with ground and polished surfaces, 2 mm in thickness, were ion exchanged at 320° C. for 30 minutes in an aqueous solution containing 200 g $AgNO_3$ + 55.6 g $Cu(NO_3)_2$ + 200 g $LiNO_3$ + 36.7 cc of 16N $HNO_3$ + 2.2 g silica gel/liter of the aqueous solution. The HEBS glass articles (ion-exchanged glass plates) produced are colorless and have a transmittance of 90.6% throughout the visible and near infrared spectral range.

Examination under a microscope showed that the surface quality of the ion-exchanged glass plates remain substantially the same as before the ion-exchange reaction. The fringe patterns for each surface observed through a contacting test flat were substantially the same before and after the plates were ion exchanged. No distortions of the surface figure of the ion-exchanged glass plates are detectable as a result of the ion-exchange treatment.

Portions of said ion-exchanged glass plates of glass composition 46 of Table I ("Plates 46" herein) were exposed to radiation of mercury g-line at 436 nm for a duration of 25 hours at an intensity level of 105 mw/cm$^2$. The transmittance of visible light through the blue light exposed area remained substantially constant at a value of 90.6% before and after the blue light exposure. Through exposures to white light having an intensity of 1.2 watt/cm$^2$, it was shown that ion-exchanged products of the exemplary glass composition 46 of Table I are insensitive and/or inert to radiation in the entire spectral ranges of visible light and longer wavelengths.

Plates 46 were exposed to focused electron beams of a JEOL JSM 35C Scanning Electron Microscope (SEM). A focused electron beam having a current of $10^{-7}$ amperes was employed at four levels of accelerating voltages 15, 20, 25, and 35 kv, to raster scan square areas of 1.2 mm $\times$ 1.2 mm. A series of E-beam exposures corresponding to charge densities ranging from $10^{-6}$ to $10^{-3}$ coulomb/cm$^2$ at each accelerating potential was done through the variation of exposure-durations. Uniformly darkened squares, 1.44 mm$^2$ in area, of magenta color varying in hue and intensity ranging in the order of increasing E-beam dosages from light reddish magenta to dark reddish magenta to reddish black were observed as soon as the sample plate was taken out of the vacuum chamber of SEM. Apparently, the sample was darkened instantaneously upon exposure to the high voltage electron-beam, and optical densities in excess of 3 were obtained without resorting to any subsequent chemical or physical development steps.

A conductive coating, e.g., about 100 Å coating of gold, about 500 Å coating of carbon, or the like, was deposited on the surfaces of the HEBS glass article to prevent static charge build up during E-beam exposure.

After the removal of the conductive coating from the E-beam written Plates 46, optical densities of the E-beam darkened areas of Plates 46 were measured as a function of wavelength from 300 nm to 900 nm using a Carrier 219 uv-visible spectrophotometer which is marketed by Varian Associates, Inc. FIG. 1 represents the spectral absorption curves before and after being darkened by the focused electron beam having a 35 kv accelerating voltage. The charge density impinging on the sample areas whose spectral absorption represented by curves A, B, C and D are 0, $3.2 \times 10^{-5}$, $1.6 \times 10^{-4}$ and $3.2 \times 10^{-4}$ coulomb/cm$^2$ respectively.

The charge density was calculated as the product of the beam current and an exposure duration divided by the area which is exposed with SEM. The actual duration of E-beam exposure on the uniformly darkened area is not known. One source of the uncertainty arises from the fact that there is always on the darkened area an edge which is very dark, even when the area is only very lightly exposed. The duration when SEM is on exposure mode, i.e., the apparent exposure duration, is regarded as the exposure duration in the calculation of the exposure dosage. The actual exposure duration by E-beam on the uniformly darkened square area may be a factor of 1 to 10 less than the apparent exposure duration which is employed in the calculation of the charge density. As a result, the values of the charge densities reported (including those of FIGS. 1 to 8) herein are too high by a constant, but unknown factor, of 1 to 10. In other words, the actual sensitivity of HEBS glass articles is more sensitive by a factor of 1 to 10 than the apparent sensitivity indicated in FIGS. 1 to 8.

An E-beam darkened area of one of the Plates 46 having an optical density of 2.04 at 436 nm was exposed to mercury line at 436 nm for a duration of 83 hours at an intensity level of 14.7 mw/cm$^2$, the optical density at the probing wavelength 436 nm was not changed by the blue light exposure. The spectral absorption curve and the color of the E-beam darkened area in Plates 46 are unchanged by the exposure to the actinic radiation at 436 nm. Through exposures to white lights from a mercury arc, as well as from tungsten halogen lamps, the E-beam darkened areas in Plates 46 are inert to radiation in the entire spectral ranges from near ultraviolet throughout visible and longer wavelengths.

"Characteristic curves of E-beam darkening" are herein defined as the plots of the information bearing optical densities at a given wavelength, as a function of charge densities in log scale. "The information bearing optical density" is defined herein as the E-beam exposure-induced optical density, i.e., the net optical density which is obtainable from spectral absorption curves, such as those of FIG. 1, by subtracting the optical density, due mainly to reflection, of the unexposed area from the optical density of the E-beam exposed area. Thus the information bearing optical density is zero at nil dosage of E-beam exposures. The characteristic curves of E-beam darkening of Plates 46 at the wavelength of the absorption peak, at 436 nm and at 546 nm are illustrated by curve D of FIG. 4, curve C of FIG. 5 and curve B of FIG. 6, respectively.

Figure 2:
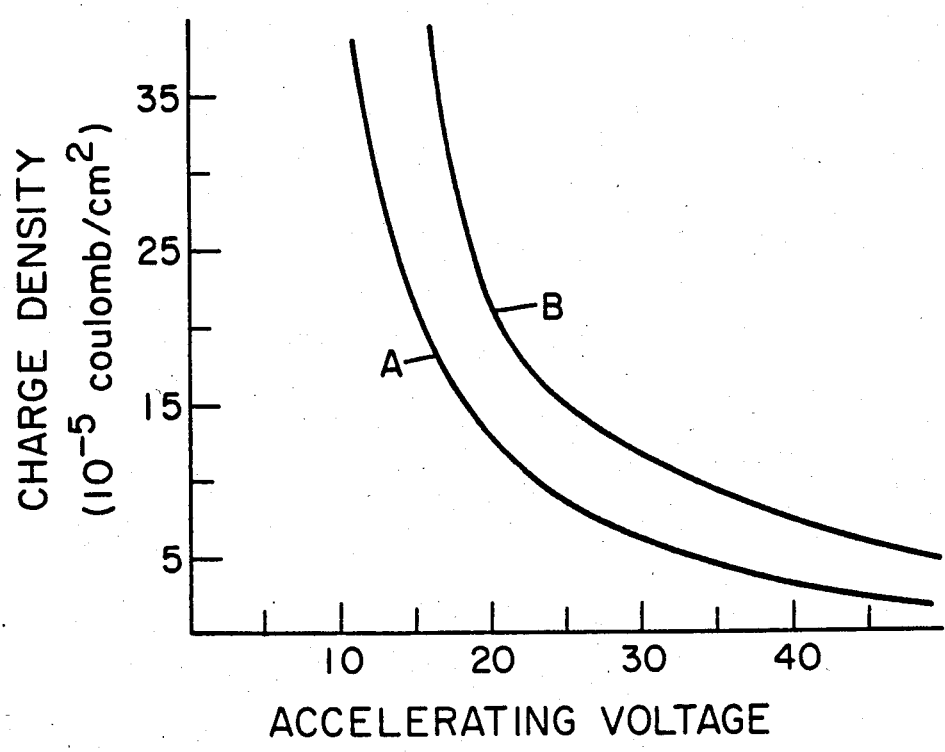
FIG. 2 graphically illustrates the required E-beam charge density to secure information-bearing optical density of 1.2 and 2.0 as a function of the accelerating voltage.

FIG. 2 illustrates the effect of the E-beam accelerating potential on the charge density that is required to secure a given optical density in Plates 46. The E-beam exposure-induced optical density at the wavelength of the absorption peak is shown in this figure as the variable parameter in going from curve A to curve B. Curves A and B of FIG. 2 represent the required charge densities to secure information-bearing optical densities of 1.2 and 2, respectively at various accelerating voltages.

The functional form of the voltage dependence, i.e., the shape of the curves such as those shown in FIG. 2, are functions of glass compositions, ingredients of ion exchange solutions and the conditions of ion-exchange reaction. Nevertheless, it is generally true that the E-beam sensitivity increases with the accelerating voltage up to at least about 35 kv.

The width of E-beam darkened lines was estimated from photomicrographs of isolated lines in Plates 46. The line width was about 1 micrometer. The dependence of line width on the accelerating voltages is expected, but the precision of the photomicroscopic measurements did not result in an unambiguous determination of submicrometer line widths.

The spectral absorption curves C and D of FIG. 1 have one absorption band, in the visible spectral range, centered around 510 nm with a band width of about 250 nanometers. Consequently, the E-beam exposed areas within Plates 46 absorb strongly the green portion of the visible light and transmit more in the red than in the blue portion of the visible light, and manifest themselves as reddish magenta to reddish black in color.

Figure 3:
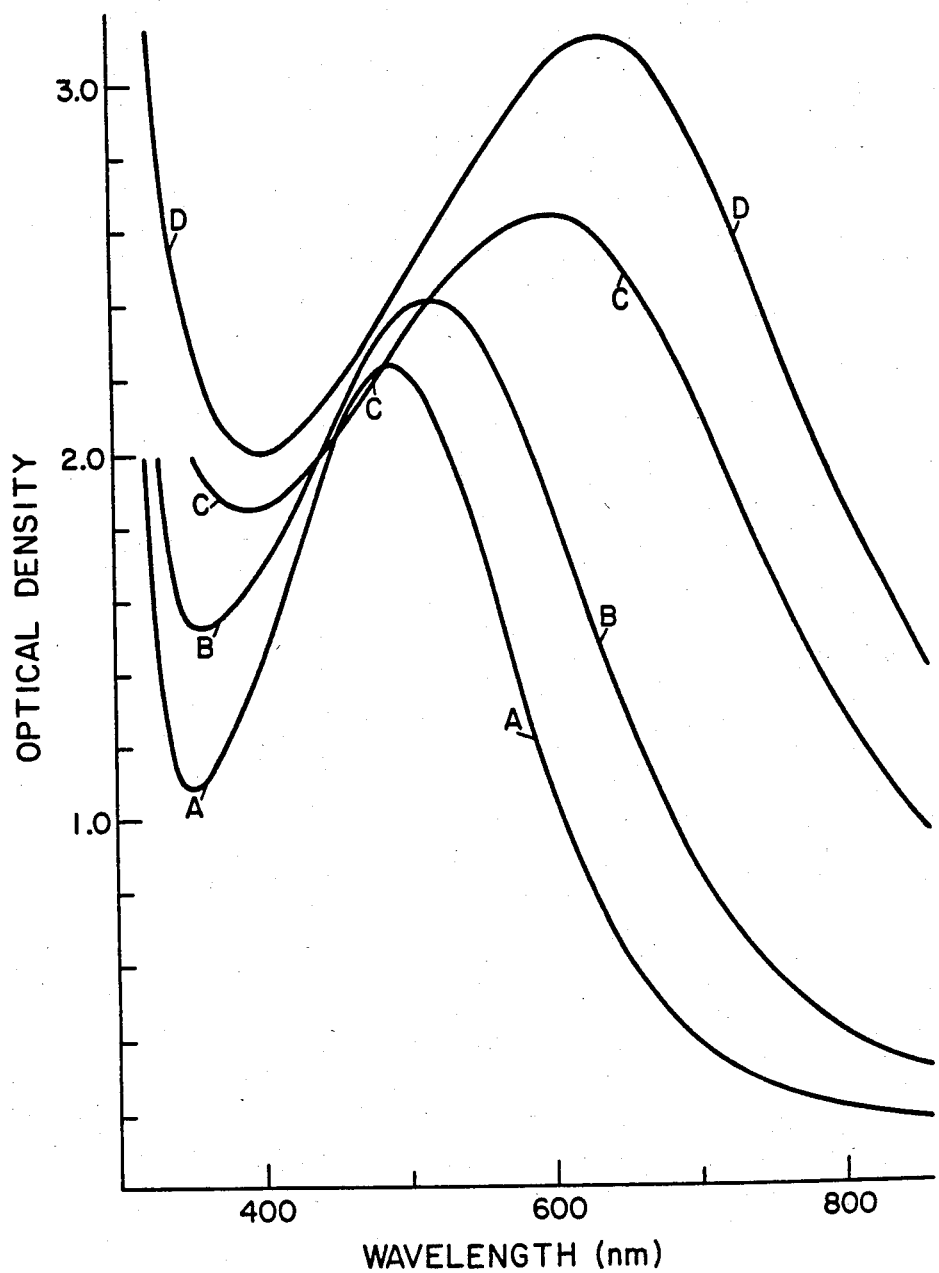
FIG. 3 graphically portrays the E-beam exposure-induced absorption curves of some of the HEBS glass articles and illustrates the variety of the E-beam exposure-induced colorations exhibited thereby.

FIG. 3 illustrates the E-beam exposure-induced absorption curves representing some of the various HEBS glass articles of the present invention and illustrates the variety of the E-beam exposure-induced colorations exhibited thereby.

Curve A of FIG. 3 represents the absorption spectrum of a 25 kv E-beam induced coloration exhibited by Plate 37C of Example 2 (an ion-exchanged plate of glass composition 37 of Table I of Example 1). Curve B of FIG. 3 illustrates the absorption spectrum of the 35 kv E-beam induced coloration displayed by Plate 41 of Example 2. Curves C and D of FIG. 3 depict the absorption spectra of the 35 kv E-beam exposure-induced colorations exhibited by plates 6 and 5, respectively, of Example 2. The E-beam induced colorations corresponding to curves A, B, C and D are red, magenta, violet gray and bluish black, respectively.

Figure 4:
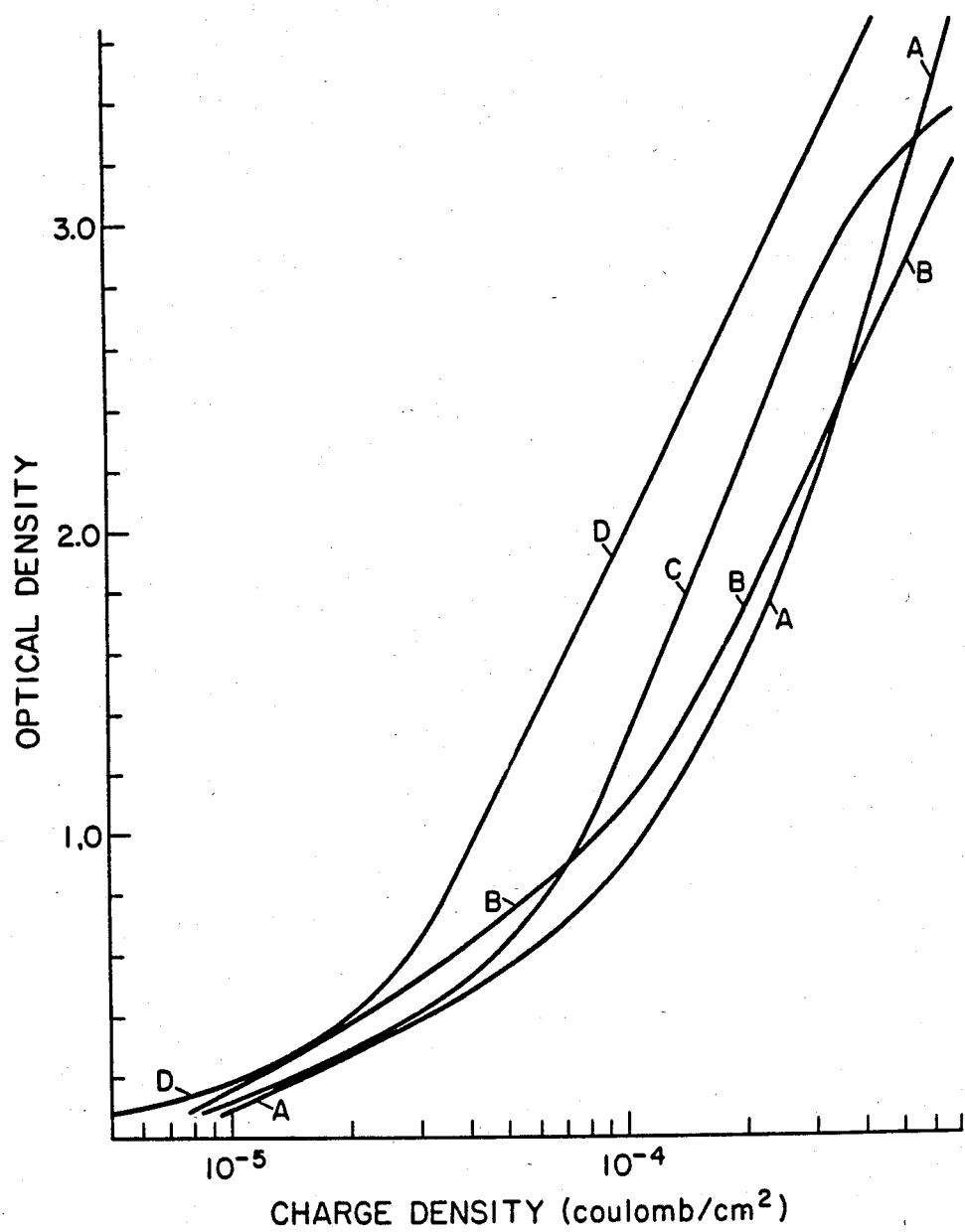
FIG. 4 graphically sets forth some of the general characteristic curves of E-beam darkening at the peak absorption wavelengths.

FIG. 4 depicts the general characteristic curves, of the E-beam exposure-induced absorption at peak wavelengths, displayed by some of the HEBS glass articles of the present invention after being darkened by electron beams with 35 kv accelerating potential.

Curve A of FIG. 4 represents the characteristic curve of Plate I of Example 2. The peak wavelength of the E-beam exposure-induced absorption within the ion-exchanged surface layer of Plate 1 was red shifted from 560 nm to 590 nm, as the E-beam exposure-dosage was increased from $8 \times 10^{-5}$ to $6.4 \times 10^{-4}$ coulomb/cm$^2$.

Curves B of FIG. 4 represent the characteristic curve of Plate 2 of Example 2. The peak wavelength of the E-beam exposure-induced absorption was red shifted from 570 nm to 612 nm, as the E-beam exposure dosage was increased from $8 \times 10^{-5}$ to $6.4 \times 10^{-4}$ coulomb/cm$^2$.

Curve C and D of FIG. 4 represents the characteristic curves of Plates 37 and 46, respectively, of Example 2. The peak wavelength of the E-beam exposure-induced absorption within the ion-exchanged surface layer of the plates is blue shifted from 528 nm to 510 nm for the exemplary composition 37 as the E-beam dosage increases from $8 \times 10^{W-5}$ to $6.4 \times 10^{-4}$ coulomb/cm$^2$, and is blue shifted from 524 nm to 510 nm for Plate 46 as the E-beam dosage increases from $3.2 \times 10^{-5}$ to $3.2 \times 10^{-4}$ coulomb/cm$^2$.

Since the characteristic curves of E-beam exposure-induced absorption at the wavelength of He-Ne lasers, at those of semiconductor lasers, at 405 nm and at 436 nm are important parameters of the HEBS glass article for many applications, FIGS. 5, 6, 7 and 8 set forth some of the characteristic curves at these wavelengths.

Figure 5:
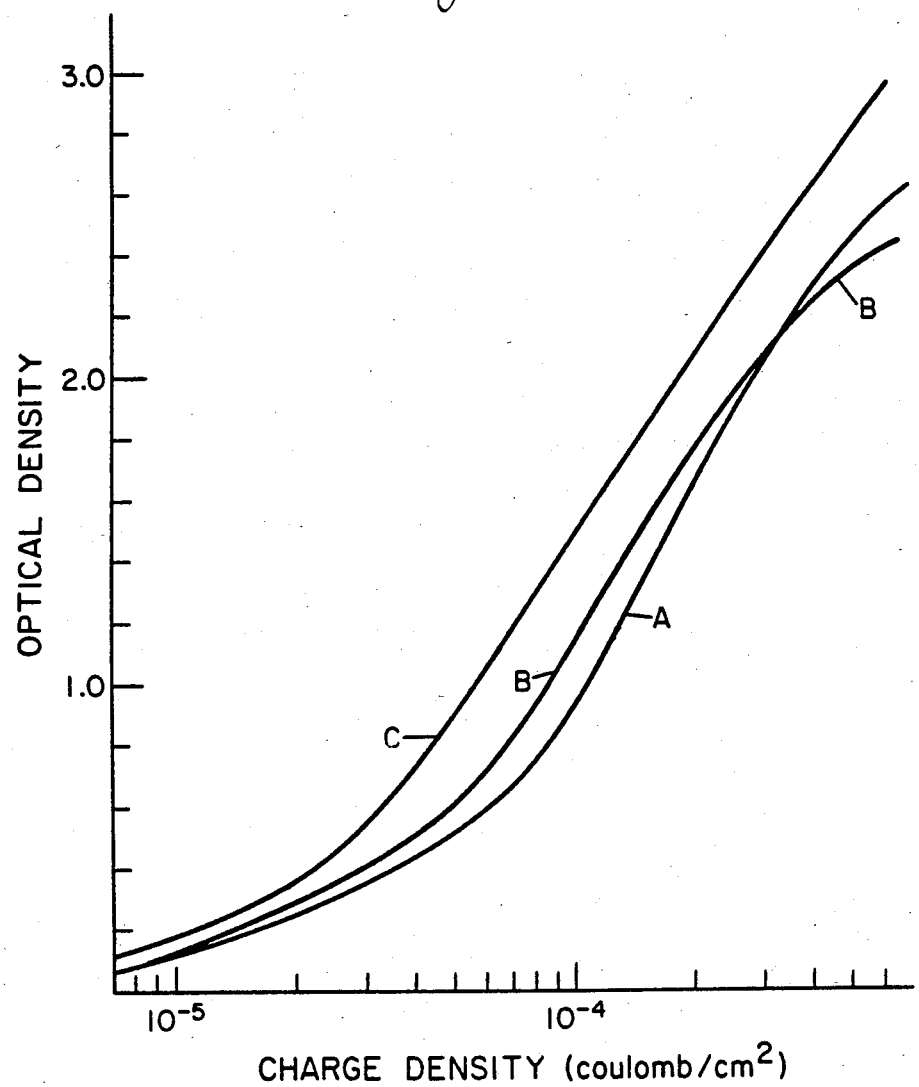
FIG. 5 graphically reports some of the general characteristic curves of E-beam darkening at 436 nm.

FIG. 5 illustrates some of the general characteristic curves of the E-beam exposure-induced absorption at 436 nm, displayed by the ion-exchanged products of the present invention after being darkened by 35 kv E-beams. Curves 5A, B and C of FIG. 5 represent the characteristic curves of Plates 37, 37B and 46, respectively, of Example 2.

Figure 6:
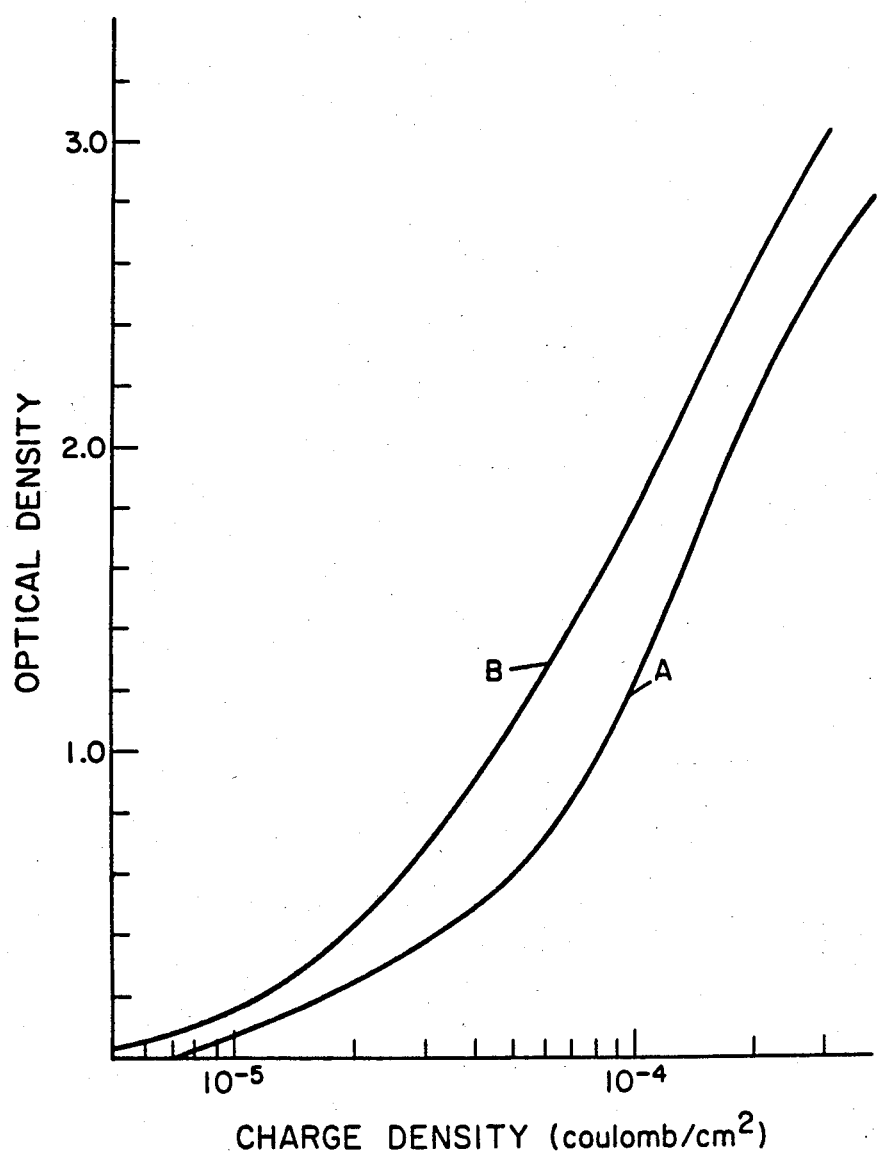
FIG. 6 graphically represents some of the general characteristic curves of E-beam darkening at 546 nm.

FIG. 6 illustrates some of the general characteristic curves of the E-beam exposure-induced absorption at 546 nm, displayed by the HEBS glass articles after being darkened by 35 kv electrons. Curves A and B of FIG. 6 represent the characteristic curves of Plates 37 and 46, respectively, of Example 2.

Figure 7:
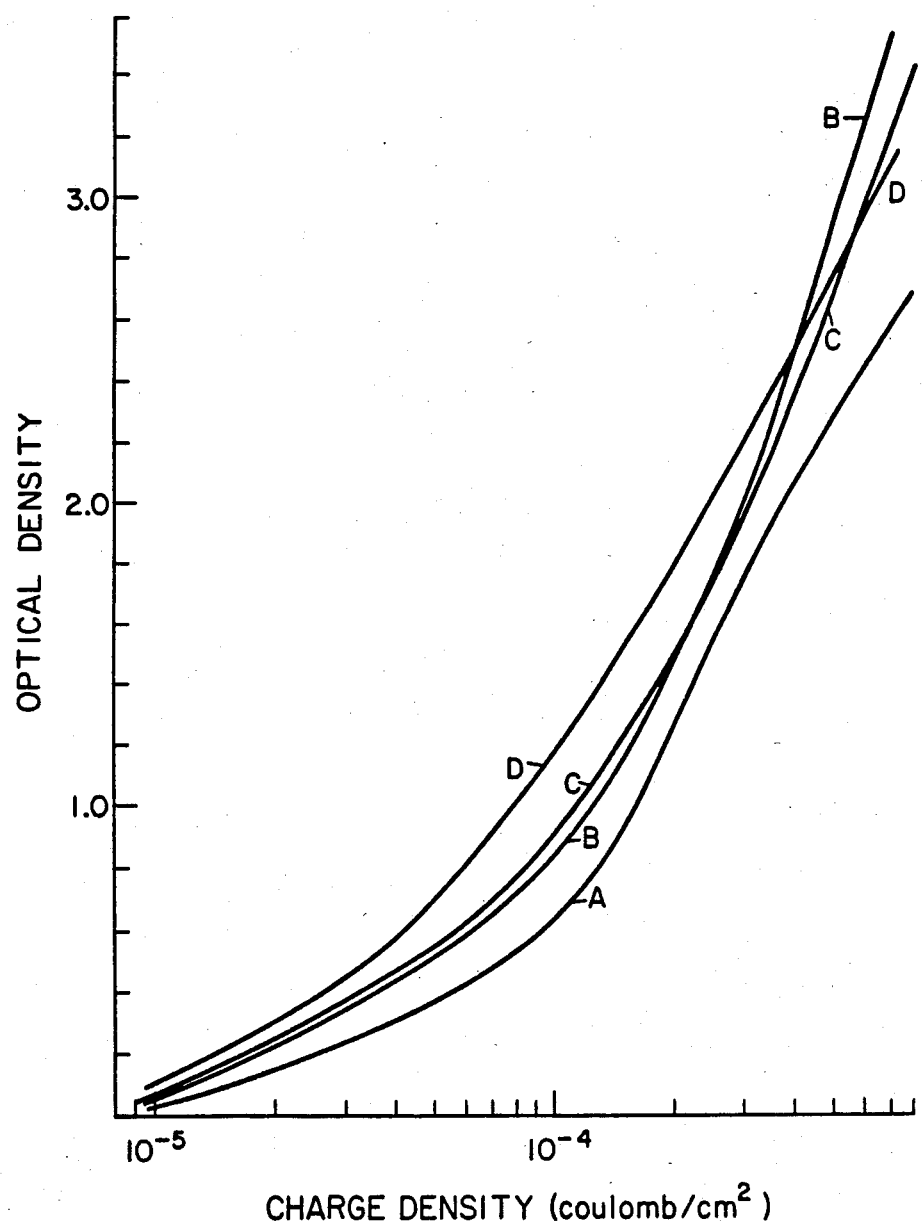
FIG. 7 graphically depicts some of the general characteristic curves of E-beam darkening at 632 nm.

FIG. 7 depicts some of the general characteristic curves of the E-beam exposure-induced absorption at 632 nm displayed by the ion-exchanged products of the present invention after being darkened by 35 kv electrons. Curves A, B, C and D of FIG. 7 represent the characteristic curves of Plates 6, 2A, 5 and 3, respectively, of Example 2.

Figure 8:
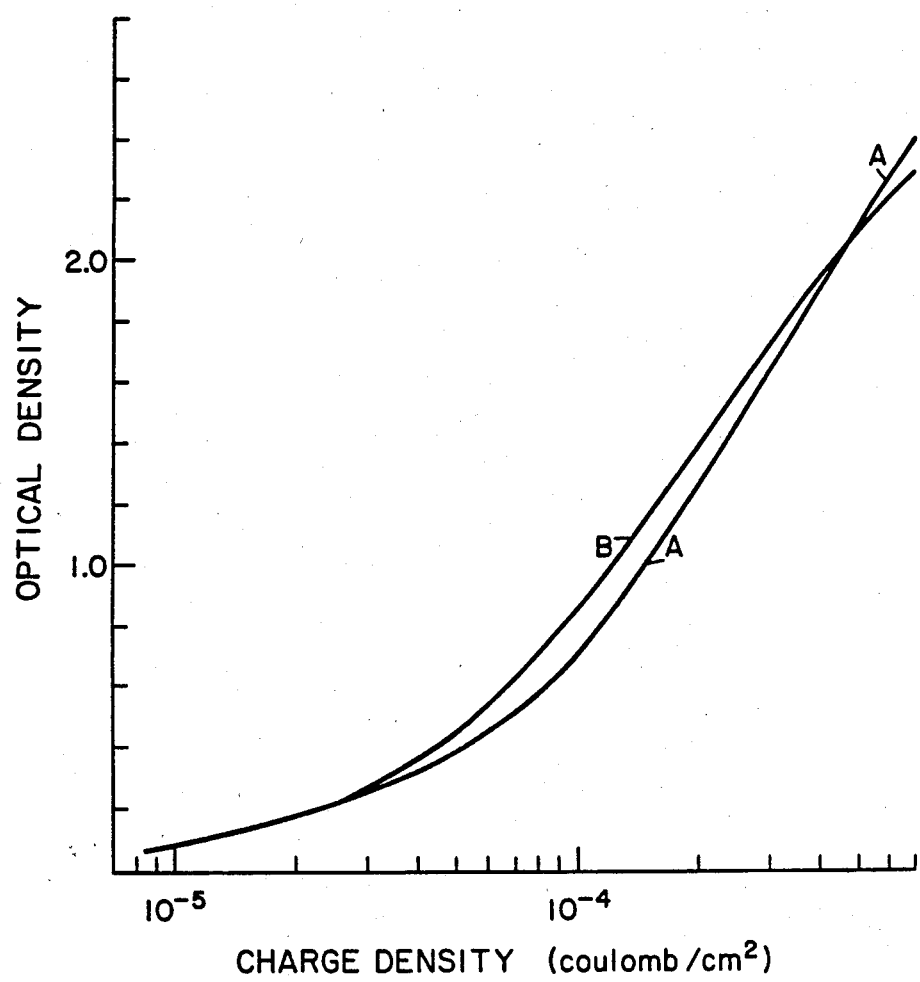
FIG. 8 graphically describes some of the general characteristic curves of E-beam darkening at 750 nm.

FIG. 8 sets forth some of the general characteristic curves of the E-beam exposure-induced absorption at 750 nm, displayed by the ion-exchanged products of the present invention after being darkened by 35 kv electrons. Curves A and B of FIG. 8 represent the characteristic curves of Plates 5 and 3 of Example 2.

RS-Suppression Agents (RSS Agents)

It has been found that ground and polished glass plates in the glass composition fields of alkali metal silicates with or without halides in the batch of the glass melts are in general yellow colored spontaneously upon ion-exchange reactions in an aqueous solution containing, by liter, 20 g AgNO$_3$+2 cc or less of 16N HNO$_3$ with or without other ingredients, such as Cu$_2$O, Cu(NO$_3$)$_2$, LiNO$_3$ and/or silica gel in the aqueous ion-exchange solution, as long as the temperature of the ion-exchange reaction is sufficiently high to cause a finite rate of the ion-exchange reactions. The spontaneous yellow coloration of the ion-exchanged glasses is intensified from a light yellow tint to a bright gold color to brown with an increasing pH value and/or an increasing concentration of Ag$^+$ ions of the aqueous ion-exchange solution. The identical phenomenon of the spontaneous yellow coloration upon ion-exchange reactions is observed, when glass samples within the glass composition fields of alkali metal silicates are ion exchanged in an aqueous solution containing, by liter, 200 g AgNO$_3$ and 70 cc or less of 16N HNO$_3$, with or without the other ingredients, such as those set forth above.

Figure 9:
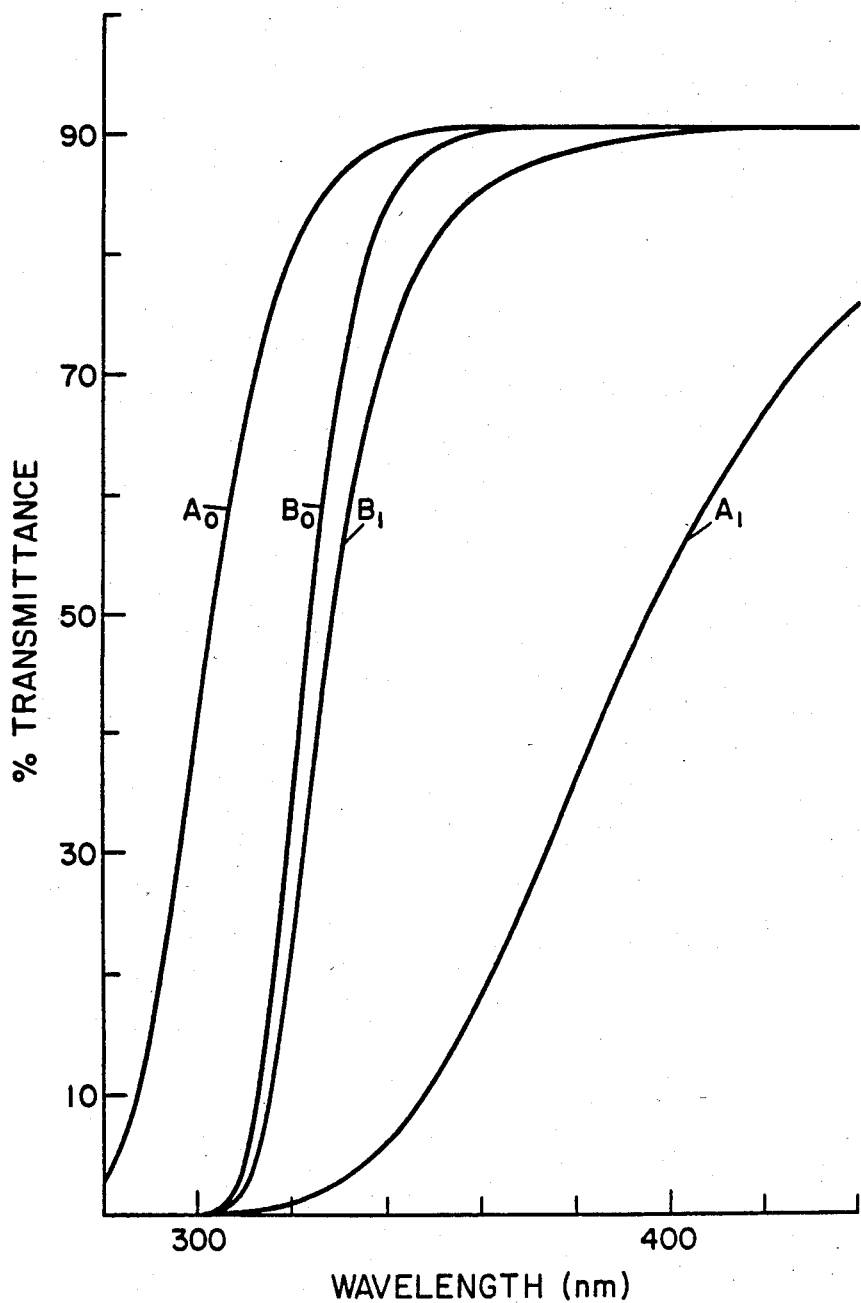
FIG. 9 graphically portrays the role of RS-Suppression agents.

Representative transmission-spectra demonstrating the spontaneous yellow coloring phenomenon are set forth graphically by curves A$_0$ and A$_1$ of FIG. 9. Curve A$_0$ of FIG. 9 represents the visible spectrum exhibited by a parent anhydrous glass plate, 2 mm in thickness, of the exemplary glass composition 25 of Table I of Example 1. Curve A$_1$ of FIG. 9 represents the visible spectrum displayed by the 2 mm glass plate of Plate 25 of Example 2.

The absorption edge of the exemplary glass composition 25 of Table I is red shifted from curve A$_0$ to curve A$_1$ upon ion exchange with an aqueous solution containing Ag$^+$ ion and HNO$_3$. To quantify the amount of spontaneous red shift upon ion exchange, RS is herein defined as the difference of wavelengths in nm between the wavelength $\lambda_{IE}$ of the ion-exchanged glass plate at 50% transmittance and the corresponding wavelength $\lambda_{AN}$ of the parent (non ion-exchanged) anhydrous glass plate at 50% transmittance, and can be expressed mathematically:

$$RS = \lambda_{IE}(\text{at } 50\% \ T) - \lambda_{AN}(\text{at } 50\% \ T)$$

Plates 25 and 26 of Example 2 prepared by ion exchange of exemplary glass compositions 25 and 26 of Table I of Example 1 exhibit RS values of 92 nm and 166 nm, respectively. The anhydrous glass plate is a glass plate of the base or parent anhydrous glass composition.

A spontaneous yellow coloration occurs when the ion-exchanged silver exists in a reduced state in glass, e.g., in the form of silver metal particles which have an absorption band in the spectral range of near uv to blue light. The red shift of the absorption edge is a manifestation of the spontaneous reduction of ion-exchanged $Ag^+$ ions into metallic silver. Consequently, the value of RS is a quantitative measure of the amount of silver, in an ion-exchanged surface layer, which is reduced spontaneously upon being ion exchanged into the glass. The red shift of the absorption edge is not desirable in two respects. (1) The transmittance of the ion-exchanged glasses are lessened in the wavelength ranges of ultraviolet, blue light, and even longer wavelengths. (2) The concentration of $Ag^+$ ions in the ion-exchanged glass, which are reducible to silver metal particles and/or specks in glass by high energy beams, is diminished. In other words, the available information bearing optical density in the ion-exchanged products diminishes.

Although the addition of heavy metal ions and/or transition metal ions to the glass batch of alkali metal silicate glasses in general causes a red shift of the absorption edge of the resulting anhydrous glasses relative to the absorption edge of the heavy metal-free glasses, I have found that RS values are substantially reduced, when glass batches of parent anhydrous glass compositions include at least one oxide selected from the oxides of the transition metals which have less than half-filled atomic d-orbitals, i.e., one to four d-electrons in an atomic state.

Oxides of transition metals having one to four d-electrons in an atomic state include $Sc_2O_3$, $TiO_2$, $V_2O_5$, $Y_2O_3$, $Ta_2O_5$, $Nb_2O_5$, $La_2O_3$, $HfO_2$, $ZrO_2$, and $WO_3$. These oxides will be referred to herein as RS-Suppression agents or as RSS agents. The effectiveness of suppressing RS values differs a great deal among these oxides. The relative effectiveness among these oxides as a RS-Suppression agent depends to a large extent on the composition field of the base glass as well as on the ion-exchange-parameters, including concentrations and ingredients of the aqueous ion-exchange solution as well as temperature and duration of the ion-exchange reactions.

Within the glass composition fields of alkali metal oxide-$ZnO$-$Al_2O_3$-$SiO_2$-$Cl$, particularly effective RSS agents include $TiO_2$, $Ta_2O_5$ and $ZrO_2$; whereas $Y_2O_3$ and $Nb_2O_5$ have only marginal effects and are not effective RSS agents, $V_2O_3$ does not function as an RSS agent and is excluded from the list of RSS agents for this particular glass composition field.

Examples of diminishing RS values through the use of $TiO_2$, $Ta_2O_5$ and $ZrO_2$ are recorded in Tables A and B to illustrate the effects of RSS agents.

It has been determined that the RS values can be substantially diminished within the alkali metal silicate base glass compositions by the addition of at least one RSS agent to the glass melt, i.e., adding an RSS agent to the batch melt of the alkali metal silicate base glass composition. For example, the values of RS of Plates 25, 6A, 7 and 8 (see Table A) decrease from 92 nm to 8 nm to 3 nm and to 2 nm, as the concentration of $TiO_2$ on the mole percent basis in the glass melt increases from 0% to 4.4% to 5.9% and to 7.4%. The exemplary glass compositions 1, 21, 9, 10 and 11 of Plates 1A, 21, 9, 10 and 11 of Example 2 are substantially identical in the proportions, in mole percent, of the batch components $Na_2O$, $K_2O$, $ZnO$, $Al_2O_3$, $SiO_2$ and Cl and contain 1.5% $TiO_2$. The values of RS for Plates 1A, 21, 9, 10 and 11 decrease further from 16 nm (the RS value of Plate 1A, see Table B) to 4 nm due to the addition of a second RSS agent, 1% $ZrO_2$, and decrease further from 16 nm to 9 nm to 7.5 nm and to 2.25 nm (see Table B) due to the addition of a second RSS agent, 0.27%, 0.54% and 0.80% of $Ta_2O_5$, respectively, in the glass melt batches.

Plates 4, 22, 12, 13A and 14 are substantially identical in the proportions of the batch components, in mole percent, $Li_2O$, $Na_2O$, $K_2O$, $ZnO$, $Al_2O_3$, $SiO_2$ and Cl and contain 1.5% $TiO_2$. The values of RS for Plates 4, 22, 12, 13A and 14 of Example 2 decrease further from 14.5 nm to 4 nm (see Table B) due to the addition of a second RS-Suppression agent, 1% $ZrO_2$ (Plate 22), and decrease further from 14.5 nm (the RS value of Plate 4, see Table B) to 9.5 nm to 8 nm and to 7 nm due to the addition of a second RSS agent 0.27%, 0.54% and 0.81% of $Ta_2O_5$, respectively, in the glass melt batches of the exemplary glass composition for Plates 12, 13A and 14, respectively.

Curves $B_0$ and $B_1$ of FIG. 9 depict the transmittance curves of a glass plate 2 mm thick of the exemplary glass composition 15 of Table I of Example 1 before and after being ion exchanged as set forth in Example 2 to prepare Plate 15. The beneficial effect of the addition of RSS agents (1.6% $TiO_2$ and 1.1% $Ta_2O_5$) is graphically displayed in FIG. 9, in which the red shift of curve $B_1$ from curve $B_0$ is compared with the red shift of curve $A_1$ from curve $A_0$, transmittance curves of glass plates of Plate 25 of Example 2 and exemplary glass composition 25 of Table I of Example 1, respectively. As is also illustrated in FIG. 9, the transmittance values of Plate 15 are 86.3%, 92% and 92% at the wavelengths of 365 nm, 405 nm and 436 nm, respectively (see Curve $B_1$). In comparison, the transmittance values of Plate 25, which has been identically ion exchanged, are 24%, 58% and 74% at the wavelengths of 365 nm, 405 nm and 436 nm, respectively (see Curve $A_1$).

Table C records the transmittance values at 365 nm displayed by Plates 1B, 2C, 3B, 9A, 11A, 21A, 4A, 5B, 6C, 12, 14A and 22A of Example 2 prepared from the exemplary glass compositions 1, 2, 3, 9, 11, 21, 4, 5, 6, 12, 14 and 22 of Table I of Example 1. Table C also recites for comparison the transmittance values at 365 nm exhibited by Plates 25 and 26 of Example 2, the exemplary glass compositions of which contain no RSS agents.

The exemplary glass compositions 26, 1, 2, 3, 21, 9 and 11 of Example 1 are alkali metal silicate glasses in the sub-field of glass composition $Na_2O$-$K_2O$-$ZnO$-$Al_2O_3$-$SiO_2$-$Cl$ containing, with the exception of the composition 26, in addition at least one of the three RSS agents $TiO_2$, $Ta_2O_5$ and $ZrO_2$. The transmittance values (see Table C) of the corresponding ion-exchanged glasses (Plates 26, 1B, 2C and 3B) at 365 nm are improved from 0% to 77.5%, to 83.3% and to 82.2% due to the addition of 1.5%, 3% and 4.4% on the mole percent oxide basis of $TiO_2$, respectively, in the glass melts. The transmittance values of the ion exchanged glasses at 365 nm are further improved from 77.5% (the transmittance value of Plate 1B) to 85.5% by the addition of a second RSS agent, 1 mole percent $ZrO_2$, and further increase from 77.5% to 81.7% and to 85.3% by the addition of a second RSS agent, 0.27 mole percent and 0.8 mole percent $Ta_2O_5$, respectively.

The corresponding effects of $TiO_2$, $Ta_2O_5$ and $ZrO_2$ on the transmittance values of $Li_2O$-$Na_2O$-$K_2O$-$ZnO$-$Al_2O_3$-$TiO_2$-$Ta_2O_5$-$ZrO_2$-$SiO_2$-$Cl$ glasses are illustrated in Table C as well by Plates 25, 4A, 5B, 6C, 22A, 12A and 14A. The transmittance values of these $Li_2O$-containing glasses are in general higher than lithium free glasses of similar compositions.

With the exception of the exemplary glass compositions 25, 26 and 27 which do not contain the three more effective RSS agents, TiO$_2$, Ta$_2$O$_5$ and ZrO, the transmittance values of all the other ion-exchanged glasses in Tables A, B and C are greater than 90% at wavelengths longer than about 400 nm.

TABLE A

| Plate No. | 25 | 26 | 6A | 7 | 8 | 13 | 15 |
|---|---|---|---|---|---|---|---|
| RS Value in nm | 92 | 166 | 8 | 3 | 2 | 10 | 4.5 |
| TiO$_2$ | 0 | | 4.4 | 5.9 | 7.4 | | |
| Plate No. | 17 | 18 | 19 | 20 | 23 | 24 | 27 |
| RS Value in nm | 11 | 4.5 | 8.8 | 9.8 | 2.8 | 8.5 | 52 |

TABLE B

| Plate No. | 1A | 2B | 3A | 4 | 5A | 6B | 9 | 10 |
|---|---|---|---|---|---|---|---|---|
| RS Value in nm | 16 | 6.5 | 3 | 14.5 | 7 | 3 | 9 | 7.5 |
| Ta$_2$O$_5$ | 0 | | 0 | | | | 0.27 | 0.54 |
| ZrO$_2$ | 0 | | 0 | | | | 0 | 0 |
| Plate No. | 11 | 12 | 13A | 14 | 16 | 21 | 22 | |
| RS Value in nm | 2.25 | 9.5 | 8 | 7 | 12 | 4 | 4 | |
| Ta$_2$O$_5$ | 0.8 | 0.27 | 0.54 | 0.8 | | 0 | 0 | |
| ZrO$_2$ | 0 | 0 | 0 | 0 | | 1.0 | 1.0 | |

TABLE C

| Plates No. | 1B | 2C | 3B | 9A | 11A | 21A | 4A |
|---|---|---|---|---|---|---|---|
| % T at 365 nm | 77.5 | 83.3 | 82.2 | 81.7 | 85.3 | 85.5 | 80.0 |
| TiO$_2$ | 1.5% | 3.0% | 4.4% | 1.5% | 1.5% | 1.5% | 1.5% |
| ZrO$_2$ | 0 | 0 | 0 | 0 | 0 | 1.0% | 0 |
| Ta$_2$O$_5$ | 0 | 0 | 0 | 0.27 | 0.8 | 0 | 0 |
| Plates No. | 5B | 6C | 12A | 14A | 22A | 25 | 26 |
| % T at 365 nm | 85.0 | 84.4 | 83.5 | 88.0 | 88.0 | 24 | 0 |
| TiO$_2$ | 3.0% | 4.4% | 1.5% | 1.5% | 1.5% | 0 | 0 |
| ZrO$_2$ | 0 | 0 | 0 | 0 | 1.0% | 0 | 0 |
| Ta$_2$O$_5$ | 0 | 0 | 0.27 | 0.8 | 0 | 0 | 0 |

Photosensitivity-Inhibitors (PI Agents)

The insensitivity and/or inertness of the HEBS glass articles of the present invention to radiations in the wavelength ranges from ultraviolet throughout visible light and longer wavelengths are of paramount importance to their usefulness as phototools and/or as optically retrievable, permanent recording media. It has been found that the inclusion of one or more oxides of transition metals having one to four d-electrons in their atomic state to the glass batches of parent anhydrous base glass compositions not only suppresses the spontaneous reduction of ion-exchanged Ag$^+$ ions in glass, but also eliminates the photosensitivity of the ion-exchanged surface glass layer and, at the same time, substantially increases its sensitivity to electron beams.

The Oxides of transition metals having one to four d-electrons in an atomic state include Sc$_2$O$_3$, TiO$_2$, V$_2$O$_5$, Y$_2$O$_3$, ZrO$_2$, Nb$_2$O$_5$, La$_2$O$_3$, HfO$_2$, Ta$_2$O$_5$ and WO$_3$. These oxides will also be referred to herein as photosensitivity inhibitors or PI agents. The effectiveness of inhibiting photosensitivity differs a great deal among these oxides. The relative effectiveness among these oxides as photosensitivity inhibitors depends to a large extent on the composition field of the base glass as well as on the ion-exchange parameters including concentrations and ingredients of the aqueous ion-exchange solution as well as temperature and duration of the ion-exchange reactions.

Within the glass composition field of alkali metal oxides-ZnO-Al$_2$O$_3$-SiO$_2$-Cl, the more effective PI agents include TiO$_2$, Nb$_2$O$_5$ and Y$_2$O$_3$.

Although both the RSS agents and PI agents are oxides of transition metals having one to four d-electrons, a particular oxide which functions as a RSS agent in a given glass composition may or may not function as a PI agent in the same glass composition. For example, within the glass composition fields of alkali metal oxide-ZnO-Al$_2$O$_3$-SiO$_2$-Cl, TiO$_2$ is an effective PI agent as well as an effective RSS agent, whereas Nb$_2$O$_5$ and Y$_2$O$_3$ are effective only as PI agents. On the other hand, Ta$_2$O$_5$ and ZrO$_2$ are effective RSS agents, but are not as effective in inhibiting photosensitivity.

Figure 10:
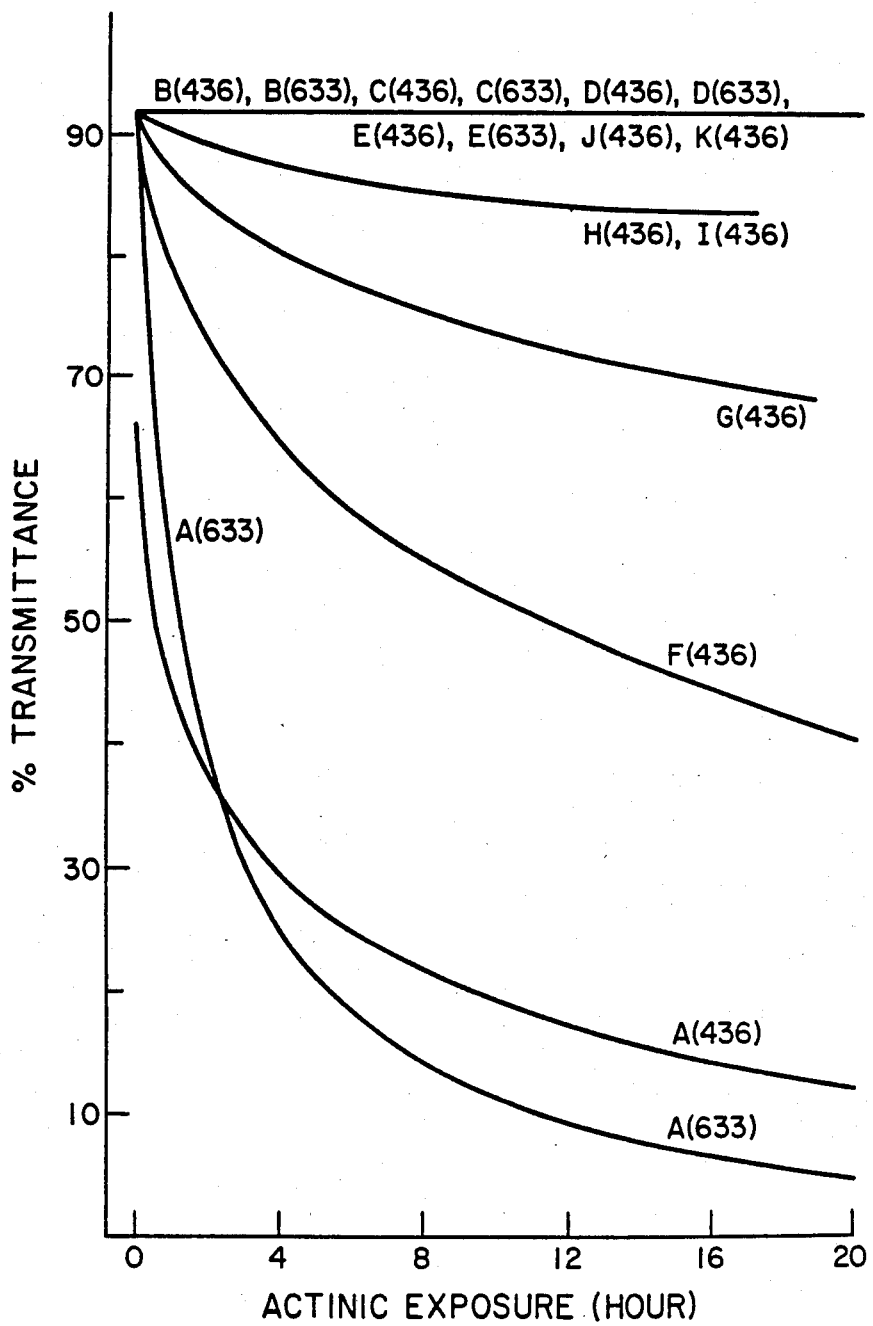
FIG. 10 graphically portrays the role of photosensitivity inhibitors.

FIG. 10 illustrates the role of TiO$_2$, Ta$_2$O$_5$, Y$_2$O$_3$ and Nb$_2$O$_5$ as PI agents. Curves A, B, C, D and E of FIG. 10 set forth the transmittance values at two wavelengths 436 nm and 633 nm as a function of the duration of exposure to actinic radiation at 436 nm on Plates 26A, 4B, 5, 6 and 3C of Example 2.

Each of the plate samples was placed for 20 hours near the focus of a convergent beam which was obtained from the output of a 100 watt mercury arc, using a condensing lens assembly and a 436 nm band pass interference filter. The intensity of the exposure beam at 436 nm was 150 milliwatts/cm$^2$ on the glass sample. The transmittance of the glass samples was probed at the wavelength of the exposure beam and at 633 nm. The probing wavelengths are labeled in the parenthesis in FIG. 10.

Plate 26A of exemplary glass composition 26, which does not contain a PI agent, darkened to transmittance values of 12% at 436 nm and 4.5% at 633 nm. Plates 4B, 5, 6 and 3C of exemplary glass compositions 4, 5, 6 and 3, which contain, on a mole percent basis, 1.5% or more TiO$_2$, are not darkened by the actinic radiation at 436 nm. The photosensitivity of the ion-exchanged surface layers of the ion-exchanged glasses containing at least 1.5% TiO$_2$ is totally inhibited.

In good agreement with the foregoing discussions, TiO$_2$ also functions as a RSS agent; whereas the initial transmittance of Plate 26A is 66% at 436 nm, the transmittance of Plates 4B, 5, 6 and 3C are about 92% ±1% at 436 nm.

Curves F, G, H, I, J and K of FIG. 10 set forth the transmittance values as a function of the duration of exposure to the actinic radiation at 436 nm of Plates 1C, 4C, 47, 48, 12B and 5C of Example 2, respectively, prepared from exemplary glass compositions 1, 4, 47, 48, 12 and 5, respectively, of Table I of Example 1. Although the ion-exchanged glass plates of the exemplary glass composition 12 (containing 1.5% TiO$_2$ and 0.27% Ta$_2$O$_5$) and the exemplary glass composition 5 (containing 3.0% TiO$_2$), i.e., Plates 12B and 5C, respectively, are insensitive to actinic radiation at 436 nm, Plates 1C, 4C, 47 and 48 of exemplary glass compositions 1 and 4 (each containing 1.5% TiO$_2$ in the base glass composition), exemplary glass composition 47 (containing 1.5% Y$_2$O$_3$) and exemplary glass composition 48 (containing 1.3% Nb$_2$O$_5$), respectively, show residual photosensitivity. The relative effectiveness of TiO$_2$, Ta$_2$O$_5$, Y$_2$O$_3$ and Nb$_2$O$_5$ functioning as photosensitivity inhibitors are displayed by the darkening rate curves F, G, H, I, J and K of FIG. 10.

The effectiveness of a PI agent depends strongly on the concentrations of the various ingredients of the ion-exchange solution. This is evident in FIG. 10 and is particularly apparent in comparing the darkening rate curves B and G of FIG. 10.

The effectiveness of a PI agent also depends on the base anhydrous glass composition, as is apparent in comparing the darkening rate curve F (exemplary glass composition 1) and the rate curve G (exemplary glass compositon 4) of FIG. 10.

Further tests of the HEBS glass articles of the present invention on the insensitivity/inertness to actinic radiation were done with exposures to white light and to radiation from a mercury arc at 405 nm and 365 nm. The results of such tests are recited on glass plates, 2 mm thick, of Plates 6, 5 and 4B of Example 2, which were identically ion exchanged. Plate 6 was exposed to actinic radiation at 405 nm for a duration of 64 hours at an intensity level of 80 milliwatt/cm$^2$, the transmittance at the monitoring (probed at the exposure wavelength) wavelength of 405 nm remained constant throughout the entire exposure duration. Said ion exchanged glass plate remained colorless and totally transparent, i.e., transmittance values of about 91.5% ±1% throughout the spectral ranges of visible and near infrared, after being irradiated to an energy density of $1.85 \times 10^4$ joule/cm$^2$ at 405 nm. The same Plate 6 was exposed in addition to actinic radiation at 365 nm for a duration of 64 hours at an intensity level of 56 mw/cm$^2$, the glass plate remained colorless and showed no change in transmittance at all wavelengths throughout near-uv, visible and near-infrared spectral ranges.

Plate 5 was exposed to white light composed of radiation having continuous wavelengths of longer than 400 nm for a duration of 10 days at an intensity level of 1.2 watt/cm$^2$; the glass plate remained colorless and displayed before and after the exposure identical transmittance values at all wavelengths throughout the near-ultraviolet, visible and near-infrared spectral ranges.

The HEBS glass articles of the present invention are insensitive and/or inert to radiation of shorter wavelengths as the concentration of PI agents in the base anhydrous glass increases. Plate 6 is insensitive and/or inert to actinic radiation having wavelengths of about 365 nm and longer wavelengths. Plate 5 is insensitive and/or inert to actinic radiation of wavelengths about 400 nm and longer. Plate 4B is insensitive and/or inert to actinic radiation of wavelengths about 436 nm and longer.

It has been determined that the E-beam darkened image within the ion-exchanged products of the present invention exhibits excellent stability under various test exposures to high intensities and/or high dosages of actinic radiation from near-ultraviolet to near-infrared. The results of some of the test exposures are recited below on the glass plates, 2 mm thick, of Plates 5 and 6 of Example 2.

Plate 6 was darkened by an E-beam to an optical density of 1.97 at 436 nm (the corresponding absorption spectrum is closely represented by curve C of FIG. 3). The E-beam darkened area was then exposed to the actinic radiation at 436 nm for a duration of 22 hours at an intensity level of 171 m watt/cm$^2$; the color of the E-beam exposed area remained substantially unchanged and the optical density at 436 nm remained constant at 1.97. The same Plate 6 was darkened by an E-beam on a second area to an optical density of 1.63 at 600 nm. The E-beam darkened area was exposed to a broad band red light for a duration of 38 hours at an intensity level of 161 m watt/cm$^2$; the optical density and the color of the exposed area remained firmly unchanged.

Plate 5 was darkened by an E-beam to an optical density of 1.86 at 796 nm (the corresponding absorption spectrum is closely represented by curve D of FIG. 3). The E-beam darkened area was exposed for a duration of 7 days to a broad band of near infrared radiation at about 796 nm having an intensity of 53.4 m watt/cm$^2$; the optical density and the color of the irradiated area remained firmly unchanged. The same E-beam darkened area was subsequently exposed to white light for 7 days at an intensity level of 1.0 watt/cm$^2$; the optical density still remained substantially unchanged throughout the entire spectral range.

Base Glass Composition Fields

One of the products of the present invention are high energy beam sensitive glass articles exhibiting insensitivity and/or inertness to actinic radiations, consisting of a body portion and an integral ion-exchanged surface layer. The integral ion-exchanged surface layer exhibits coloring and/or darkening effects upon exposure to high energy beams. Colored images delineated and/or replicated by the high energy beam within said integral surface layer are also insensitive and/or inert to actinic radiation. The body portion retains the parent anhydrous glass composition of the integral surface layer.

The parent anhydrous glass compositions suitable for the products of the present invention are in the general composition field of alkali metal silicate glasses consisting of at least one alkali metal oxide selected from the group of $Li_2O$, $Na_2O$, $K_2O$, $Cs_2O$ and $Rb_2O$, at least one of the photosensitivity inhibitors and/or the RS-Suppression agents, and at least one glass network former. The glass melts for the parent anhydrous glass compositions are preferably saturated or super saturated with chlorides.

Durable glasses which are not dissolved and/or etched in the acidic aqueous solution at the temperatures of ion-exchange reactions, are essential in maintaining the optical quality surface and the surface figure of the glass articles being autoclaved in the aqueous ion-exchange solution. It has been found that the transition metal oxides, included in the glass melts to inhibit photosensitivity and/or to suppress RS values, greatly improve the acid durability of the alkali metal silicate base glass and effectively prevent the dissolution and etching of the hydrated glass network in the aqueous ion-exchange solution at elevated temperatures. It has also been found that further improvements in acid-durability and/or further strengthening of the hydrated glass network to prevent even the slightest etching by the aqueous ion-exchange solution are attainable by the addition in the glass melt batch of one or more oxides selected from ZnO, CaO, PbO, SrO, MgO and $Al_2O_3$. Thus the inclusion in glass batches of at least one oxide selected from ZnO, PbO, MgO, CaO, SrO and $Al_2O_3$ are most desirable for the products of the present invention and these oxides are referred to herein as acid-durability-and-glass-network strengtheners.

Although $SiO_2$ is, in general, the choice of the glass network former of the anhydrous base glass of the present invention, other glass network formers such as $B_2O_3$ and $P_2O_5$ can be advantageously employed. $ZrO_2$ is found to substantially improve the acid durability of $B_2O_3$ and/or $P_2O_5$ containing glasses.

Preferred parent anhydrous glass compositions for the products of the present invention comprise, on the mole percent oxide basis, of 5 to 25% total of $Li_2O + Na_2O + K_2O + Cs_2O + Rb_2O$; up to 6% Cl; 0.5-35% of one or more photosensitivity inhibitors, one or more RS-Suppression agents, and mixtures thereof; up to 35% total concentration of acid-durability-and-glass-network strengtheners, up to 4% F, up to 2% Br, up to 2% I, up to 25% $P_2O_5$, up to 25% $B_2O_3$, and 20-93% $SiO_2$, the sum of those components constituting at least 75% of the total composition. Other constituents can be included to modify the chemical and physical properties such as hardness and thermal expansion coefficients, etc. of the base glass and/or the integral ion-exchanged surface layer, and to assist in melting and forming characteristics of the parent anhydrous glass. As illustrative of such, BaO can be included in amounts up to about 35% (mole percent). Cerium can be included up to 0.1% by weight when it is necessary to increase the uv and/or X-ray absorption of the glass article.

The more preferred anhydrous base glass compositions comprise, on the mole percent oxide basis, about 5 to 25% total of $Li_2O + Na_2O + K_2O + Cs_2O + Rb_2O$, up to about 6% Cl, about 0.5-35% total concentration of photosensitivity inhibitors and RS-Suppression agents, up to about 20% ZnO, up to about 20% MgO, up to about 15% $Al_2O_3$, up to about 20% PbO, up to about 20% CaO, about 2-35% total of $MgO + ZnO + Al_2O_3 + PbO + CaO$, up to about 4% F, up to about 2% Br, up to about 2% I and about 50-89% $SiO_2$.

Besides enhancing the sensitivity to electron beam, chloride is in general a necessary component of the anhydrous base glass in obtaining most of the E-beam induced coloration other than yellow.

In the absence of any precipitated phases, e.g., AgCl, the reduced silver in the form of metallic silver particles is manifested in the silicate glasses as an absorption band centered at 390 nm to 460 nm. The E-beam exposure-induced yellow colorations in the ion-exchanged product of the present invention were obtained with and without chloride in the glass melts of the base glass.

The HEBS glass articles not containing chlorides do not have photosensitivity, even in the absence of any photosensitivity inhibitor in the glass melts. However, the RS values of chloride-free glasses are in general much larger than glasses of identical compositions having chlorides added in the glass melts, and thus RSS agents are in a greater demand for the chloride-free glasses.

The inclusion of at least one RS-Suppression agent in the anhydrous base glass is deemed necessary for the chloride-free glasses. On the other hand, the inclusion of at least one photosensitivity inhibitor in the anhydrous base glass is deemed necessary for the chloride-containing glasses.

It is desirable to include at least two oxides selected from the group of $Li_2O$, $Na_2O$ and $K_2O$ in the anhydrous base glass. The inclusion of $Li_2O$ as one of the alkali metal oxides is preferred for the following reasons. When part of the contents of $Na_2O$ and/or $K_2O$ in a $Na_2O-K_2O-TiO_2-ZnO-Al_2O_3-SiO_2-Cl$ glass is replaced on an equal mole percent basis by $Li_2O$, the advantageous effects may include the following:

(a) lower expansion coefficient of the anhydrous base glass;

(b) hydration of the surface glass layer to a lower water content;

(c) a lower rate of thickness penetration of the ion-exchange reactions in an aqueous solution;

(d) a lower expansion coefficient of the integral ion-exchanged surface layer; and (e) a more durable integral ion-exchanged surface layer.

The advantageous effects (c), (d) and (e) are at least partly the consequence of effect (b). When the alkali metal oxides are batched in optimized proportions in the base glass, further advantageous effects include:

(a) a more complete exchange of alkali metal ions in the integral ion-exchange surface layer by $Ag^+$ ions from the aqueous ion-exchange solution; and (b) closely matched thermal expansion coefficients between the body portion and the integral ion-exchanged surface layer of the ion-exchanged glasses of the present invention.

Thickness and Properties of the Image-Bearing Surface Layer

One of the advantages of the present products which are deemed particularly suitable for use as permanent mass storage media and/or as phototools is based on the fact that the permanently darkened image upon exposure to high energy beam is within the integral ion-exchanged surface layer which is part of the monolithic parent anhydrous glass body. In other words, the information bearing surface layer is in (not coated on) the glass substrate. At least equally significant is the fact that any desirable thickness of the integral ion-exchanged surface layer ranging from a small fraction, e.g., about one micrometer, to the total thickness of the parent anhydrous glass body may be produced precisely and repeatedly.

The depth of the E-beam darkened image does not exceed the penetration depth of the fast electrons. Bethe ranges which are conventionally defined as the path lengths through which the energy of electrons reduces to zero are about 1.2, 3.7, 5.2, 8.7 and 12.8 micrometers for electrons with accelerating potentials of 10 kv, 20 kv, 25 kv, 35 kv and 45 kv, respectively. On the other hand, the penetration depths of ion beams and far-uv are in general less than one micrometer.

It is desirable for some applications that the thickness of the information bearing layer in the IIES layer be limited by the depth of penetration of high energy beams and not by the thickness of the ion-exchanged surface layer. On the other hand, for various reasons such as improved line definition, better edge acuity and minimum linewidth delineated by a focused electron beam, it is desirable in many applications that the thickness of the silver (and copper) ion-exchanged surface layer is less than the Bethe range and/or is only a small fraction of the Bethe ranges.

The thickness of the E-beam sensitive integral ion-exchange surface layer of the HEBS glass articles is equal to that of silver (and copper) ion-exchanged surface layer which is in turn equal to, or less than, the depth of hydration. The depth of hydration is herein defined as the penetration depth of ion-exchange reactions. Ion-exchange reactions include the exchange of $Ag^+$ ions for alkali metal ions in glass, as well as hydration and/or an exchange of $H^+$ and/or $H_3O^+$ ions for alkali metal ions in the base glass.

Since the hydration front is clearly observable under a microscope in a cross-section which is perpendicular to the glass surface that contacted the aqueous ion exchange solution, the thickness of the hydrated layer was measured from photomicrographs of thin cross-sections of the HEBS glass articles.

The penetration depth of hydration/ion-exchange reactions has been measured for a number of HEBS glass article samples which were ion exchanged for various durations from 0.5 hours up to 16 hours. It has been found that the penetration depth of hydration/ion-exchange reactions is proportional to the square root of the duration of the ion-exchange reactions, and consequently, an accurate value of the thickness of the hydrated layer corresponding to an ion exchange duration of 0.5 hours or less may be verified and/or calculated from the thickness values of samples which have been ion exchanged for longer durations.

The measured values of the thickness of the hydrated layers are 1.7, 3.8 and 7.3 micrometers in Plates 6D, 3D and 4D of Example 2, respectively.

It has been determined that the rate of thickness-penetration of ion-exchange reactions is strongly dependent on the parent anhydrous glass compositions. In general, the rate of penetration of ion-exchange reaction/hydration reduces substantially via either one or more of the following compositional alterations:

(1) lowering the total concentration of alkali metal ions;

(2) replacing the larger alkali metal ions by the smaller ones; particularly effective is the replacement of sodium and/or potassium ions by lithium ions. An example of such an effect is illustrated by the measured thickness values cited above. Namely, the thickness values reduce from 3.8 micrometers to 1.7 micrometers in going from the parent anhydrous glass of the exemplary composition 3 of Table I of Example 1 to the exemplary composition 6 of Table I of Example 1. Exemplary glass composition 3, on the mole percent oxide basis contains 10.5% $Na_2O$ and 3.3% $K_2O$, whereas exemplary glass composition 6 contains 3.9% $Li_2O$, 6.2% $Na_2O$ and 3.3% $K_2O$;

(3) an increase in concentrations and/or addition of one or more oxides selected from ZnO, $TiO_2$, PbO, $Al_2O_3$ and $ZrO_2$ in the batch of the glass melts for the base glass composition; and (4) replacing, on the mole percent oxide basis, a portion of silica by one or more of the oxides selected from $TiO_2$, ZnO, $Al_2O_3$, PbO and $ZrO_2$. An example of the effect of replacing silica by titanium oxide is illustrated by the measured thickness values cited above. Namely, the rates of penetration of the ion-exchange reactions reduce from 7.3 micrometers per 0.5 hour to 1.7 micrometers per 0.5 hour in going from the parent anhydrous glass of exemplary composition 4 to the exemplary composition 6 (the exemplary glass compositions 4 and 6 of Table I of Example 1 contain 1.5 mole percent and 4.4 mole percent $TiO_2$, respectively).

As can be expected, the rate of penetration of ion exchange reactions increases with increasing temperature of the ion-exchange reactions. The thickness values of the hydrated layers are 3.4 and 4.4 micrometers in Plates 37A and 37B of Example 2, respectively, that were ion exchanged in identical solutions at 310° C. and 320° C.

It has also been determined that the rate of penetration of ion-exchange reactions is strongly dependent on the ingredients of the ion-exchange solution. In particular, the rate of penetration decreases rapidly with an increasing pH value of the aqueous ion-exchange solution.

Through the choice of base glass composition, ingredients and acidity of the aqueous ion-exchange solution and reaction temperature and duration, there is no difficulty in reproducing precisely the thickness of ion-exchanged surface layer of about 2 micrometer and/or less. It is thus desirable to explore the theoretical as well as the practical limits on the minimum thickness of the silver (and copper) ion-exchanged surface layer which may render a net optical density (i.e., information carrying optical density) of 2 or more.

It is known that the covering power of silver grains in chemically developed photographic silver halide emulsions increases with decreasing grain size down to sizes of less than 0.04 micrometer and that the specific gravity of the chemically developed silver grains is about 2.5 $g/cm^3$ which is much less than that of the compact silver metals. If the above mentioned knowledge (which is pertinent to photographic silver halide emulsions) is applicable to the ion-exchanged products of the present invention, the saturation optical density within an ion-exchanged surface layer can be estimated from the improved Nutting expression which relates the saturation optical density in a photographic deposit to the size and number of silver grains. The improved Nutting expression employed is an empirical equation which has been described by W. Romer, et al. in the *Journal of Photographic Science*, Volume 11, pages 132–135 (1963).

It has been determined that the concentration of silver ions in an ion-exchanged surface layer readily exceeds 10 mole percent $Ag_2O$, i.e., about 30% $Ag_2O$ by weight, provided that the parent anhydrous glass contains more than 10 mole percent total alkali metal oxides, and that proper combinations of the base glass compositions, the ingredients of the ion-exchange solution and the conditions of the ion-exchange reactions exist. It has also been determined that the sizes of the AgCl-containing and/or $Ag_2O$-containing and/or $Ag^+$ ion-containing microcrystals and/or microphases within the ion-exchanged surface layer is in general less than about 0.02 micrometer.

Based on the facts stated immediately above, it has been estimated, using the improved Nutting expression, that a saturation optical density of 3 or more can in principal be obtained within a surface layer of 0.1 micrometer, provided that all the silver ions in the ion-exchanged surface layer can be reduced through a prolonged exposure to high energy beams. With a finite E-beam exposure dosage, e.g., $5 \times 10^{-5}$ coulomb/cm$^2$, only a fraction of the reducible silver ions in the inventive product is transformed into silver specks of molecular dimension and/or minute silver metal particles. Therefore, an ion-exchanged surface layer of thickness more than 0.1 micrometer will in general be necessary to secure an optical density of 3 in a direct E-beam writing mode. A direct E-beam writing mode is defined herein as a mode of recording wherein an image with a high/good contrast is produced by exposure to an electron beam without any requirement for a subsequent development and/or image enhancement step.

It is most desirable to increase the fraction of silver ions which are reduced to silver metal specks and/or particles by a finite exposure-dosage of electron beams. Two approaches are realized and are elaborated in the paragraphs immediately below.

In the first approach, E-beam sensitivity of the ion-exchanged surface layer is increased in a direct writing mode through proper combinations of the various constituents of glass compositions, the ingredients of the ion exchange solution and the condition, i.e., temperature and duration of the ion-exchange reactions. Since it is the combination of these variables in the proper relationships that produce the HEBS glass articles having good sensitivity to electron beams and exhibiting insensitivity and/or inertness to actinic radiation, it is in general difficult to interpret the effects of any single variable. Nevertheless, notable improvements in the E-beam sensitivity are readily observed resulting from the inclusion of $TiO_2$ and/or chloride in the glass batches of the parent anhydrous glasses.

The inclusion of $TiO_2$ in otherwise $TiO_2$-free glasses may increase the E-beam sensitivity of the resulting HEBS glass articles up to more than 1,000 folds, provided proper combinations of other variables disclosed herein are achieved. The increase in the E-beam sensitivity with an increasing concentration of $TiO_2$ usually levels off quickly beyond a certain concentration of $TiO_2$. For example, the relative E-beam sensitivities of the inventive products whose photosensitivity curves have been depicted by curves A, B, C and D of FIG. 10 are approximately about 1:100:100:100, where the corresponding parent anhydrous glass compositions contain 0, 1.5, 3.0 and 4.4% $TiO_2$, respectively. In this particular case, an increase of about two order of magnitudes in the E-beam sensitivity results from the initial addition of 1.5 mole percent $TiO_2$, and a further increase in the concentration of $TiO_2$ in the glass melts of the anhydrous base glass does not have a strong effect on the E-beam sensitivity.

The addition of ZnO, $TiO_2$, PbO, $ZrO_2$ and/or $Al_2O_3$ in the glass batches of the inventive products can be advantageously employed to increase the chemical durability of the base glass and slow down the rates of the ion-exchange reactions and thus render a better control in reproducing a thin ion-exchanged surface layer, e.g., of 1 micrometer in thickness. It has been further determined that the addition and/or the increase in the concentrations of these oxides, $TiO_2$ in particular, not only slow down the rates of the ion-exchange reactions, but also prevent the formation of a leached surface layer which may otherwise form on top of the silver (and copper) ion-exchanged surface layer, i.e., the integral ion-exchanged surface layer. The leached surface layer, wherein most of the alkali metal ions are leached out instead of being exchanged by $Ag^+$ ions, has little or no sensitivity to electron beams. In the worst case, the leached surface layer may have a thickness comparable with or even exceeding the Bethe ranges of high voltage electron beams. Nevertheless, through proper combinations of the parent anhydrous glass compositions, the ingredients of the ion-exchange solution and ion-exchange reaction conditions, the thickness of the leached surface layer can be reduced to zero. Since the presence of a leached surface layer prevents the ion-exchanged surface layer from seeing the full E-beam exposure-dosage, an apparent increase in E-beam sensitivity results from the diminution of the thickness of the leached layer on top of the ion-exchanged surface layer.

The E-beam sensitivity of the integral ion-exchanged surface layer increases with increasing chloride concentration. It is desirable that the melting of the base glass batch of the present invention be done in a chlorine or chlorine-containing or chloride-containing atmosphere to increase the Cl content of the glass. Alternatively, a surface glass layer may be enriched or doped with chloride ions before and/or after the surface glass layer is ion exchanged with silver ion by one or more of the following methods:

(1) Heat-treat the glass surface having chloride or chlorine in contact therewith at temperatures in excess of the annealing point of the surface glass layer, and/or (2) laser assisted diffusion of chloride ions into the glass surface; namely, the glass surface layer having chloride or chlorine in contact therewith is heated point by point by a scanning laser beam, and/or (3) doping the surface glass layer with chloride from high voltage ion beams consisting of $Cl^-$ ions.

The amount of silver ions which are directly associated with chlorides, e.g., in the form of AgCl may constitute a small fraction up to 100% of the total silver ions in the integral ion-exchanged surface layer. Nevertheless, the E-beam sensitivity of the inventive product is in general increased by a factor of more than two, due to the addition of chloride in the batch of the base glass melt.

There may exist at least two mechanisms of enhancing the E-beam sensitivity due to the presence of chloride in the glass melts. First, silver ions in the AgCl-containing microphases and/or microcrystals are more susceptible to reduction by electron beams. Second, the E-beam exposed AgCl-containing microphases and/or microcrystals act as a catalyst during E-beam exposure on the silver ions which are not diretly associated with the chloride in glass, much like the heat development phenomenon described immediately below.

In a second approach to increase the fraction of silver ions which is reduced to metallic silver with a finite exposure dosage of electron beams, the optical density in the E-beam exposed areas of the HEBS glass articles is increased via a post heat treatment process or heat development step. Whereas the heat development step is found to increase the optical density of the E-beam exposed area, the areas not exposed to an electron beam show no change in transmittance and are totally unaffected by the post heat treatment. It is believed that heat causes the E-beam exposed AgCl in the AgCl-containing microphases and/or microcrystals to act as a catalyst on the silver ions dissolved in the glass of the integral ion-exchange surface layer and on the other ionic silver-compound-containing phases/crystals, i.e., $Ag_2O$-containing and/or $Ag^+$ ion-containing microphases/microcrystals, as well as on silver ions not directly associated with $Cl^-$ in the AgCl-containing microphases/microcrystals to form metallic silver specks and/or particles.

The heat development step typically consists of heating at least the surface glass layer, i.e., the integral ion-exchange surface layer, of the E-beam exposed HEBS glass articles to a temperature of about 100° C. for a few seconds, up to several hours. The heat development temperature is in general well below the annealing point of the ion-exchanged surface layer and also below the strain point of the parent anhydrous glass.

The post heat treatment to enhance the contrast of E-beam recorded image is not a necessary step for the products of the present invention to obtain values of optical density in excess of 2 within an integral ion-exchanged surface layer of thickness down to about and/or below 2 micrometers. However, the post heat treatment may be helpful to obtain adequate optical densities when approaching the limiting thickness of 0.1 micrometer for the surface layer and/or in reducing the required E-beam dosage.

Although the heat development step is a useful image contrast enhancement process, optical densities in excess of 3 are readily obtained without the heat development step. Therefore, the absorption spectra of FIGS. 1 and 3, and the characteristic curves of FIGS. 4 to 8, as well as the E-beam sensitivity plot of FIG. 2 discussed previously represent those of the direct E-beam writing mode, wherein the image is produced instantaneously upon exposure to electron beams without the post heat treatment.

The heat development step will in general represent an improvement in E-beam sensitivity of less than one order of magnitude over the E-beam sensitivity in the direct writing mode. Nevertheless, a chemical development process to develop surface relief images which is discussed immediately below, has been found to increase the E-beam sensitivity of the products of the present invention up to and beyond two orders of magnitude over the sensitivities of the colored image formation in the direct E-beam writing mode.

It has been found that latent images and/or latent patterns delineated by electron beams on HEBS glass articles, having little or no detectable optical density, can be developed into surface relief images and/or relief patterns of very high quality, through a brief immersion of the glass article bearing the latent image/pattern in an aqueous solution containing HF. Apparently, the rate of dissolution and/or etching of the integral ion-exchanged surface layer, by a HF containing solution, is substantially different between the E-beam exposed areas and the unexposed areas.

The latent images and/or latent patterns, which are suitable for the chemical development into relief patterns/images, are delineated by electron beams with exposure dosages which are sufficient to produce an optical density of more than about 0.01. The extent of thickness modulation, i.e., the aspect ratio in the relief pattern, is a function of the etching time and the concentration of HF in the chemical developer. In general, a longer etching time is necessary, when a lower concentration of HF solution is employed. The upper limit on the extent of thickness-modulation in the relief pattern is apparently related to the smaller value of either the Bethe-range of the electron beam or the thickness of the integral ion-exchanged surface layer. Since the minimum optical density in the E-beam generated image to render the latent images and/or latent patterns developable to relief images/patterns is very minimal, e.g., about 0.01, the accelerating voltage of the electron beams which are employed to delineate the latent images/patterns may be any value ranging from less than 5 kv to more than 50 kv.

Since the surface relief is permanent and durable, the potential applications of the products of the present invention includes phase gratings, surface relief holograms, and integrated optics.

Mass information may also be recorded in the HEBS glass articles in the form of surface relief, through an exposure to electron-image and a subsequent chemical development. A reflective coating deposited thereafter on the relief surface renders the recorded information retrievable optically in a reflection mode. Thus digital video disks, digital audio disks and the like can be produced utilizing the HEBS glass articles via the following three process steps: first, the digital information is recorded with an electron beam pattern generator, or is replicated using parallel exposure systems such as the 1:1 photocathode electron-image projection system or the demagnified electron-image projection system; second, the latent image generated from the exposure to electron beams is developed into a surface relief through a selective etching means; third, a reflective coating, e.g., thermally evaporated Al or Cr, is vacuum deposited on the relief surface.

The E-beam darkened/colored image within the ion-exchanged surface layer is due to the absorption of visible light by the silver specks therein of molecular dimensions and/or silver metal particles of less than a few hundred angstroms. The silver particles/specks in an oxidizing silicate glass matrix can often be redissolved at temperatures above about the annealing point of the glass matrix, i.e., of the ion-exchanged surface layer. The dissolution process may be explained as reoxidation of the silver particles/specks to ionic states at elevated temperatures by the oxide-glass constituents. The temperature at which redissolution takes place can be substantially lowered via either one or both of the following compositional modifications of the inventive products. First, when the HEBS glass articles of the present invention are prepared from more oxidized glass melts, the minimum temperature at which redissolution of silver particles/specks takes place is lowered. Consequently, whenever the erasure of the E-beam darkened image by heat is desirable, the glass batch of the parent glass melts shall contain oxidizing agents such as nitrates, e.g., at least part of the alkali metal oxide is added as alkali metal nitrate in the glass batches. Second, as the water content and/or the concentration of the silanol groups in the integral ion-exchanged surface layer increases, the annealing point of the ion-exchanged surface layer decreases, and thus the minimum temperature at which redissolution of silver particles takes place is lowered. For example, the redissolution temperature of silver particles in a durable silicate glass matrix containing little or no water (e.g., silanol groups) is about 600° C., whereas, the redissolution temperature of silver particles in the corresponding hydrated glass of the ion-exchange surface layer can be as low as or even below 250° C.

The E-beam sensitive surface layer contains in general a finite concentration of water/silanol groups, e.g., up to more than 6% by weight of $H_2O$. Consequently, the strain point, annealing point, and softening point of the ion-exchanged surface layer is sufficiently lower, e.g., up to and/or more than 300° C. lower than the corresponding temperatures of the anhydrous base glass. The redissolution of silver particles can in general be carried out at temperatures where the anhydrous base glass body is totally rigid. Therefore, no distortion of the surface figures of the glass articles may occur during the heat-erasure treatment, particularly in cases where the ion-exchanged surface layer is limited to less than a few micrometers. The strain point, annealing point and softening point of glasses are conventionally defined as the temperatures at which the viscosities of the glasses are $4 \times 10^{14}$ poises, $2.5 \times 10^{13}$ poises and $4 \times 10^7$ poises, respectively.

Flood erasure, i.e., erasure of all the recorded bits within a macroscopic area of a HEBS glass article, such as within an entire disk, can be achieved readily by contacting at least the surface portion of the recorded disk with a heat source. On the other hand, bits-by-bits erasure as well as flood erasure can be done with high intensity light beams which are absorbed by the E-beam darkened image and/or the glass constituents of IIES layer.

Among the most prominent absorption bands due to the glass constituents of the IIES layer are those due to vibrational motions of $SiO_4$ tetrahedron, water and/or silanol groups, alkali metal ions and silver ions. The stretching vibrations of SiO bonds give rise to a broad absorption band in the region of 8–11.5 micrometers. This very intense absorption band/bands coincides with the wavelength of $CO_2$ lasers. A $CO_2$ laser may be employed to erase the E-beam recorded image and/or data within the ion-exchanged surface layer of the HEBS glass article. The fundamental and the combination modes of water and/or silanol groups give rise to absorption in the wavelength ranges of 2.7–3.6 $\mu$m and 1.8–2.6 $\mu$m, respectively.

Mechanism of Darkening by High Energy Beams

The composition and/or microstructure of the AgCl-containing microcrystals and/or microphases of the present inventive products are undoubtedly different than the various photosensitive AgCl crystals present in conventional photographic emulsions, photochromic glasses of U.S. Pat. Nos. 3,208,860 and 4,102,693, and photosensitive colored glasses exhibiting alterable photo-anisotropic effects of U.S. Pat. Nos. 4,191,547 and 4,297,417.

The mechanism of E-beam darkening as well as the compositional and/or structural origin within the microcrystals and/or microphases of the present products in eliminating the photosensitivity are not totally understood. It is believed, based upon present findings, that the energy band gap between the valence band and the conduction band of the AgCl-containing microcrystals and/or microphases within the ion-exchanged surface layer of the HEBS glass articles increases due to the addition of the photosensitivity inhibitors, e.g., $TiO_2$, in the glass melts of the anhydrous base glasses. As long as the energy band gap is sufficiently large, e.g., sufficiently larger than the quanta of impinging radiation, the photosensitivity is eliminated.

It is believed that the energy W, which is the work necessary to remove an electron from a contacting silver metal particle/speck into a conduction level of a AgCl-containing microcrystal or microphase of the inventive products, increases as said band gap increases. In other words, the conduction energy levels of the AgCl-containing microcrystals and/or microphases of the inventive products are raised relative to the valence band of the microcrystals and/or microphases, and are also raised relative to the filled conduction levels of the contacting metallic silver particles and/or specks, via the addition of photosensitivity inhibitors in the glass melts.

The energy W is the minimum quanta of energy required to bleach or dissolve silver atoms or specks of silver metal which are in contact with the AgCl-containing microcrystals and/or the microphases. For example, the latent image of a AgCl-photographic emulsion having a W value of 1.3 ev can be bleached by red light. Therefore, when the value of W of E-beam exposed, silver specks-containing, microphases and/or microcrystals is greater than all the quanta of radiations, including visible light and ultraviolet, the E-beam darkened image within the HEBS glass articles is inert to actinic radiation, and can not be bleached by red light or other actinic radiations, including uv and longer wavelengths.

AgCl-containing microcrystals and/or microphases within the IIES layer act as very effective traps for the secondary and tertiary electrons that are generated by the high voltage E-beam, that is the primary electrons, in the silicate glass network. Apparently very efficient mechanisms of reduction of silver ions by E-beam exist.

The direct E-beam writing mode is the manifestation of a print-out effect of the integral ion-exchanged surface layer. The reduction of silver ions in the E-beam sensitive IIES layer by a high voltage electron beam may have a quantum efficiency of up to or even in excess of 1,000 due to the large number of secondary and third electrons. Apparently each primary electron causes the reduction of up to or more than one thousand silver ions within the ion-exchanged surface layer of the present invention, provided that the accelerating potential of the electron beam is in excess of about 10 kv. A print-out effect is herein defined as the direct reduction, of silver ions by high energy beams to silver metal particles and/or specks, which results in an image of high/-good contrast without any requirement for a subsequent development and/or image enhancement step.

The print-out effect is expected to take place, whenever the integral ion-exchanged surface layer of the HEBS glass article is bombarded with a high energy beam which generates scattered electrons within the surface layer. Besides the high voltage electron beams, other high energy beams operable on the HEBS glass articles include ion beams (e.g., $H^+$, $H_2^+$, $Li^+$, $He^+$, $Ar^+$, $F^-$ and $Cl^-$ ions), atomic beams (e.g., spattered and/or thermally evaporated aluminum), molecular beams and X-ray.

The print-out effect of the integral ion-exchanged surface layer upon exposure to actinic radiation such as depicted by curves A, F and G of FIG. 10 is not desirable, and the absence of such photosensitivity is one of the primary characteristics of the products of the present invention. Nevertheless, it is possible to adjust the value of energy W which is defined in the preceding paragraphs above to a proper value that the image within the ion-exchanged products is permanent under prolonged exposure to intense visible light and/or near-uv, yet, the print-out effect of the integral ion-exchanged surface layer is effective using the radiation having wavelengths of less than about 300 nm as a write beam. A suitable recording light beam is far-uv light, e.g., in the wavelength range of about 180 nm to 200 nm. The advantages of employing the far-ultraviolet radiation in the wavelength range of about 180 nm to 200 nm are as follows: (1) the intense absorption of the radiation by the HEBS glass articles effectively limits the far-uv darkened image within a thickness of less than one micrometer; (2) either excimer lasers at 193 nm or the low-pressure mercury line at 185 nm can be employed as the write beam; (3) the optics can be fabricated from high-purity quartz.

Ion Exchange Reactions

The exact chemical reactions during the ion-exchange process depend on the specific base glass composition, the ingredients of the ion-exchange solution as well as the temperature and duration of the ion-exchange reactions. Although the exact chemical reactions are not known with complete certainty, the following equations describe those reactions, at elevated temperatures, which appear most reasonable and common to all alkali metal silicate glasses immersed in aqueous ion-exchange solutions of the present invention.

$$H^+_{solu} + SiO^- M^+_{GL} \longrightarrow SiOH + M^+_{solu} \quad (1)$$

$$Ag^+_{solu} + SiO^- M^+_{GL} \longrightarrow SiO^- Ag^+_{GL} + M^+_{solu} \quad (2)$$

Ions with the subscripts "solu" are in the ion exchange solution. Compounds and ions with the subscript "GL" are in the base glass. $M^+$ represents alkali metal ions, such as $Na^+$ ion. At least a portion of the alkali metal ions $M^+_{GL}$ in the glass network of the surface layer are replaced by silver ions $Ag^+_{solu}$ and hydrogen ions $H^+_{solu}$ of the aqueous ion-exchange solution According to the Law of Mass Action $$\frac{[SiOH][M^+_{solu}]}{[H^+_{solu}][M^+_{GL}]} = K_1 \text{ and} \quad (1a)$$

$$\frac{[Ag^+_{GL}][M^+_{solu}]}{[Ag^+_{solu}][M^+_{GL}]} = K_2 \quad (2a)$$

$K_1$ and $K_2$ are the equilibrium constants of reactions (1) and (2) respectively. Combining equations (1a) and (2a), the concentration of silver ions in the integral ion-exchanged surface layer is obtained. Namely, $$[Ag^+_{GL}] = \frac{K_2}{K_1}[SiOH]\frac{[Ag^+_{solu}]}{[H^+_{solu}]} \quad (3)$$

$K_1$ is a function of the differences between the chemical potentials of hydrogen ions in glass and those of the various species of alkali metal ions in the glass matrix. $K_2$ relates to the chemical potentials of silver ions in glass relative to those of the various species of alkali metal ions in the matrix of the glass network.

For at least some of the alkali metal-titanium-zinc-alumino-silicate glasses, it has been determined that the smaller alkali metal cations in the glass network favors a greater extent of ion exchange by silver ions and hydrogen ions. Thus for example, a larger fraction of $Na^+$ ions in glass is exchanged by $Ag^+$ ions and $H^+$ ions than the fraction of $K^+$ ions being exchanged. It has been further determined that the relative amounts of silver ions and hydrogen ions being exchanged into the glass network is strongly dependent upon the acidity of the ion-exchange solution, and that the total amount (on the mole percent oxide basis) of alkali metal ions diffused out of the glass network of a given glass composition is relatively insensitive to the acidity of the aqueous ion exchange solution.

From equation (3), it is seen that the concentration of silver ions in the integral ion-exchanged surface layer is proportional to the concentration ratio $[Ag^+_{solu}]:[H^+_{solu}]$ of silver ion to hydrogen ion in the aqueous ion-exchange solution, and relates to the relative chemical potential of silver ions and hydrogen ions in glass, and is proportional to the concentration of silanol groups in glass.

The concentration of silanol groups, as is indicated in equation (3), is proportional to the concentration ratio $[H^+_{solu}]:[Ag^+_{solu}]$ hydrogen ions to silver ions in the aqueous ion-exchange solution. However, the concentrations of silanol groups are not determined solely by the ion-exchange reaction, since the silanol groups are also the reaction products of the glass hydration which occurs concomitantly with and/or precedes the ion exchange reactions of equations (1) and (2). The hydration reaction can be represented by equation (4).

$$SiOSi + H_2O \rightleftharpoons 2\,SiOH \quad (4)$$

In the ion-exchanged surface layer, some of the silanol groups may recombine while cooling in the autoclave to room temperature (as represented by the shorter arrow of equation (4), pointing left). It is conceivable that the forms of molecular water which are present in steam hydrated glasses (i.e., alkali metal silicate glasses having been hydrated in the gas phases), and were described by the present inventor in *Journal of Non-Crystalline Solids*, 41 (1980) 381-398, may exist in the ion-exchanged surface layer at room temperature. Namely, molecular water may exist in resonance forms in equilibrium with hydrogen bonded silanol groups and hydroxyl groups.

The amount of total water in the integral ion-exchanged surface layer is readily measurable experimentally and is a function of the glass composition, the ingredients of the aqueous ion-exchange solution and the temperature of the ion-exchange reactions. The total water content in ion-exchanged glasses was determined experimentally from the weight loss on ignition at temperatures exceeding 800° C. The concentrations of various species of water including free silanol groups, hydrogen bonded silanol groups and molecular water in the ion-exchanged surface layer can be determined from near infrared spectra. However, the total water content as well as the concentrations of the various species of water at elevated temperatures during the ion-exchange reactions are in general not known precisely, since the ion-exchange reactions are not frozen instaneously from the elevated temperature. It is conceivable that the concentrations of the silanol groups at the reaction temperature increase with an increasing temperature of ion-exchange reactions in an aqueous solution. Namely, the extent of forward reaction (toward right) in equation (4) increases at a higher reaction temperature. Due to the added concentration of silanol groups from hydration, the forward reaction of equation (1), i.e., the exchange of hydrogen ions for alkali metal ions in glass is suppressed. Consequently, more alkali metal ions in the glass network are available for exchanging with silver ions of the contacting aqueous solution. As a result, the concentration of silver ions in the integral ion-exchanged surface layer increases with the temperature of the ion-exchange reactions.

Other operational parameters which have been employed to alter (or increase) the concentration of silver ions in the ion-exchanged surface layer are the concentrations of silver ions and hydrogen ions/hydronium ions in the aqueous ion-exchange solution. (Even when the hydrogen ion, i.e., proton is the diffusion species, the hydronium ion is the predominant form of the proton in aqueous solutions, however, for the convenience of the presentation, hydronium ion and hydrogen ion are used herein interchangeably.) As is expected from equation (3), when the concentration of silver ions in the aqueous solution is kept constant, the concentration of silver ions in the ion-exchanged surface layer increases as the concentration of hydrogen ions in the aqueous ion-exchange solution decreases. On the other hand, when the acidity of the aqueous solution is kept constant, the concentration of silver ions in the ion-exchanged surface layer increases with an increasing concentration of silver ions in the aqueous solution.

It has been determined that as the acidity of the aqueous ion-exchange solution is increased, the water content of the ion-exchanged surface layer increases. All the diffusion species in glass, e.g., alkali metal ions, $H^+$ (and/or $H_3O^+$) and $Ag^+$ have larger values of diffusion coefficients in a more highly hydrated glass layer, and diffuse across the ion-exchanged surface layer more quickly. Consequently, the rate of penetration of silver ions into the glass article in the thickness dimension increases with an increasing acidity of the aqueous ion-exchange solution.

As is apparent from the foregoing discussion, the important effects of the concentration of hydrogen ions in the aqueous ion-exchange solution on the products of the present invention are at least twofold. Namely, as the acidity of the aqueous solution decreases, the penetration rate of the ion-exchange reactions decreases, and the concentration of silver ions in the ion-exchanged surface layer increases.

It is to be observed that there exists a lower limit on the concentration of hydrogen ions in the aqueous ion exchange solution. This is because the etching and/or dissolution of silicate glass network by the aqueous ion exchange solution become significant when the pH values of the aqueous solution exceeds about 3 to 7 depending on the glass composition. It is thus desirable to employ a buffered solution when the pH value of the aqueous solution employed is in excess of unity. A buffered solution is particularly desirable when the pH value of the aqueous ion-exchange solution is in excess of 2. Copper salts, such as $Cu_2O$ and $Cu(NO_3)_2$, have been found to be good buffering agents for the ion-exchange solution. The etching and/or dissolution of the glass article can be further retarded through the inclusion in the aqueous ion exchange solutions of cations, $SiO_2$ in particular, of the glass constituents. Soluble silicates, e.g., $Na_2SiO_3$ and $K_2SiO_3$, are desirable sources of $SiO_2$, and silica gel is a convenient source of $SiO_2$.

The temperature of the ion-exchange reactions is another important parameter in producing the products of the present invention. The concentration of silver ions in the ion-exchanged surface layer as well as the penetration rate of the ion-exchange reactions increase with an increasing temperature of the ion-exchange reactions.

The applicable range of the temperature of the ion exchange reactions is closely related to the anhydrous base glass compositions. The lower limit of the reaction temperature is observed at about 250° C. to 400° C. below the strain point of the anhydrous base glass and the upper limit is at about the annealing point of the base glass. Preferably the ion-exchange reaction is carried out between about 200° C. and 400° C., most preferably between about 240° C. and 360° C. At high temperatures, such as 360° C. or higher, the ion-exchange reaction is very rapid, and makes it difficult to control the depth of penetration of the reaction.

Lithium ion is present in the ion-exchange solution, to advantage, during the ion-exchange reaction. To some extent lithium ions appear to limit hydration of the glass. Lithium is conveniently added to the ion-exchange solution as $LiNO_3$, but other soluble lithium salts can be used. We have not discovered a critical lithium concentration range, and for convenience we have generally used 200 g of $LiNO_3$ per liter of ion-exchange solution.

The ion-exchange reaction can be conducted in a molten salt bath containing $Ag^+$ ion and free of water. Preferably the salt bath is prepared from silver salts with relatively low melting points, such as $AgNO_3$. $LiNO_3$, $NaNO_3$, $KNO_3$, $Cu(NO_3)_2$, and the like can be added to further reduce the melting point of the salt bath.

The invention may be further understood by reference to the following illustrative examples.

EXAMPLE 1

Table I below sets forth a group of batch glass compositions useful for the production of HEBS glass articles. The components of the base glass are expressed in approximate mole percent on the oxide basis. The compositions are stated to be in approximate mole percent since the proportions cited reflect direct calculations from weight percent of the batch ingredients, e.g., $Na_2O$ from $Na_2CO_3$ and/or $NaNO_3$. The sum of the individual ingredients closely approaches 100 mole percent, and, for practical purposes, the amounts listed (other than halides) can be deemed to represent the mole percent of the components in the glass. The actual batch ingredients (other than halides) can comprise any materials, either the oxides or other compounds, which, when melted together, will be converted into the desired oxide composition in the proper proportions. The halides in the batch were commonly included in alkali metal containing compounds. Inasmuch as it is not known with which cation(s) the halides are combined in the glass melt, they are simply reported as F, Cl, Br and I in accordance with conventional practice in the glass art. Due to evaporation of halides during melting, the amounts of halides in the glass are in general less than the amounts listed in Table I which are calculated from weight percent of the batch ingredients.

Glasses of the chemical compositions specified in Table I below were prepared in the following manner. The batch ingredients were thoroughly blended together, in a ball mill to assist in securing a homogeneous melt, and the mixture deposited in platinum crucibles (some melts were melted in quartz or alumina crucibles). The crucibles were then placed in a laboratory furnace operating at about 1300°-1550° C. The batches were melted for 2-24 hours, and the melts were then poured into patties and annealed. Plates were prepared by grinding the patties to glass plate of uniform thickness, about 1-2 mm thick, and polishing the surfaces to optical quality surfaces.

These plates were then subjected to ion-exchange reactions for the purpose of replacing at least a portion of the alkali metal ions within a surface layer of the glass plates by silver ions as described in Example 2.

TABLE I

| GLASS NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| $SiO_2$ | 72.5 | 71.4 | 70.0 | 72.9 | 71.8 | 70.7 | 69.1 | 67.5 | 72.3 | 72.1 | 71.9 | 72.7 | 72.5 | 72.3 | 70.9 | 73.2 | 68.9 | 69.3 | 71.0 | 70.3 | 72.2 | 72.6 | 69.9 | 70.9 | 74.0 | 73.8 | 68.3 | 61.8 | 59.8 | 58.8 |
| $Li_2O$ | | | | 4.1 | 4.0 | 3.9 | 4.0 | 4.0 | | | | 4.0 | 4.0 | 4.0 | 4.2 | 4.1 | 9.2 | 4.0 | 4.1 | 4.0 | | 4.0 | 4.0 | 4.0 | 4.1 | | | | | |
| $Na_2O$ | 10.9 | 10.7 | 10.5 | 6.4 | 6.3 | 6.2 | 6.3 | 6.3 | 10.8 | 10.8 | 10.8 | 6.4 | 6.4 | 6.4 | 6.6 | 6.0 | | 6.3 | 6.4 | 6.7 | 10.8 | 6.4 | 6.3 | 6.7 | 6.5 | 10.9 | 10.3 | 10.3 | 10.3 | 10.3 |
| $K_2O$ | 3.4 | 3.4 | 3.3 | 3.4 | 3.4 | 3.3 | 3.4 | 3.4 | 3.4 | 3.4 | 3.4 | 3.4 | 3.4 | 3.4 | 3.6 | 3.4 | 6.1 | 3.4 | 3.5 | 3.4 | 3.4 | 3.4 | 3.4 | 3.4 | 3.5 | 3.4 | 3.2 | 3.2 | 3.2 | 3.2 |
| $TiO_2$ | 1.5 | 3.0 | 4.4 | 1.50 | 3.0 | 4.4 | 5.9 | 7.4 | 1.5 | 1.5 | 1.5 | 1.5 | 1.5 | 1.5 | 1.6 | 1.51 | 3.8 | 4.5 | 1.5 | 1.5 | 1.5 | 1.5 | 4.5 | 1.5 | | | | 1.5 | 4.5 | 1.5 |
| $Ta_2O_5$ | | | | | | | | | 0.27 | 0.54 | 0.8 | 0.27 | 0.54 | 0.8 | 1.1 | | | | 0.57 | 0.56 | | | | 0.56 | | | | | | |
| $Al_2O_3$ | 1.2 | 1.2 | 1.2 | 1.2 | 1.2 | 1.2 | 1.2 | 1.2 | 1.2 | 1.2 | 1.2 | 1.2 | 1.2 | 1.2 | 1.3 | 1.2 | 1.2 | 2.3 | 2.4 | 2.4 | 0.6 | 0.6 | 1.2 | 1.2 | 1.2 | 1.2 | 1.2 | 1.2 | 1.2 | 1.2 |
| $ZnO$ | 7.3 | 7.2 | 7.1 | 7.4 | 7.2 | 7.1 | 7.2 | 7.2 | 7.3 | 7.3 | 7.3 | 7.3 | 7.3 | 7.3 | 7.6 | 7.4 | 6.9 | 7.2 | 7.4 | 7.3 | 7.3 | 7.3 | 7.2 | 7.3 | 7.5 | 7.4 | 6.9 | 6.9 | 6.9 | 6.9 |
| $La_2O_3$ | | | | | | | | | | | | | | | | | | | | | | | | | | | | 4.0 | | 4.0 |
| $PbO$ | | | | | | | | | | | | | | | | | | | | | | | | | | | | | | |
| $Y_2O_3$ | | | | | | | | | | | | | | | | | | | | | | | | | | | | | | |
| $Nb_2O_5$ | | | | | | | | | | | | | | | | | | | | | 1.0 | 1.0 | 0.6 | 0.64 | | | | 1.0 | 3.5 | 4.0 |
| $ZrO_2$ | | | | | | | | | | | | | | | | | | | | | | | | | | | | | | |
| $CaO$ | | | | | | | | | | | | | | | | | | | | | | | | | | | | | 0.5 | |
| $WO_3$ | | | | | | | | | | | | | | | | | | | | | | | | | | | | | | |
| $MgO$ | | | | | | | | | | | | | | | | | | | | | | | | | | | | | | |
| $SrO$ | | | | | | | | | | | | | | | | | | | | | | | | | | | | | | |
| $BaO$ | | | | | | | | | | | | | | | | | | | | | | | | | | | | | | |
| $B_2O_3$ | | | | | | | | | | | | | | | | | | | | | | | | | | | 7.2 | 7.2 | 7.2 | 7.2 |
| $P_2O_5$ | | | | | | | | | | | | | | | | | | | | | | | | | | | | | | |
| $Rb_2O$ | | | | | | | | | | | | | | | | | | | | | | | | | | | | | | |
| $Cs_2O$ | | | | | | | | | | | | | | | | | | | | | | | | | | | | | | |
| Cl | 3.1 | 3.1 | 3.0 | 3.1 | 3.1 | 3.0 | 3.0 | 3.1 | 3.1 | 3.1 | 3.1 | 3.1 | 3.1 | 3.1 | 3.2 | 3.1 | 3.8 | 3.0 | 3.1 | 3.7 | 3.1 | 3.1 | 3.0 | 3.7 | 3.1 | 3.1 | 3.1 | 3.1 | 3.1 | 3.1 |
| Br | | | | | | | | | | | | | | | | | | | | | | | | | | | | | | |
| I | | | | | | | | | | | | | | | | | | | | | | | | | | | | | | |

| GLASS NO. | 31 | 32 | 33 | 34 | 35 | 36 | 37 | 38 | 39 | 40 | 41 | 42 | 43 | 44 | 45 | 46 | 47 | 48 | 49 | 50 |
|---|---|---|---|---|---|---|---|---|---|---|---|---|---|---|---|---|---|---|---|---|
| $SiO_2$ | 70.7 | 69.8 | 69.8 | 69.8 | 66.2 | 62.4 | 69.5 | 69.5 | 69.5 | 69.9 | 70.4 | 70.3 | 70.4 | 70.4 | 70.4 | 69.3 | 72.5 | 72.7 | 70.8 | 59.3 |
| $Li_2O$ | 3.9 | 3.9 | 3.9 | 3.9 | 3.9 | 6.3 | 6.2 | 6.2 | 6.2 | 6.2 | 4.3 | 7.1 | 4.3 | 4.8 | 4.3 | 7.3 | | | 4.9 | 9.4 |
| $Na_2O$ | 6.2 | 6.2 | 6.2 | 6.2 | 6.2 | 6.2 | 6.2 | 6.2 | 6.2 | 6.1 | 6.3 | 3.4 | 4.8 | 3.4 | 4.8 | 6.3 | 10.9 | 6.4 | 5.1 | 8.2 |
| $K_2O$ | 3.3 | 3.3 | 3.3 | 3.3 | 3.3 | 2.3 | 2.3 | 2.3 | 2.3 | 2.3 | 3.3 | 3.5 | 4.8 | 4.4 | 3.3 | 1.3 | 3.4 | 7.9 | 3.4 | 3.3 |
| $TiO_2$ | 1.5 | 1.5 | 1.5 | 1.5 | 1.5 | 0.5 | 4.4 | 4.4 | 4.4 | 4.2 | 4.4 | 4.4 | 4.4 | 4.4 | 4.4 | 4.4 | | | 4.5 | 4.4 |
| $Ta_2O_5$ | 0.5 | | | | 1.0 | | | | | | | | | | | | | | | |
| $Al_2O_3$ | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.5 |
| $ZnO$ | 3.6 | 4.0 | 4.0 | 4.0 | 7.1 | 7.2 | 7.1 | 7.1 | 7.1 | 7.0 | 7.1 | 7.1 | 7.1 | 7.1 | 7.1 | 7.1 | 7.3 | 7.3 | 7.1 | 7.1 |
| $La_2O_3$ | 2.5 | | | | 1.5 | | | | | | | | | | | | | | | |
| $PbO$ | 3.5 | | | | | | | | | | | | | | | | | | | |
| $Y_2O_3$ | | 1.5 | | 2.0 | | | | | | | | | | | | | | | | |
| $Nb_2O_5$ | | | 0.5 | | | | | | | | | | | | | | | | | |
| $ZrO_2$ | | 4.0 | 4.0 | | | | | | | | | | | | | | | | | |
| $CaO$ | | | | | 1.0 | | | | | | | | | | | | | | | |
| $WO_3$ | | | | 4.0 | | | | | | | | | | | | | | | | |
| $MgO$ | | | | | | 10.8 | | | | | | | | | | | | | | |
| $SrO$ | | | | | 4.0 | | | | | | | | | | | | | | | |
| $BaO$ | | | | | | | | | | | | | | | | | | 1.3 | 1.5 | 2.5 |
| $B_2O_3$ | | | | | | | | | | | | | | | | | | | | |
| $P_2O_5$ | | | | | | | | | | | | | | | | | | | | |
| $Rb_2O$ | | | | | | | | | | 1.5 | | | | | | | | | | |
| $Cs_2O$ | | | | | | | | | | 1.5 | | | | | 1.4 | | 1.5 | | | |
| Cl | 3.0 | 3.0 | 3.0 | 3.0 | 3.0 | 3.0 | 3.0 | 3.0 | 3.0 | | 3.0 | 3.0 | 3.0 | 3.0 | 3.0 | 3.0 | 3.1 | 3.1 | | 3.1 |
| Br | | | | | | | | 0.2 | | | | | | | 1.4 | | | | | |
| I | | | | | | | | | 0.15 | | | | | | | | | | | |

Other base glass compositions can be prepared in accordance with the methods disclosed herein. For example, the following base glass compositions, comprising on a mole percent oxide basis (other than halides), can be prepared:

TABLE II

| | | | | | | | | | |
|---|---|---|---|---|---|---|---|---|---|
| $Li_2O$ | 6% | 8% | 7% | 0% | 7.8% | 1% | 5% | 6% | 2% |
| $Na_2O$ | 6% | 9% | 7% | 5% | 12% | 2% | 0% | 8% | 4% |
| $K_2O$ | 7% | 8% | 7% | 4% | 0% | 1.9% | 5% | 6% | 4% |
| $TiO_2$ | 31% | 21% | 10.5% | 0.5% | 1.2% | 1.2% | 0.5% | 1% | 3% |
| ZnO | 0% | 0% | 15% | 1% | 2% | 8% | 12% | 20% | 2% |
| BaO | 0% | 0% | 0% | 0% | 0% | 10% | 0% | 0% | 0% |
| $Al_2O_3$ | 0% | 0% | 0% | 0% | 14% | 8% | 7% | 1% | 1% |
| $SiO_2$ | 50% | 53% | 53.5% | 89% | 60% | 67.8% | 70.3% | 52% | 82% |
| Cl | 0% | 1% | 0% | 0.5% | 3% | 0.1% | 0.2% | 6% | 2% |

TABLE III

| | | | | | | | | |
|---|---|---|---|---|---|---|---|---|
| $Li_2O$ | 6% | 4% | 4.5% | 5% | 3% | 5% | 6% | 4% |
| $Na_2O$ | 5.5% | 4% | 9% | 5% | 6% | 5.5% | 0% | 7.5% |
| $K_2O$ | 6% | 4% | 4.5% | 2% | 4% | 5% | 8.8% | 5% |
| $TiO_2$ | 10% | 3% | 9.5% | 3% | 3% | 6% | 5% | 7.5% |
| ZnO | 4% | 9% | 3% | 8% | 6.5% | 6.5% | 10% | 7.5% |
| $Al_2O_3$ | 0.5% | 0.6% | 5% | 1% | 1.5% | 4% | 2% | 1% |
| $SiO_2$ | 65% | 75% | 63.5% | 75.5% | 74% | 67% | 67.5% | 65.8% |
| Cl | 3% | 0.4% | 1% | 0.5% | 2% | 1% | 0.7% | 1.7% |

Optionally, the base glass compositions can include $Rb_2O$, $Cs_2O$, MgO, CaO, SrO, BaO, PbO, $B_2O_3$, F, Br, I, $Ta_2O_5$, $ZrO_2$, $Nb_2O_5$, $La_2O_3$, $Y_2O_3$, $WO_3$ and mixtures thereof as set forth herein.

EXAMPLE 2

Polished and ground glass plates of the exemplary glass compositions of Table I were prepared. The plates had a nominal thickness of 2 mm. Each of the plates was ion exchanged in aqueous solution containing the chemicals and the amounts set forth in Table II below. The ion exchange reaction was conducted in an autoclave at the reaction temperature set forth in column G and for the duration set forth in column H. Each ion-exchanged plate is identified by a number corresponding to the number of the exemplary glass composition of Table I of Example 1 ion exchanged to produce the plate. When an exemplary glass composition was used as the base glass for two or more plates produced under different ion-exchange reactions employing different ion-exchange solutions or conditions, the resulting plates are identified with the number corresponding to the number of the exemplary glass composition used as a base glass and a letter to signify that different ion-exchange reactions were employed.

The values in columns A, B, C, D, E and F are the amounts, in grams or cc, of the identified chemicals added together with distilled water to make one liter of the aqueous ion-exchange solution.

Plate No. is the identification number of the ion-exchanged plate. The arabic number portion of the Plate No. identifies the Glass No. of the exemplary glass composition of Table I of Example 1 ion exchanged with an aqueous solution containing chemicals in the amounts identified in columns A through F and at the temperature and for the time set forth in columns G and H, respectively, to produce the Plate. For example, Plate 2A was prepared from exemplary Glass No. 2 of Table I of Example 1.

A is the grams of $AgNO_3$.
B is the grams of $Cu(NO_3)_2$.
C is the grams of $Cu_2O$.
D is the grams of $LiNO_3$.
E is the grams of silica gel.
F is the cc of 16N $HNO_3$.
G is the reaction temperature of the ion-exchange reaction.
H is the reaction time in minutes of the ion-exchange reaction.

| PLATE NO. | A | B | C | D | E | F | G | H |
|---|---|---|---|---|---|---|---|---|
| 41 | 20 g | 40.9 g | 5.7 g | 200 g | 1.1 g | 10.8 cc | 320° C. | 30 min. |
| 1,2A,3C, 4B,5,6 and 26A | 40 g | 40.9 g | 4.4 g | 200 g | 1.1 g | 8.9 cc | 310° C. | 40 min. |
| 1C,2,3, 4C,5C,12B, 47 and 48 | 20 g | 40.9 g | 4.4 g | 200 g | 1.1 g | 7.55 cc | 310° C. | 60 min. |
| 37,46 | 200 g | 55.6 g | 0 | 200 g | 2.2 g | 36.7 cc | 320° C. | 30 min. |
| 37A | 200 g | 55.6 g | 0 | 200 g | 2.2 g | 70 cc | 310° C. | 30 min. |
| 37B,38, 39 | 200 g | 55.6 g | 0 | 200 g | 2.2 g | 70 cc | 320° C. | 30 min. |
| 6A,7,8, 13,15,17, 18,19,20, 23,24,25, 26 and 27 | 200 g | 0 | 0 | 0 | 1.1 g | 44.4 cc | 310° C. | 60 min. |
| 1A,2B,3A, 4,5A,6B,9, 10,11,12 13A,14,16 21 and 22 | 200 g | 0 | 0 | 0 | 1.1 g | 60 cc | 310° C. | 20 min. |
| 1B,2C,3B, 4A,5B,6C, 9A,11A,12A, 14A,21A and 22A | 200 g | 25 g | 0 | 0 | 1.1 g | 70 cc | 305° C. | 60 min. |
| 3D,4D and 6D | 200 g | 0 | 0 | 0 | 1.1 g | 70 cc | 300° C. | 30 min. |

| PLATE NO. | A | B | C | D | E | F | G | H |
|---|---|---|---|---|---|---|---|---|
| | | | | -continued | | | | |
| 37C | | 200 g | 55.6 g | 0 | 200 g | 1.67 g | 70 cc | 320° C. | 30 min. |

EXAMPLE 3

Ground and polished glass plates of the exemplary glass compositions 3, 6, 10, 13, 14 and 21 of Table I above were ion exchanged at 310° C. for 0.5 hour in an aqueous solution consisting of 20 g $AgNO_3$+200 g $LiNO$+4.4 g $Cu_2O$+40.9 g $Cu(NO_3)_2$+7.55 cc of 16 N $HNO_3$+1.1 g silica gel/liter of the aqueous solution to produce Plates 3E, 6E, 10A, 13B, 14B and 21B.

The cuprous oxide reacted in the aqueous solution with the nitric acid therein. As results of the presence of $Cu_2O$, $Cu(NO_3)_2$ and $HNO_3$, the aqueous solution buffered at a pH value of about 2.75 and, the effective molar ratio $[Ag^+]:[H^+]$ of silver ions to hydronium ions was about 65 in the aqueous solution. The very large value of the molar ratio insures a very high concentration of $Ag^+$ ions within the ion-exchanged surface layer.

The presence of more than about 1.5 mole percent $TiO_2$ in the anhydrous base glasses as RS-Suppression agents effectively suppressed the spontaneous yellow or brown coloration which may otherwise be present in the ion-exchanged surface layer due to the very high concentration of silver therein. The RS-Suppression agents prevented spontaneous reduction of $Ag^+$ ions in glass upon ion-exchange reactions, to silver atoms and/or silver specks of molecular dimension and/or silver metal particles. $TiO_2$ also acted as a photosensitivity inhibitor in said solution ion-exchanged glasses and at the same time, greatly improved the intrinsic and apparent sensitivity of the ion-exchanged surface layer to electron beams. As a result, said solution ion-exchanged glasses are colorless and transparent, are highly sensitive to electron beams, and are insensitive/inert to the radiation in the spectral ranges of ultraviolet throughout visible and longer wavelengths.

The combination of a high pH value in the aqueous ion-exchange solution and the presence of $TiO_2$ in the parent anhydrous glasses, i.e., base glasses, additively slows down the penetration rate of the ion-exchange reactions, and confines the thickness of the ion-exchanged surface layer to less than a couple of micrometers for an ion-exchange duration of 0.5 hour.

Said ion-exchanged glass plates were exposed to focused electron beams having an accelerating voltage of 20 kv. Isolated lines as well as square patches were recorded in the direct writing mode. To prevent static charges built up on the glass surface during E-beam exposures, a thin conducting film of gold of about 100 Å in thickness was coated prior to the E-beam exposure onto the ion-exchanged glass samples in a JEOL JEE4C thermal evaporator. The conductive coating was removed after the E-beam exposure by an aqua regia wash. Other conductive coatings may be used, such as carbon coatings.

The measured line width is 0.8 micrometer within all the samples of 3E, 6E, 10A, 13B, 14B and 21B. Since the linewidths were measured with an optical microscope and the measured line widths of 0.8 micrometer is most likely the diffraction limited dimension, the true line widths in the glass samples are equal to or less than 0.8 micrometer.

Optical densities in excess of 2.5 at the absorption peak were obtained in the direct writing mode using 20 kv electron beams. The color of the darkened square areas in said ion-exchanged surface layer, observed under intense white light illumination in an optical microscope, is blue gray in Plates 6E and 3E, is magenta in Plates 10A, 13B and 14B, and is red in Plate 21B.

The above experiments demonstrate that various colors of E-beam darkened images can be obtained through the variation of the parent anhydrous glass composition alone. The above experiments also demonstrate that the minimum geometries, e.g., line width, that can be delineated in the products of the present invention is less than 1 micrometer and most likely less than 0.8 micrometer.

EXAMPLE 4

Several sets of parallel lines of about 0.8 micrometer line width were recorded with a variety of E-beam exposure dosages using the direct writing mode within Plate 6E of Example 3. The line patterns were then contact printed onto photoresist coated silicon wafers using mercury lines at 436 nm and 405 nm for the contact exposures of the photoresist. Visually (observed under a microscope) perfect line patterns were replicated in the developed photoresist, from the various masking patterns (i.e., sets of parallel lines whose optical density varied from one set to another) delineated with various E-beam dosages down to $3\times10^{-5}$ coulomb/cm$^2$.

As demonstrated, the HEBS glass articles of the present invention can be employed to make photomasks which are suitable for photo-fabrication of microelectronic circuits or the like, and that the minimum E-beam dosage which is necessary to delineate the masking patterns within the ion-exchange products of the present invention in the direct writing mode is equal to or less than about $3\times10^{-5}$ coulomb/cm$^2$.

EXAMPLE 5

Ground and polished glass plates of the exemplary glass compositions 13 and 14 of Table I were ion exchanged at 340° C. for 5 minutes in an aqueous solution composed of 40 g $AgNO_3$+200 g $LiNO_3$+4.4 g $Cu_2O$+40.9 g $Cu(NO_3)_2$+8.9 cc of 16 N $HNO_3$+1.1 g silica gel/liter of the aqueous solution to produce Plates 13C and 14C.

The aqueous solution buffered at a pH value of about 2.5 and the effective molar ratio $[Ag^+]:[H^+]$ of silver ions to hydronium ions was about 75 in the aqueous solution. $TiO_2$ and $Ta_2O_5$ which were included in the glass batches of the parent anhydrous glasses acted as photosensitivity inhibitors and/or RS-Suppression agents.

Plates 13C and 14C are colorless and transparent, highly sensitive to electron beams, and insensitive/inert to the radiation in the spectral ranges of visible and longer wavelengths.

Plates 13C and 14C were darkened in the direct writing mode by focused electron beams having an accelerating voltage of 20 kv. The measured line widths of the E-beam darkened lines were 0.8 micrometer. The color of the darkened square areas observed under an optical microscope with intense white light illumination is blue gray in Plate 13C and gray in Plate 14C.

Example 5 together with Example 3 serves to demonstrate the effect of the concentrations of the ingredients of the aqueous ion-exchange solution and/or the conditions of the ion-exchange reactions, in altering the E-beam induced coloration.

EXAMPLE 6

Ground and polished glass plates of the exemplary glass composition 6 of Table I were ion exchanged at 310° C. for 1 hour in an aqueous solution consisting of 200 g $AgNO_3$+70 cc of 16 N $HNO_3$+1.1 g silica gel/liter of the aqueous solution to produce Plate 6F.

The very high concentration of silver ions in the aqueous solution ensures a very high concentration of silver within the ion-exchanged surface layer.

The measured line widths of the E-beam darkened lines delineated with a focused electron beam operated at 20 kv in the direct writing mode are again 0.8 micrometer within the ion-exchanged surface layer. The color of the E-beam exposed areas observed under a microscope with intense white light illumination is reddish orange.

EXAMPLE 7

A set of six gratings consisting of three latent gratings and three absorption gratings were delineated by focused electron beams within Plate 6F of Example 6. The net optical density of the grating rulings were varied from about 0.01 to 2 among the various gratings delineated by the focused electron beams. The net optical density is less than about 0.05 in the latent gratings and is more than 0.5 in the absorption gratings. The variation in the net optical density of the gratings was obtained via the variation in the exposure dosage (i.e., the charge density) and the accelerating voltages of the electron beams. The accelerating voltages of the electron beams employed are 10 kv and 20 kv.

Said Plate 6F bearing the absorption gratings and the latent gratings therein was etched in an aqueous solution containing 2.5% by weight of HF at room temperature for 3 minutes. After being removed from the aqueous HF solution, the glass sample was rinsed with distilled water.

All of the six gratings delineated by the electron beams, within Plate 6 were transformed into surface relief gratings through selective etching in the HF solution. Surface relief gratings having a spatial frequency of 600 line-pairs per millimeter were obtained. Pure phase gratings which are colorless in the grating rulings were obtained from the latent gratings. Absorption phase gratings were made from the absorption gratings, namely, a thickness modulation due to surface relief is superimposed on the absorption gratings.

EXAMPLE 8

Ground and polished glass plates of the exemplary glass composition 6 of Table 1 were ion exchanged at 300° C. for 1 hour in an aqueous solution composed of 200 g $AgNO_3$+76.6 cc of 16 N $HNO_3$+55.5 g $Cu(NO_3)_2$+200 g $LiNO_3$+1.1 g silica gel/liter of the aqueous solution to produce Plate 6G.

The measured line widths of the E-beam darkened lines delineated with a focused electron beam operated at 20 kv in a direct writing mode are 0.8 micrometer within Plate 6G. The color of the E-beam exposed area observed under a microscope with intense white light illumination is magenta.

Example 8 together with Examples 6 and 3 serve to demonstrate that various E-beam induced colorations can be obtained within a variety of ion-exchanged glasses, i.e., HEBS glass articles, which are prepared from a single base glass, i.e., parent anhydrous glass composition.

EXAMPLE 9

Plate 6G of Example 8 bearing E-beam darkened areas was immersed into a preheated oil bath at 100° C. for 2 hours. The optical density of the E-beam darkened square patches was increased from 1.86 to 2.20 at the wavelength of the absorption peak due to the low temperature heat treatment. The areas unexposed to E-beam remained colorless and have a transmittance value of 91.5% throughout the visible spectral range, before and after the low temperature heat treatment. Example 9 demonstrates the possibility of utilizing a low temperature heat treatment to enhance the contrast of images delineated with electron beams.

EXAMPLE 10

Ground and polished glass plates of the exemplary glass compositions 41, 42 and 43 of Table 1 were ion exchanged at 310° C. for 0.5 hour in an aqueous solution consisting of 100 g $AgNO_3$+30 cc of 16N $HNO_3$+1.1 g silica gel+55.6 g $Cu(NO_3)_2$+200 g $LiNO_3$/liter of the aqueous solution to produce Plates 41A, 42 and 43. The colorations of the areas exposed to electron beam at 25 kv are reddish brown, gold yellow and brown in Plates 41A, 42 and 43 respectively.

EXAMPLE 11

Ground and polished glass plates of the exemplary glass compositions 41, 42, 43, 44 and 45 of Table I were ion exchanged at 310° C. for 0.5 hour in an aqueous solution consisting of 20 g $AgNO_3$+200 g $LiNO_3$+5.7 g $Cu_2O$+41 g $Cu(NO_3)_2$+10.8 cc of 16N $HNO_3$+1.1 g $SiO_2$/liter of the aqueous solution to produce Plates 41B, 42A, 43A, 44 and 45. The colorations of the areas exposed to electron beam at 25 kv are bluish magenta, magenta, magenta, bluish magenta and red in Plates 41B, 42A, 43A, 44 and 45 respectively.

EXAMPLE 12

Seven square areas, 1.2 mm× 1.2 mm each, were uniformly darkened within Plate 41B of Example 11, in a direct writing mode to optical densities of 2.40, 2.10, 1.55, 0.97, 0.52, 0.37 and 0.24 at the wavelength of the absorption peak. The corresponding optical densities at 436 nm were 1.93, 1.64, 1.25, 0.81, 0.47, 0.36 and 0.24. The glass plate bearing the seven E-beam darkened areas was then immersed into a preheated oil bath at 100° C. for a total of six hours. At every two hour interval, the sample was taken out of the oil bath to examine under a microscope, paying particular attention to any change in the color of the E-beam darkened square patches and the surface quality of the glass sample. The optical densities of the square patches were measured at 436 nm at the 2 hour intervals.

No change in the optical densities and color/hue of the E-beam darkened square patches were detected throughout the stability test at 100° C. The transmittance of the areas unexposed to E-beam remained constant at 92% throughout the visible spectral range, and the surface quality of the ion-exchanged glass plate remained unchanged throughout the test.

In a separate experiment, the surface of Plate 41B bearing the seven E-beam darkened areas was brought into contact with a hot plate at 350° C. for a very brief period of less than about a couple of seconds. The contact is thought to be just sufficient to heat the integral ion-exchanged surface layer to about 350° C. It was found that all seven E-beam darkened patches disappeared without leaving any trace of being previously darkened. Thus, the E-beam darkened color images were thermally erased to a colorless state which is totally transparent in the visible spectral range. The transmittance of the erased areas as well as the areas not exposed previously to -electron beams have identical transmittance throughout the entire spectral range. Apparently, the color centers, i.e., the silver metal particles and/or specks of molecular dimensions are redissolved, within the ion-exchanged surface layer, instantaneously at the hot plate temperature of about 350° C.

EXAMPLE 13

Two square areas of Plate 46 of Example 2 were darkened in a direct E-beam writing mode to an optical density of 3.30 (the absorption spectra is represented by curve A of FIG. 1) at the wavelength of the absorption peak. The corresponding optical density at 436 nm was 2.48. The glass plate bearing the E-beam darkened areas was immersed into a pre-heated oil bath at 100° C. for a total of 6 hours. At every 2 hour interval, the sample was taken out of the oil bath to examine under a microscope paying particular attention to any change in the color of the E-beam darkened square patches and the surface quality of the glass sample. The optical density of the square patches was measured at 436 nm at the two hour intervals. No change in the optical density and color/hue of the colored square patches were detected throughout the stability test at 100° C. The transmittance of the areas unexposed to E-beam remained constant at 90.6% throughout the visible spectral range, and the surface quality of Plate 46 remained unchanged throughout the test.

In a separate experiment Plate 46, bearing the two E-beam darkened square patches, was immersed into a preheated oil bath at 232.2° C. (450° F.). The optical density at 436 nm was reduced from 2.48 to 0.16 in 10 minutes and was further reduced to 0.04 after 1 hour immersion in oil at 232.2° C.

EXAMPLE 14

The E-beam induced colorations of Plates 37B, 38 and 39 of Example 2 exposed to electron beams at 25 kv are more or less identical. For these three plates, the E-beam induced coloration changes with an increasing E-beam exposure dosage from very light gray to light bluish magenta, to magenta and to a deep colored red.

EXAMPLE 15

Six square areas, 1.2 mm × 1.2 mm each were uniformly darkened within Plate 37B of Example 2 in a direct writing mode with 35 kv electron beams to optical densities of 0.42, 0.64, 1.33, 1.94, 2.53 and 2.76 at the wavelength of the absorption peak. The charge densities employed to darken these square patches were $(1.92 \pm 0.25) \times 10^{-5}$, $(3.2 \pm 0.25) \times 10^{-5}$, $(8 \pm 0.25) \times 10^{-5}$, $(16 \pm 0.25) \times 10^{-5}$, $(32 \pm 0.25) \times 10^{-5}$, $(64 \pm 0.25) \times 10^{-5}$ coulomb/cm$^2$, respectively. The corresponding optical densities were 0.35, 0.525, 1.05, 1.52, 2.01 and 2.23, respectively, at 436 nm, and were 0.39, 0.63, 1.27, 1.73, 2.10 and 2.21, respectively, at 546 nm.

The E-beam darkened square images were totally erased by immersing Plate 37B bearing the color patches into a preheated oil bath at 232.2° C. (450° F.) for two hours.

Plate 37B after being darkened and erased was again exposed to the electron beam at 35 kv. Six square areas, 1.2 mm × 1.2 mm each, were again darkened in the direct writing mode, using the same charge densities at the six dosage levels previously employed. The optical densities of the square patches at the wavelength of the absorption peak are 0.33, 0.54, 1.23, 2.01, 2.67 and 2.98. The corresponding optical densities are 0.30, 0.46, 0.97, 1.60, 2.16 and 2.43, respectively, at 436 nm, and are 0.32, 0.53, 1.16, 1.75, 2.10 and 2.30 at 546 nm, respectively.

The optical densities as well as the absorption band shapes, peak wavelengths, and the absorption band widths are identical within experimental precision, before and after the erasure. Thus, the sensitivity to E-beam in a direct writing mode and the E-beam induced coloration are unchanged by the heat erasure treatment.

Plates 6F of Example 6, 6G of Example 8, 41A, 42 and 43 of Example 10, 41B, 42A, 43A, 44 and 45 of Example 11, and 37B, 38, 39 and 46 of Example 2 are colorless and transparent, are highly sensitive to electron beams, and insensitive/inert to radiation in the spectral range of ultraviolet throughout visible and longer wavelengths.

EXAMPLE 16

Images delineated with high voltage electron beams within the following ion-exchanged glasses were yellow in color which is the manifestation of an E-beam induced absorption band centered in the blue to near-ultraviolet spectral ranges:

(a) ground and polished glass plates of the exemplary glass composition 40, of Table I above, which have been ion exchanged at 310° C. for 0.5 hour in an aqueous solution consisting of 200 g $AgNO_3$ + 70 cc $HNO_3$ + 111 g $Cu(NO_3)_2$ + 400 g $LiNO_3$ + 1.33 g silica gel/liter of the aqueous solution;

(b) ground and polished glass plates of exemplary glass composition 49, of Table I above, which have been ion exchanged at 300° C. for 30 minutes in an aqueous solution consisting of 20 g $AgNO_3$ + 200 g $LiNO_3$ + 41 g $Cu(NO_3)_2$ + 26.4 cc of 16N $HNO_3$ + 13.2 g $Cu_2O$ + 1.1 g silica gel/liter of the aqueous solution; and (c) ground and polished glass plates of exemplary composition 8 of Table I, which have been ion exchanged at 320° C. for 0.5 hour in an aqueous solution consisting of 200 g $AgNO_3$ + 33.3 cc of 16N $HNO_3$ + 55.6 g $Cu(NO_3)_2$ 200 g $LiNO_3$ + 1.67 g silica gel/liter of the aqueous solution.

What is claimed is:

1. A high energy beam-sensitive glass article comprising a body portion and an integral ion-exchanged surface layer (IIES layer), said body portion composed of a glass composition comprising in mole percent,
  about 12–18% $Li_2O$, $Na_2O$, $K_2O$ and combinations thereof,
  about 3–10% $TiO_2$,
  0 – about 10% transition metal oxides,
  about 4–15% ZnO,
  about 0.5–5% $Al_2O_3$,
  about 0.4–3% Cl, and
  about 65–75% $SiO_2$, said IIES layer composed of an ion-exchanged glass of said glass composition that has been ion exchanged with ionic silver to substitute silver ions for the alkali metal ions in said IIES layer and alkali metal ions diffuse out of said IIES layer, said ion-exchanged glass composition containing, silver ions and/or silver salts, and silanol and/or water in an amount of between about 0.01 and 12% by weight $H_2O$, the concentration of the alkali metal oxides in the ion-exchanged glass of the IIES layer being less than in said glass composition of the body portion.

2. The glass article of claim 1 wherein the glass composition has been ion exchanged with an acidic aqueous solution containing soluble ionic silver.

3. The glass article of claim 2 wherein the silver salts in the IIES layer are in microcrystals and/or microphases in said IIES layer.

4. The glass article of claim 2 wherein the glass composition includes in mole percent one or more of the following, 0–about 15% MgO,
0–about 15% CaO,
0–about 15% SrO,
0–about 15% BaO,
0–about 15% PbO,
0–about 15% $B_2O_3$, and
0–3% halide selected from the group consisting of F, Br, I and combinations thereof.

5. The glass article of claim 4 wherein the transition metal oxides are selected from the group consisting of $Ta_2O_5$, $ZrO_2$, $Nb_2O_5$, $La_2O_3$, $Y_2O_3$, $WO_3$ and mixtures thereof.

6. The glass article of claim 5 wherein in addition to ZnO and $Al_2O_3$ the glass composition includes at least one additional acid-durability-and-glass network strengtheners selected from the group consisting of MgO, CaO and PbO.

7. The glass article of claim 2 wherein the glass composition contains at least two of the alkali metal oxides of $Li_2O$, $Na_2O$ and $K_2O$.

8. The glass article of claim 2 wherein the glass composition contains $Li_2O$, $Na_2O$ and $K_2O$ and the molar concentration ratio of $Li_2O$ and $Na_2O$ to $K_2O$ is more than 0.6.

9. The glass article according to claim 2 wherein the glass composition comprises at least 1 mole percent $Li_2O$.

10. The glass article of claim 5 wherein a portion of the silver ion in the IIES layer is present as glass-network-modifiers and a portion is associated with halides.

11. The glass article of claim 10 wherein the portion of silver ions present as glass-network-modifiers in said IIES layer are present in amounts up to 18% $Ag_2O$ on the mole percent oxide basis, and the portion of silver ions directly associated with halides in said IIES layer are present in amounts up to 6% $Ag_2O$ on the mole percent oxide basis.

12. The glass article of claim 2 wherein said content of the silanol groups and/or water in said integral surface layer ranges between about 0.1–6% by weight $H_2O$.

13. A high energy beam-sensitive glass article comprising a body portion and an integral ion-exchanged surface layer (IIES layer), said body portion composed of a glass composition comprising in mole percent, about 13–15.5% $Li_2O$, $Na_2O$, $K_2O$ and mixtures thereof, about 4–5% $TiO_2$,
about 6.5–7.5% ZnO,
about 1–2% $Al_2O_3$,
about 0.7–3% Cl, and
about 69–70% $SiO_2$, said IIES layer composed of an ion-exchanged glass of said glass composition that has been ion exchanged with an acidic aqueous solution containing soluble ionic silver to substitute silver ions for the alkali metal ions in said IIES layer and alkali metal ions diffuse out of said IIES layer, said ion-exchanged glass composition containing, silver ions and/or silver salts, and silanol and/or water in an amount of between about 0.01 and 12% by weight $H_2O$, the concentration of the alkali metal oxides in the ion-exchanged glass of the IIES layer being less than in said glass composition of the body portion.

14. A high energy beam-sensitive article bearing a recorded image readable in actinic radiation comprising a glass article, said glass article comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of. in mole percent on the oxide basis.

about 5–25% of one or more alkali metal oxides,
at least 1.5% $TiO_2$, but not exceeding 35% $TiO_2$, the composition containing at least an effective amount of $TiO_2$ to render the IIES layer insensitive to at least a spectral portion of actinic radiation,
0–about 20% MgO.
0–about 20% CaO,
0–about 20% ZnO.
0–about 15% $Al_2O_3$,
0–about 20% PbO,
0–about 20% BaO,
0–about 25% $B_2O_3$,
0–about 25% $P_2O_5$,
0–about 2–35% of at least one acid-durability-and-glass network-strengthener (ADAGNS) selected from the group consisting of MgO, ZnO, $Al_2O_3$, PbO, and CaO,
0–about 4% F,
0–about 2% Br.
0–about 2% I.
0–about 6% Cl, and
about 50–89% $SiO_2$.

said IIES layer having been exposed to high energy beams in a predetermined pattern to reduce at least a portion of the silver ions of said IIES layer to elemental silver to produce the recorded image said IIES layer comprising, silver ions,
elemental silver, and
water in a concentration between about 0.01% and 12% by weight $H_2O$.

15. The high energy beam-sensitive article of claim 14 wherein the glass composition contains in mole percent about 0.2–6% Cl.

16. The high energy beam-sensitive article of claim 14 wherein the glass composition contains in mole percent about 0.4–3% Cl.

17. The high energy beam-sensitive article of claim 14 wherein the glass composition contains in mole percent about 3–10% $TiO_2$.

18. The high energy beam-sensitive article of claim 14 wherein the glass composition contains in mole percent 0–about 15% $B_2O_3$.

19. The high energy beam-sensitive article of claim 14 wherein the glass composition contains in mole percent 0–7.2% $B_2O_3$.

20. The high energy beam-sensitive article of claim 14 wherein the concentration of water in said IIES layer is between about 0.1–6% by weight $H_2O$.

21. The high energy beam sensitive article of claim 14 wherein the glass composition contains in mole percent 0.6–2.4% $Al_2O_3$.

22. The high energy beam-sensitive article of claim 14 wherein the glass composition contains in mole percent about 4–10% ZnO.

23. The high energy beam-sensitive article of claim 14 wherein the thickness of said IIES layer is less than about 10 micrometers.

24. A high energy beam-sensitive article bearing a recorded image readable in actinic radiation comprising a glass article, said glass article comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams. said glass composition consisting essentially of, in mole percent on the oxide basis,
   12–16% $Li_2O$, $Na_2O$, $K_2O$ and combinations thereof,
   3% to 10% $TiO_2$, the glass composition containing a sufficient amount of $TiO_2$ to render the IIES layer insensitive to at least a spectral portion of the actinic radiation,
   4–10% ZnO,
   0.5–5% $Al_2O_3$,
   0.8–6% Cl, and
   68–75% $SiO_2$,
said IIES layer having been exposed to high energy beams in a predetermined pattern to reduce at least a portion of the silver ions of said IIES layer to elemental silver to produce the recorded image.said IIES layer comprising,
   silver ions,
   elemental silver, and
   water in a concentration between about 0.01% and 12% by weight $H_2O$.

25. A high energy beam-sensitive article bearing a recorded image readable in actinic radiation comprising a glass article, said glass article comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis,
   about 12–18% $Li_2O$, $Na_2O$, $K_2O$ and combinations thereof,
   about 3–10% oxides of transition metals having 1 to 4 d-electrons in the atomic state, including about 3% to 10% $TiO_2$, the glass composition containing a sufficient amount of the oxides of transition metals having 1 to 4 d-electrons in the atomic state to render the IIES layer insensitive to at least a spectral portion of the actinic radiation,
   about 4–15% ZnO.
   about 0.5–5% $Al_2O_3$,
   about 0.4–3% Cl. and
   about 65–75% $SiO_2$,
said IIES layer having been exposed to high energy beams in a predetermined pattern to reduce at least a portion of the silver ions of said IIES layer to elemental silver to produce the recorded image, said IIES layer comprising.
   silver ions,
   elemental silver, and
   water in a concentration greater than about 0.01% by weight $H_2O$.

26. A high energy beam-sensitive article bearing a recorded image readable in actinic radiation comprising a glass article, said glass article comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis.
   13.4–20.9% $Li_2O$, $Na_2O$, $K_2O$, $Rb_2O$, $Cs_2O$ and combinations thereof,
   0.5–8.4% total of photosensitivity inhibitors (PI agents) and RS suppression agents (RSS agents) the composition containing at least an effective amount of PI agents to render said IIES layer insensitive to at least a spectral portion of the actinic radiation, including 0.5 to 7.4% $TiO_2$.
   3.6–7.6% ZnO,
   0.6–2.4% $Al_2O_3$,
   up to 10.8% MgO,
   up to 4% CaO,
   up to 4% BaO,
   up to 3.5% PbO.
   up to 4% SrO,
   up to 7.2% $B_2O_3$,
   up to 7.2% $P_2O_5$,
   up to 1.5% halide selected from the group consisting of F, Br, I and combinations thereof,
   0–3.8% Cl, and
   58.5–73.2% $SiO_2$,
said IIES layer having been exposed to high energy beams in a predetermined pattern to reduce at least a portion of the silver ions of said IIES layer to elemental silver to produce the recorded image, said IIES layer comprising,
   silver ions,
   elemental silver, and
   water in a concentration greater than about 0.01% by weight $H_2O$.

27. A high energy beam-sensitive article bearing a recorded image readable in actinic radiation comprising a glass article, said glass article comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis.
   about 3–25% of one or more alkali metal oxides, at least 1.5%, but not more than 35%, of photosensitivity inhibitors (PI agents) selected from the group consisting of $TiO_2$, $Nb_2O_5$, $Y_2O_3$, $Ta_2O_5$ and combinations thereof, the composition containing at least an effective amount of the PI agents to render the IIES layer insensitive to at least a spectral portion of actinic radiation.

0–about 35% of acid-durability-and-glass-network strentheners (ADAGNS).

0–about 25% $P_2O_5$,
0–about 25% $B_2O_3$,
0–about 4% F,
0–about 6% Cl,
0–about 2% Br,
0–about 2% I, and
about 20–93% $SiO_2$, the sum amount of the above components constituting at least 75 mole percent of the glass composition said IIES layer having been exposed to high energy beams in a predetermined pattern to reduce at least a portion of the silver ions of said IIES layer to elemental silver to produce the recorded image, said IIES layer comprising, silver ions.
elemental silver, and
water in a concentration greater than about 0.01% by weight $H_2O$.

28. The high energy beam-sensitive article of claim 27 wherein the glass composition contains in mole percent about 0.2–6% Cl.

29. The high energy beam-sensitive article of claim 27 wherein the glass composition contains in mole percent about 0.4–3% Cl.

30. The high energy beam-sensitive article of claim 27 wherein the glass composition contains in mole percent about 3–10% $TiO_2$.

31. The high energy beam-sensitive article of claim 27 wherein the glass composition contains in mole percent 0–about 15% $B_2O_3$.

32. The high energy beam-sensitive article of claim 27 wherein the glass composition contains in mole percent 0–7.2% $B_2O_3$.

33. The high energy beam-sensitive article of claim 27 wherein the concentration of water in said IIES layer is between about 0.01% and 12% by weight $H_2O$.

34. The high energy beam-sensitive article of claim 27 wherein the concentration of water in said IIES layer is betweeen about 0.1–6% by weight $H_2O$.

35. The high energy beam sensitive article of claim 27 wherein the glass composition contains in mole percent 0.6–2.4% $Al_2O_3$.

36. The high energy beam-sensitive article of claim 27 wherein the glass composition contains in mole percent about 4–10% ZnO.

37. The high energy beam-sensitive article of claim 27 wherein the thickness of said IIES layer is less than about 10 micrometers.

38. A high energy beam-sensitive article bearing a recorded image readable in actinic radiation comprising a glass article, said glass article comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, about 3–25% of one or more alkali metal oxides,
at least 1.5% $TiO_2$, but not exceeding 25% $TiO_2$, the composition containing at least an effective amount of $TiO_2$ to render the IIES layer insensitive to at least a spectral portion of actinic radiation,
0–about 35% of acid-durability-and-glass-network strengtheners (ADAGNS),
0–about 25% $P_2O_5$,
0–about 25% $B_2O_3$,
0–about 4% F,
0–about 6% Cl,
0–about 2% Br,
0–about 2% I, and
about 20–93% $SiO_2$, the sum amount of the above components constituting at least 75 mole percent of the glass composition, said IIES layer having been exposed to high energy beams in a predetermined pattern to reduce at least a portion of the silver ions of said IIES layer to elemental silver to produce the recorded image, said IIES layer comprising, silver ions,
elemental silver, and
water in a concentration greater than about 0.01% by weight $H_2O$.

39. The high energy beam-sensitive article of claim 38 wherein the glass composition contains in mole percent about 0.2–6% Cl.

40. The high energy beam-sensitive article of claim 38 wherein the glass composition contains in mole percent about 0.4–3% Cl.

41. The high energy beam-sensitive article of claim 38 wherein the glass composition contains in mole percent about 3–10% $TiO_2$.

42. The high energy beam-sensitive article of claim 38 wherein the glass composition contains in mole percent 0–about 15% $B_2O_3$.

43. The high energy beam-sensitive article of claim 38 wherein the glass composition contains in mole percent 0–7.2% $B_2O_3$.

44. The high energy beam-sensitive article of claim 38 wherein the concentration of water in said IIES layer is between about 0.01% and 12% by weight $H_2O$.

45. The high energy beam-sensitive article of claim 38 wherein the concentration of water in said IIES layer is between about 0.1–6% by weight $H_2O$.

46. The high energy beam sensitive article of claim 38 wherein the glass composition contains in mole percent 0.6–2.4% $Al_2O_3$.

47. The high energy beam-sensitive article of claim 38 wherein the glass composition contains in mole percent about 4–10% ZnO.

48. The high energy beam-sensitive article of claim 38 wherein the thickness of said IIES layer is less than about 10 micrometers.

49. A high energy beam-sensitive article bearing a recorded image readable in actinic radiation comprising a glass article, said glass article comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, about 3–25% $Li_2O$, $Na_2O$, $K_2O$, $Rb_2O$, $Cs_2O$ and combination thereof, 0.5–8.4% total of photosensitivity inhibitors (PI agents) and Rs-suppression agents (RSS agents), the composition containing at least an effective amount of PI agents to render said IIES layer insensitive to at least a spectral portion of the actinic radiation, including 0.5 to 7.4% $TiO_2$,
3.6–7.6% ZnO,
0.6–2.4% $Al_2O_3$,
up to 10.8% MgO,
up to 4% CaO,
up to 4% BaO,
up to 3.5% PbO,
up to 4% SrO,
up to 7.2% $B_2O_3$,
up to 7.2% $P_2O_5$,
up to 1.5% halide selected from the group consisting of F, Br, I and combinations thereof,
0.2–6% Cl, and
58.5–73.2% $SiO_2$,
said IIES layer having been exposed to high energy beams in a predetermined pattern to reduce at least a portion of the silver ions of said IIES layer to elemental silver to produce the recorded image, said IIES layer comprising,
silver ions,
elemental silver, and
water in a concentration greater than about 0.01% by weight $H_2O$.

50. A high energy beam-sensitive article bearing a recorded image readable in actinic radiation comprising a glass article, said glass article comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis,
about 5–25% of one or more alkali metal oxides,
at least 1.5%, but less than 35%, of photosensitivity inhibitors (PI agents) selected from the group consisting of $TiO_2$, $Nb_2O_5$, $Y_2O_3$, $Ta_2O_5$, and combinations thereof, the composition containing at least an effective amount of the photosensitivity inhibitors to render the IIES layer insensitive to at least a spectral portion of the actinic radiation,
0–about 15% MgO,
0–about 15% CaO,
0–about 15% SrO,
0–about 20% ZnO,
0–about 15% $Al_2O_3$,
0–about 15% PbO,
0–about 15% BaO,
0–about 15% $B_2O_3$,
about 2–35% of at least one acid-durability-and glass network-strengtheners (ADAGNS) selected from the group consisting of MgO, ZnO, $Al_2O_3$, PbO and CaO,
0–about 3% F, Br and I,
0–about 6% Cl, and
about 50–89% $SiO_2$,
said IIES layer having been exposed to high energy beams in a predetermined pattern to reduce at least a portion of the silver ions of said IIES layer to elemental silver to produce the recorded image, said IIES layer comprising,
silver ions,
elemental silver, and
water in a concentration greater than about 0.01% by weight $H_2O$.

51. A high energy beam-sensitive article bearing a recorded image readable in actinic radiation comprising a glass article, said glass article comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis,
about 5–25% of one or more alkali metal oxides,
about 0.5–35% total of at least one photosensitivity inhibitor (PI agent) and RS-suppression agent (RSS agent) selected from oxides of transition metals having 1 to 4 d-electrons in the atomic state,
0–about 15% MgO,
0–about 15% CaO,
0–about 15% SrO,
about 2–20% ZnO,
0–about 15% $Al_2O_3$,
0–about 15% PbO, provided that the amount of acid-durability-and-glass-network-strengthener (ADAGNS) selected from the group consisting of MgO, ZnO, $Al_2O_3$, PbO and CaO is from about 2% to 35%,
0–about 15% $B_2O_3$,
0–about 3% F, Br and I,
0–about 6% Cl, and
about 50–89% $SiO_2$,
said IIES layer having been exposed to high energy beams in a predetermined pattern to reduce at least a portion of the silver ions of said IIES layer to elemental silver to produce the recorded image, said IIES layer comprising,
silver ions,
elemental silver, and
water in a concentration greater than about 0.01% by weight $H_2O$.

52. The high energy beam-sensitive article of claim 51 wherein the glass composition contains in mole percent about 0.2–6% Cl.

53. The high energy beam-sensitive article of claim 51 wherein the glass composition contains in mole percent about 0.4–3% Cl.

54. The high energy beam-sensitive article of claim 51 wherein the glass composition contains in mole percent about 3–10% $TiO_2$, and 0–about 10% transition metal oxides selected from the group consisting of $Ta_2O_5$, $ZrO_2$, $Nb_2O_5$, $La_2O_3$, $Y_2O_3$, $WO_3$ and mixtures thereof.

55. The high energy beam-sensitive article of claim 51 wherein the glass composition contains in mole percent 0.5–7.4% $TiO_2$.

56. The high energy beam-sensitive article of claim 51 wherein the glass composition contains in mole percent 0–7.2% $B_2O_3$.

57. The high energy beam-sensitive article of claim 51 wherein the concentration of the water in said IIES layer is between about 0.01% and 12% by weight $H_2O$.

58. The high energy beam-sensitive article of claim 51 wherein the concentration of water in said IIES layer is between about 0.1–6% by weight $H_2O$.

59. The high energy beam sensitive article of claim 51 wherein the glass composition contains in mole percent 0.6–2.4% $Al_2O_3$.

60. The high energy beam-sensitive article of claim 51 wherein the glass composition contains in mole percent about 4–10% ZnO.

61. The high energy beam-sensitive article of claim 51 wherein the thickness of said IIES layer is less than about 10 micrometers.

62. A high energy beam-sensitive article bearing a recorded image readable in actinic radiation comprising a glass article, said glass article comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, 3–25% of one or more alkali metal oxides,
0.5–35% total of photosensitivity inhibitors (PI agents) and RS-suppression agents, provided an effective amount of PI agents is included to render the IIES layer insensitive to at least a spectral portion of actinic radiation, including at least 0.5% $TiO_2$,
up to 35% of acid-durability-and-glass-network strengtheners (ADAGNS),
up to 20% BaO,
up to 25% $P_2O_5$,
up to 25% $B_2O_3$,
up to 4% F,
up to 6% Cl,
up to 2% Br,
up to 2% I, and
20–93% $SiO_2$, the sum amount of the above components constituting at least 75 mole percent of the glass composition, said IIES layer having been exposed to high energy beams in a predetermined pattern to reduce at least a portion of the silver ions of said IIES layer to elemental silver to produce the recorded image, said IIES layer comprising, silver ions,
elemental silver, and
water in a concentration greater than about 0.01% by weight $H_2O$.

63. A high energy beam-sensitive article bearing a recorded image readable in actinic radiation comprising a glass said glass article comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, 5–25% total of $Li_2O$, $Na_2O$ and $K_2O$,
1.2–35% total of photosensitivity inhibitors (PI agents) and RS-suppression agents selected from the group consisting of $TiO_2$, $Ta_2O_5$, $ZrO_2$, $Nb_2O_5$, $La_2O_3$, $Y_2O_3$ and $WO_3$, provided an effective amount of PI agents is included to render the IIES layer insensitive to at least a spectral portion of actinic radiation, including 1.2% to 25% $TiO_2$,
2–20% ZnO,
up to 10% $Al_2O_3$,
up to 20% MgO,
up to 20% CaO,
up to 20% PbO, provided that the amount of acid-durability-and-glass-network strengtheners (ADAGNS) selected from the group consisting of MgO, ZnO, $Al_2O_3$, PbO and CaO, is from 2 to 35%
up to 15% $B_2O_3$,
up to 3% total of F, Br, and I,
up to 6% Cl, and
50–89% $SiO_2$, said IIES layer having been exposed to high energy beams in a predetermined pattern to reduce at least a portion of the silver ions of said IIES layer to elemental silver to produce the recorded image, said IIES layer comprising, silver ions,
elemental silver, and
water in a concentration greater than about 0.01% by weight $H_2O$.

64. The high energy beam-sensitive article of claim 63 wherein the glass composition contains in mole percent about 0.2–6% Cl.

65. The high energy beam-sensitive article of claim 63 wherein the glass composition contains in mole percent about 0.4–3% Cl.

66. The high energy beam-sensitive article of claim 63 wherein the glass composition contains in mole percent about 3–10% $TiO_2$, and 0 about 10% transition metal oxides selected from the group consisting of $Ta_2O_5$, $ZrO_2$, $Nb_2O_5$, $La_2O_3$, $Y_2O_3$, $WO_3$ and mixtures thereof.

67. The high energy beam-sensitive article of claim 63 wherein the glass composition contains in mole percent 0–7.2% $B_2O_3$.

68. The high energy beam-sensitive article of claim 63 wherein the concentration of water in said IIES layer is between about 0.01% and 12% by weight $H_2O$.

69. The high energy beam-sensitive article of claim 63 wherein the concentration of water in said IIES layer is between about 0.1–6% by weight $H_2O$.

70. The high energy beam sensitive article of claim 63 wherein the glass composition contains in mole percent 0.6–2.4% $Al_2O_3$.

71. The high energy beam-sensitive article of claim 63 wherein lhe glass composition contains in mole percent about 4–10% ZnO.

72. The high energy beam-sensitive article of claim 63 wherein the thickness of said IIES layer is less than about 10 micrometers.

73. A method of forming an image readable with actinic radiation in a high energy beam-sensitive article, said high energy-beam-sensitive article comprising a glass article, said glass article comprising an integral ion-exchanged surface layer (IIES layer) being sensitive to high energy beams, said method comprising radiating the IIES layer of the glass article with a high energy beam selected from the group consisting of electron beam, ion beam, molecular beam, X-ray and uv radiation having a wavelength of less than 300 nm in a predetermined geometric manner to record the desired image in the IIES layer by reducing at least a portion of silver ions in the IIES layer to elemental silver, said high energy beam having sufficient energy to penetrate at least 0.1 micrometers into said IIES layer of the glass article, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis.

5-25% of one or more alkali metal oxides,
at least 1.5% TiO$_2$, but not exceeding 35% TiO$_2$, the composition containing at least an effective amount of TiO$_2$ to render the IIES layer insensitive to at least a spectral portion of actinic radiation,
0–about 20% MgO,
0–about 20% CaO,
0–about 20% ZnO,
0–about 15% Al$_2$O$_3$,
0–about 20% PbO,
0–about 20% BaO,
0–about 25% B$_2$O$_3$,
0–about 25% P$_2$O$_5$,
about 2-35% of at least one acid-durability-and-glass network-strengthener (ADAGNS) selected from the group consisting of MgO, ZnO, Al$_2$O$_3$, PbO, and CaO.
0–about 4% F,
0–about 2% Br,
0–about 2% I,
0–about 6% Cl, and
about 50-89% SiO$_2$.
said IIES layer comprising,
silver ions, and
water in a concentration greater than about 0.01% by weight H$_2$O.

74. The method according to claim 73 wherein said high energy beam is an electron beam having an accelerating voltage of more than 1 kv.

75. A method of forming an image readable with actinic radiation in a high energy beam-sensitive article, said high energy-beam-sensitive article comprising a glass article, said glass article comprising an integral ion-exchanged surface layer (IIES layer) being sensitive to high energy beams, said method comprising radiating the IIES layer of the glass article with a high energy beam selected from the group consisting of electron beam, ion beam, molecular beam, X-ray and uv radiation having a wavelength of less than 300 nm in a predetermined geometric manner to record the desired image in the IIES layer by reducing at least a portion of silver ions in the IIES layer to elemental silver, said high energy beam having sufficient energy to penetrate at least 0.1 micrometers into said IIES layer of the glass article, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis,
about 12-18% Li$_2$O, Na$_2$O, K$_2$O and combinations thereof,
about 3-10% oxides of transition metals having 1 to 4 d-electrons in the atomic state, including about 3% to 10% TiO$_2$, the glass composition containing a sufficient amount of the oxides of transition metals having 1 to 4 d-electrons in the atomic state to render the IIES layer insensitive to at least a spectral portion of the actinic radiation,
about 4-15% ZnO,
about 0.5-5% Al$_2$O$_3$,
about 0.4-3% Cl, and
about 65-75% SiO$_2$,
said IIES layer comprising,
silver ions, and
water in a concentration greater than about 0.01% by weight H$_2$O.

76. The method according to claim 75 wherein said high energy beam is an electron beam having an accelerating voltage of more than 1 kv.

77. A method of forming an image readable with actinic radiation in a high energy beam-sensitive article, said high energy-beam-sensitive article comprising a glass article, said glass article comprising an integral ion-exchanged surface layer (IIES layer) being sensitive to high energy beams, said method comprising radiating the IIES layer of the glass article with a high energy beam selected from the group consisting of electron beam, ion beam, molecular beam, X-ray and uv radiation having a wavelength of less than 300 nm in a predetermined geometric manner to record the desired image in the IIES layer by reducing at least a portion of silver ions in the IIES layer to elemental silver, said high energy beam having sufficient energy to penetrate at least 0.1 micrometers into said IIES layer of the glass article, said IIES layer composed of a glass layer of a glass oomposition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis.
13.4-20.9% Li$_2$O, Na$_2$O, K$_2$O, Rb$_2$O, Cs$_2$O and combinations thereof,
0.5-8.4% total of photosensitivity inhibitors (PI agents) and RS-suppression agents (RSS agents), the composition containing at least an effective amount of PI agents to render said IIES layer insensitive to at least a spectral portion of the actinic radiation, including 0.5 to 7.4% TiO$_2$,
3.6-7.6% ZnO,
0.6-2.4% Al$_2$O$_3$,
up to 10.8% MgO,
up to 4% CaO,
up to 4% BaO,
up to 3.5% PbO,
up to 7.2% B$_2$O$_3$,
up to 7.2% P$_2$O$_5$,
up to 1.5% halide selected from the group consisting of F, Br, I and combinations thereof,
0-3.8% Cl, and
58.5-73.2% SiO$_2$,
said IIES layer comprising,
silver ions, and
water in a concentration greater than about 0.01% by weight H$_2$O.

78. The method according to claim 77 wherein said high energy beam is an electron beam having an accelerating voltage of more than 1 kv.

79. A method of forming an image readable with actinic radiation in a high energy beam-sensitive article, said high energy-beam-sensitive article comprising a glass article, said glass article comprising an integral ion-exchanged surface layer (IIES layer) being sensitive to high energy beams, said method comprising radiating the IIES layer of the glass article with a high energy beam selected from the group consisting of electron beam, ion beam, molecular beam, X-ray and uv radiation having a wavelength of less than 300 nm in a predetermined geometric manner to record the desired image in the IIES layer by reducing at least a portion of silver ions in the IIES layer to elemental silver, said high energy beam having sufficient energy to penetrate at least 0.1 micrometers into said IIES layer of the glass article, said IIES layer composed of a glass layer of a glass composition that has been ion exchanged with an acidic aqueous solution containing soluble ionic silver to diffuse silver ions into said IIES layer to render said IIES or sensitive to high energy beams, said glass composition consisting essentially of, in mole percent on the oxide basis, about 3-25% of one or more alkali metal oxides,
at least 1.5%, but not more than 35%, of photosensitivity inhibitors (PI agents) selected from the group consisting of $TiO_2$, $Nb_2O_5$, $Y_2O_3$, $Ta_2O_5$ and combinations thereof, the composition containing at least an effective amount of the PI agents to render the IIES layer insensitive to at least a spectral portion of actinic radiation,
0–about 35% of acid-durability-and-glass-network strentheners (ADAGNS),
0–about 25% $P_2O_5$,
0–about 25% $B_2O_3$,
0–about 4% F,
0–about 6% Cl,
0–about 2% Br,
0–about 2% I, and
about 20-93% $SiO_2$, the sum amount of the above components constituting at least 75 mole percent of the glass composition, said IIES layer comprising,
silver ions, and
water in a concentration greater than about 0.01% by weight $H_2O$.

80. The method according to claim 79 wherein said high energy beam is an electron beam having an accelerating voltage of more than 1 kv.

81. A method of forming an image readable with actinic radiation in a high energy beam-sensitive article, said high energy-beam-sensitive article comprising a glass article, said glass article comprising an integral ion-exchanged surface layer (IIES layer) being sensitive to high energy beams, said method comprising radiating the IIES layer of the glass article with a high energy beam selected from the group consisting of electron beam, ion beam, molecular beam, X-ray and uv radiation having a wavelength of less than 300 nm in a predetermined geometric manner to record the desired image in the IIES layer by reducing at least a portion of silver ions in the IIES layer to elemental silver, said high energy beam having sufficient energy to penetrate at least 0.1 micrometers into said IIES layer of the glass article, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis.

about 3-25% of one or more alkali metal oxides,
at least 1.5% $TiO_2$, but not exceeding 25% $TiO_2$, the composition containing at least an effective amount of $TiO_2$ to render the IIES layer insensitive to at least a spectral portion of actinic radiation.
0–about 35% of acid-durability-and-glass-network strengtheners (ADAGNS).
0–about 25% $P_2O_5$,
0–about 25% $B_2O_3$,
0–about 4% F,
0–about 6% Cl,
0–about 2% Br,
0–about 2% I, and
about 20-93% $SiO_2$, the sum amount of the above components constituting at least 75 mole percent of the glass composition, said IIES layer comprising,
silver ions, and
water in a concentration greater than about 0.01% by weight $H_2O$.

82. The method according to claim 81 wherein said high energy beam is an electron beam having an accelerating voltage of more than 1 kv.

83. A method of forming an image readable with actinic radiation in a high energy beam-sensitive article, said high energy-beam-sensitive article comprising a glass article, said glass article comprising an integral ion-exchanged surface layer (IIES layer) being sensitive to high energy beams, said method comprising radiating the IIES layer of the glass article with a high energy beam selected from the group consisting of electron beam, ion beam, molecular beam, X-ray and uv radiation having a wavelength of less than 300 nm in a predetermined geometric manner to record the desired image in the IIES layer by reducing at least a portion of silver ions in the IIES layer to elemental silver, said high energy beam having sufficient energy to penetrate at least 0.1 micrometers into said IIES layer of the glass article, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, about 3-25% $Li_2O$, $Na_2O$, $K_2O$, $Rb_2O$, $Cs_2O$ and combinations thereof,
0.5-8.4% total of photosensitivity inhibitors (PI agents) and Rs-suppression agents (RSS agents), the composition containing at least an effective amount of PI agents to render said IIES layer insensitive to at least a spectral portion of the actinic radiation, including 0.5 to 7.4% $TiO_2$,
3.6-7.6% ZnO,
0.6-2.4% $Al_2O_3$,
up to 10.8% MgO,
up to 4% CaO,
up to 4% BaO,
up to 3.5% PbO,
up to 4% SrO,
up to 7.2% $B_2O_3$,
up to 7.2% $P_2O_5$,
up to 1.5% halide selected from the group consisting of F, Br, I and combinations thereof.
0.2-6% Cl, and
58.5-73.2% $SiO_2$,
said IIES layer comprising,
silver ions, and
water in a concentration greater than about 0.01% by weight $H_2O$.

84. The method according to claim 83 wherein said high energy beam is an electron beam having an accelerating voltage of more than 1 kv.

85. A method of forming an image readable with actinic radiation in a high energy beam-sensitive article, said high energy-beam-sensitive article comprising a glass article, said glass article comprising an integral ion-exchanged surface layer (IIES layer) being sensitive to high energy beams. said method comprising radiating the IIES layer of the glass article with a high energy beam selected from the group consisting of electron beam, ion beam molecular beam, X-ray and uv radiation having a wavelength of less than 300 nm in a predetermined geometric manner to record the desired image in the IIES layer by reducing at least a portion of silver ions in the IIES layer to elemental silver, said high energy beam having sufficient energy to penetrate at least 0.1 micrometers into said IIES layer of the glass article, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, about 5–25% of one or more alkali metal oxides,
at least 1.5%, but less than 35% of photosensitivity inhibitors (PI agents) selected from the group consisting of $TiO_2$, $Nb_2O_5$, $Y_2O_3$, $Ta_2O_5$, and combinations thereof, the composition containing at least an effective amount of the photosensitivity inhibitors to render the IIES layer insensitive to at least a spectral portion of the actinic radiation,
0–about 15% MgO,
0–about 15% CaO,
0–about 15% SrO,
0–about 20% ZnO,
0–about 15% $Al_2O_3$,
0–about 15% PbO,
0–about 15% BaO,
0–about 15% $B_2O_3$,
about 2–35% of at least one acid-durability-and glass-network-strengtheners (ADAGNS) selected from the group consisting of MgO, ZnO, $Al_2O_3$, PbO and CaO,
0–about 3% F, Br and I,
0 about 6% Cl, and
about 50–89% $SiO_2$,
said IIES layer comprising,
silver ions, and
water in a concentration greater than about 0.01% by weight $H_2O$.

86. The method according to claim 85 wherein said high energy beam is an electron beam having an accelerating voltage of more than 1 kv.

87. A method of forming an image readable with actinic radiation in a high energy beam-sensitive article, said high energy-beam-sensitive article comprising a glass article, said glass article comprising an integral ion-exchanged surface layer (IIES layer) being sensitive to high energy beams said method comprising radiating the layer of the glass article with a high energy beam selected from the group consisting of electron beam, ion beam, molecular beam, X-ray and uv radiation having a wavelength of less than 300 nm in a predetermined geometric manner to record the desired image in the IIES layer by reducing at least a portion of silver ions in the IIES layer to elemental silver, said high energy beam having sufficient energy to penetrate at least 0.1 micrometers into said IIES layer of the glass article, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, about 5–25% of one or more alkali metal oxides,
about 0.5–35% total of at least one photosensitivity inhibitor (PI agent) and RS-suppression agent (RSS agent) selected from oxides of transition metals having 1 to 4 d-electrons in the atomic state,
0–about 15% MgO,
0–about 15% CaO,
0–about 15% SrO,
about 2–20% ZnO,
0–about 15% $Al_2O_3$,
0–about 15% PbO, provided that the amount of acid-durability-and-glass-network-strengthener (ADAGNS) selected from the group consisting of MgO, ZnO, $Al_2O_3$, PbO and CaO is from about 2% to 35%,
0–about 15% $B_2O_3$,
0–about 3% F, Br and I,
0–about 6% Cl, and
about 50–89% $SiO_2$,
said IIES layer comprising,
silver ions, and
water in a concentration greater than about 0.01% by weight $H_2O$.

88. The method according to claim 87 wherein said high energy beam is an electron beam having an accelerating voltage of more than 1 kv.

89. A method of forming an image readable with actinic radiation in a high energy beam-sensitive article, said high energy-beam-sensitive article comprising a glass article, said glass article comprising an integral ion-exchanged surface layer (IIES layer) being sensitive to high energy beams, said method comprising radiating the IIES layer of the glass article with a high energy beam selected from the group consisting of electron beam, ion beam, molecular beam, X-ray and uv radiation having a wavelength of less than 300 nm in a predetermined geometric manner to record the desired image in the IIES layer by reducing at least a portion of silver ions in the IIES layer to elemental silver, said high energy beam having sufficient energy to penetrate at least 0.1 micrometers into said IIES layer of the glass article, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis.

3–25% of one or more alkali metal oxides,
0.5–35% total of photosensitivity inhibitors (PI agents) and RS-suppression agents, provided an effective amount of PI agents is included to render the IIES layer insensitive to at least a spectral portion of actinic radiation, including at least 0.5% $TiO_2$,
up to 35% of acid-durability-and-glass-network strengtheners (ADAGNS),
up to 20% BaO,
up to 25% $P_2O_5$,
up to 25% $B_2O_3$,
up to 4% F,
up to 6% Cl,
up to 2% Br,
up to 2% I. and
20–93% $SiO_2$,
the sum amount of the above components constituting at least 75 mole percent of the glass composition, said IIES layer comprising,
silver ions, and
water in a concentration greater than about 0.01% by weight $H_2O$.

90. The method according to claim 89 wherein said high energy beam is an electron beam having an accelerating voltage of more than 1 kv.

91. A method of forming an image readable with actinic radiation in a high energy beam-sensitive article, said high energy-beam-sensitive article comprising a glass article, said glass article comprising an integral ion-exchanged surface layer (IIES layer) being sensitive to high energy beams, said method comprising radiating the IIES layer of the glass article with a high energy beam selected from the group consisting of electron beam, ion beam, molecular beam, X-ray and uv radiation having a wavelength of less than 300 nm in a predetermined geometric manner to record the desired image in the IIES layer by reducing at least a portion of silver ions in the IIES layer to elemental silver, said high energy beam having sufficient energy to penetrate at least 0.1 micrometers into said IIES layer of the glass article, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis.

5-25% total of $Li_2O$, $Na_2O$ and $K_2O$,
1.2-35% total of photosensitivity inhibitors (PI agents) and RS-suppression agents selected from the group consisting of $TiO_2$, $Ta_2O_5$, $ZrO_2$, $Nb_2O_5$, $La_2O_3$, $Y_2O_3$ and $WO_3$, provided an effective amount of PI agents is included to render the IIES layer insensitive to at least a spectral portion of actinic radiation, including 1.2% to 25% $TiO_2$,
2-20% ZnO,
up to 10% $Al_2O_3$,
up to 20% MgO,
up to 20% CaO,
up to 20% PbO, provided that the amount of acid-durability-and-glass-network strengtheners (ADAGNS) selected from the group consisting of MgO, ZnO, $Al_2O_3$, PbO and CaO, is from 2 to 35%
up to 15% $B_2O_3$,
up to 3% total of F, Br, and I,
up to 6% Cl, and
50-89% $SiO_2$,
said IIES layer comprising,
silver ions, and
water in a concentration greater than about 0.01% by weight $H_2O$.

92. The method according to claim 91 wherein said high energy beam is an electron beam having an accelerating voltage of more than 1 kv.

93. A method of erasing a recorded image readable with actinic radiation in a high energy beam-sensitive article, said article comprising an integral ion-exchanged surface layer (IIES layer) bearing the recorded image, said method comprising the step of heating the recorded image in the IIES layer to a temperature in excess of 100 degree C., but less than the softening point temperature of the IIES layer to erase the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis,
about 5-25% of one or more alkali metal oxides, at least 1.5% $TiO_2$, but not exceeding 35% $TiO_2$, the composition containing at least an effective amount of $TiO_2$ to render the IIES layer insensitive to at least a spectral portion of actinic radiation,
0-about 20% MgO,
0-about 20% CaO,
0-about 20% ZnO,
0-about 15% $Al_2O_3$,
0-about 20% PbO,
0-about 20% BaO,
0-about 25% $B_2O_3$,
0-about 25% $P_2O_5$,
about 2-35% of at least one acid-durability-and glass network-strengthener (ADAGNS) selected from the group consisting of MgO, ZnO, $Al_2O_3$, PbO, and CaO,
0-about 4% F,
0-about 2% Br,
0-about 2% I,
0-about 6% Cl, and
about 50-89% $SiO_2$,
said IIES layer having been exposed to high energy beams in a predetermined pattern to reduce at least a portion of the silver ions of said IIES layer to elemental silver to produce the recorded iamge, said IIES layer comprising
silver ions,
elemental silver and
water in a concentration greater than about 0.01% by weight $H_2O$.

94. A method of erasing a recorded image readable with actinic radiation in a high energy beam-sensitive article, said article comprising an integral ion-exchanged surface layer (IIES layer) bearing the recorded image, said method comprising the step of heating the recorded image in the IIES layer to a temperature in excess of 100 degree C., but less than the softening point temperature of the IIES layer to erase the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis,
about 12-18% $Li_2O$, $Na_2O$, $K_2O$ and combinations thereof,
about 3-10% oxides of transition metals having 1 to 4 d-electrons in the atomic state, including about 3% to 10% $TiO_2$, the glass composition containing a sufficient amount of the oxides of transition metals having 1 to 4 d-electrons in the atomic state to render the IIES layer insensitive to at least a spectral portion of the actinic radiation,
about 4-15% ZnO,
about 0.5-5% $Al_2O_3$,
about 0.4-3% Cl, and
about 65-75% $SiO_2$,
said IIES layer having been exposed to high energy beams in a predetermined pattern to reduce at least a portion of the silver ions of said IIES layer to elemental silver to produce the recorded iamge, said IIES layer comprising
silver ions,
elemental silver and
water in a concentration greater than about 0.01% by weight $H_2O$.

95. A method of erasing a recorded image readable with actinic radiation in a high energy beam-sensitive article, said article comprising an integral ion-exchanged surface layer (IIES layer) bearing the recorded image, said method comprising the step of heating the recorded image in the IIES layer to a temperature in excess of 100 degree C., but less than the softening point temperature of the IIES layer to erase the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, 13.4–20.9% $Li_2O$, $Na_2O$, $K_2O$, $Rb_2O$, $Cs_2O$ and combinations thereof,
0.5–8.4% total of photosensitivity inhibitors (PI agents) and RS-suppression agents (RSS agents), the composition containing at least an effective amount of PI agents to render said IIES layer insensitive to at least a spectral portion of the actinic radiation, including 0.5 to 7.4% $TiO_2$,
3.6–7.6% ZnO,
0.6–2.4% $Al_2O_3$,
up to 10.8% MgO,
up to 4% CaO,
up to 4% BaO,
up to 3.5% PbO,
up to 4% SrO,
up to 7.2% $B_2O_3$,
up to 7.2% $P_2O_5$,
up to 1.5% halide selected from the group consisting of F, Br, I and combinations thereof,
0–3.8% Cl, and
58.5–73.2% $SiO_2$, said IIES layer having been exposed to high energy beams in a predetermined pattern to reduce at least a portion of the silver ions of said IIES layer to elemental silver to produce the recorded iamge, said IIES layer comprising silver ions,
elemental silver and
water in a concentration greater than about 0.01% by weight $H_2O$.

96. A method of erasing a recorded image readable with actinic radiation in a high energy beam-sensitive article, said article comprising an integral ion exchanged surface layer (IIES layer) bearing the recorded image, said method comprising the step of heating the recorded image in the IIES layer to a temperature in excess of 100 degree C., but less than the softening point temperature of the IIES layer to erase the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, about 3–25% of one or more alkali metal oxides,
at least 1.5%, but not more than 35%, of photosensitivity inhibitors (PI agents) selected from the group consisting of $TiO_2$, $Nb_2O_5$, $Y_2O_3$, $Ta_2O_5$ and combinations thereof, the composition containing at least an effective amount of the PI agents to render the IIES layer insensitive to at least a speciral portion of actinic radiation,
0–about 35% of acid-durability-and-glass-network strentheners (ADAGNS),
0–about 25% $P_2O_5$,
0–about 25% $B_2O_3$,
0–about 4% F,
0–about 6% Cl,
0–about 2% Br,
0–about 2% I, and
about 20–93% $SiO_2$, the sum amount of the above components constituting at least 75 mole percent of the glass composition, said IIES layer having been exposed to high energy beams in a predetermined pattern to reduce at least a portion of the silver ions of said IIES layer to elemental silver to produce the receorded image, said IIES layer comprising silver ions,
elemental silver and
water in a concentration greater than about 0.01% by weight $H_2O$.

97. A method of erasing a recorded image readable with actinic radiation in a high energy beam-sensitive article, said article comprising an integral ion-exchanged surface layer (IIES layer) bearing the recorded image, said method comprising the step of heating the recorded image, in the IIES layer to a temperature in excess of 100 degree C., but less than the softening point temperature of the IIES layer to erase the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, about 3–25% of one or more alkali metal oxides,
at least 1.5% $TiO_2$, but not exceeding 25% $TiO_2$, the composition containing at least an effective amount of $TiO_2$ to render the IIES layer insensitive to at least a spectral portion of actinic radiation,
0–about 35% of acid-durability-and-glass-network strengtheners (ADAGNS),
0–about 25% $P_2O_5$,
0–about 25% $B_2O_3$,
0–about 4% F,
0–about 6% Cl,
0–about 2% Br,
0–about 2% I, and
about 20–93% $SiO_2$, the sum amount of the above components constituting at least 75 mole percent of the glass composition, said IIES layer having been exposed to high energy beams in a predetermined pattern to reduce at least a portion of the silver ions of said IIES layer to elemental silver to produce the recorded iamge, said IIES layer comprising silver ions,
elemental silver and
water in a concentration greater than about 0.01% by weight $H_2O$.

98. A method of erasing a recorded image readable with actinic radiation in a high energy beam-sensitive article, said article comprising an integral ion-exchanged surface layer (IIES layer) bearing the recorded image, said method comprising the step of heating the recorded image in the IIES layer to a temperature in excess of 100 degree C., but less than the softening point temperature of the IIES layer to erase the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, about 3–25% $Li_2O$, $Na_2O$, $K_2O$, $Rb_2O$, $Cs_2O$ and combination thereof,
0.5–8.4% total of photosensitivity inhibitors (PI agents) and Rs-suppression agents (RSS agents), the composition containing at least an effective amount of PI agents to render said IIES layer insensitive to at least a spectral portion of the actinic radiation, including 0.5 to 7.4% $TiO_2$,
3.6–7.6% ZnO,
0.6–2.4% $Al_2O_3$,
up to 10.8% MgO,
up to 4% CaO,
up to 4% BaO,
up to 3.5% PbO,
up to 4% SrO,
up to 7.2% $B_2O_3$,
up to 7.2% $P_2O_5$,
up to 1.5% halide selected from the group consisting of F, Br, I and combinations thereof,
0.2–6% Cl, and
58.5–73.2% $SiO_2$, said IIES layer having been exposed to high energy beams in a predetermined pattern to reduce at least a portion of the silver ions of said IIES layer to elemental silver to produce the recorded image, said IIES layer comprising,
silver ions,
elemental silver, and
water in a concentration greater than about 0.01% by weight $H_2O$.

99. A method of erasing a recorded image readable with actinic radiation in a high energy beam-sensitive article, said article comprising an integral ion-exchanged surface layer (IIES layer) bearing the recorded image, said method comprising the step of heating the recorded image in the IIES layer to a temperature in excess of 100 degree C., but less than the softening point temperature of the IIES layer to erase the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, about 5–25% of one or more alkali metal oxides,
at least 1.5%, but less than 35%, of photosensitivity inhibitors (PI agents) selected from the group consisting of $TiO_2$, $Nb_2O_5$, $Y_2O_3$, $Ta_2O_5$, and combinations thereof, the composition containing at least an effective amount of the photosensitivity inhibitors to render the IIES layer insensitive to at least a spectral portion of the actinic radiation,
0–about 15% MgO,
0–about 15% CaO,
0–about 15% SrO,
0–about 20% ZnO,
0–about 15% $Al_2O_3$,
0–about 15% PbO,
0–about 15% BaO,
0–about 15% $B_2O_3$,
about 2–35% of at least one acid-durability-and-glass-network-strengtheners (ADAGNS) selected from the group consisting of MgO, ZnO, $Al_2O_3$, PbO and CaO,
0–about 3% F, Br and I,
0–about 6% Cl, and
about 50–89% $SiO_2$, said IIES layer having been exposed to high energy beams in a predetermined pattern to reduce at least a portion of the silver ions of said IIES layer to elemental silver to produce the recorded image, said IIES layer comprising,
silver ions,
elemental silver, and
water in a concentration greater than about 0.01% by weight $H_2O$.

100. A method of erasing a recorded image readable with actinic radiation in a high energy beam-sensitive article, said article comprising an integral ion-exchanged surface layer (IIES layer) bearing the recorded image, said method comprising the step of heating the recorded image in the IIES layer to a temperature in excess of 100 degree C., but less than the softening point temperature of the IIES layer to erase the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, about 5–25% of one or more alkali metal oxides,
about 0.5–35% total of at least one photosensitivity inhibitor (PI agent) and RS-suppression agent (RSS agent) selected from oxides of transition metals having 1 to 4 d-electrons in the atomic state,
0–about 15% MgO,
0–about 15% CaO,
0–about 15% SrO,
about 2–20% ZnO.
0–about 15% $Al_2O_3$,
0–about 15% PbO, provided that the amount of acid-durability-and-glass-network-strengthener (ADAGNS) selected from the group consisting of MgO, ZnO, $Al_2O_3$, PbO and CaO is from about 2% to 35%,
0–about 15% $B_2O_3$,
0–about 3% F, Br and I,
0–about 6% Cl, and
about 50–89% $SiO_2$, said IIES layer having been exposed to high energy beams in a predetermined pattern to reduce at least a portion of the silver ions of said IIES layer to elemental silver to produce the recorded image, said IIES layer comprising,
silver ions,
elemental silver, and
water in a concentration greater than about 0.01% by weight $H_2O$.

101. A method of erasing a recorded image readable with actinic radiation in a high energy beam-sensitive article, said article comprising an integral ion-exchanged surface layer (IIES layer) bearing the recorded image, said method comprising the step of heating the recorded image in the IIES layer to a temperature in excess of 100 degree C., but less than the softening point temperature of the IIES layer to erase the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, 3-25% of one or more alkali metal oxides,
0.5-35% total of photosensitivity inhibitors (PI agents) and RS-suppression agents, provided an effective amount of PI agents is included to render the IIES layer insensitive to at least a spectral portion of actinic radiation, including at least 0.5% $TiO_2$,
up to 35% of acid-durability-and-glass-network strengtheners (ADAGNS),
up to 20% BaO,
up to 25% $P_2O_5$,
up to 25% $B_2O_3$,
up to 4% F,
up to 6% Cl,
up to 2% Br,
up to 2% I, and
20-93% $SiO_2$, the sum amount of the above components constituting at least 75 mole percent of the glass composition, said IIES layer having been exposed to high energy beams in a predetermined pattern to reduce at least a portion of the silver ions of said IIES layer to elemental silver to produce the recorded image, said IIES layer comprising, silver ions,
elemental silver, and
water in a concentration greater than about 0.01% by weight $H_2O$.

102. A method of erasing a recorded image readable with actinic radiation in a high energy beam-sensitive article, said article comprising an integral ion-exchanged surface layer (IIES layer) bearing the recorded image, said method comprising the step of heating the recorded image in the IIES layer to a temperature in excess of 100 degree C., but less than the softening point temperature of the IIES layer to erase the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, 5-25% total of $Li_2O$, $Na_2O$ and $K_2O$,
1.2-35% total of photosensitivity inhibitors (PI agents) and RS-suppression agents selected from the group consisting of $TiO_2$, $Ta_2O_5$, $ZrO_2$, $Nb_2O_5$, $La_2O_3$, $Y_2O_3$, and $WO_3$, provided an effective amount of PI agents is included to render the IIES layer insensitive to at least a spectral portion of actinic radiation, including 1.2% to 25% $TiO_2$,
2-20% ZnO,
up to 10% $Al_2O_3$,
up to 20% MgO,
up to 20% CaO,
up to 20% PbO, provided that the amount of acid-durability-and-glass-network strengtheners (ADAGNS) selected from the group consisting of MgO, ZnO, $Al_2O_3$, PbO and CaO, is from 2 to 35%
up to 15% $B_2O_3$,
up to 3% total of F, Br, and I,
up to 6% Cl, and
50-89% $SiO_2$, said IIES layer having been exposed to high energy beams in a predetermined pattern to reduce at least a portion of the silver ions of said IIES layer to elemental silver to produce the recorded image, said IIES layer comprising, silver ions,
elemental silver, and
water in a concentration greater than about 0.01% by weight $H_2O$.

103. A method of imparting the surface of a high energy beam-sensitive article, bearing a recorded image of a latent image, with a surface relief pattern corresponding to the recorded image, said article bearing the recorded image comprising an integral ion-exchanged surface layer (IIES layer) bearing the recorded image, said IIES layer composed of a glass layer of a glass composition that has been ion exchanged with an acidic aqueous solution containing soluble ionic silver to diffuse silver ions into said IIES layer to render said IIES layer sensitive to high energy beams, said glass composition consisting essentially of, in mole percent on the oxide basis, about 5-25% of one or more alkali metal oxides,
about 0.5-35% total of at least one photosensitivity inhibitor (PI agent) and RS-suppression agent RSS agent) selected from oxides of transition metals having 1 to 4 d-electrons in the atomic state,
0-about 15% MgO,
0-about 15% CaO,
0-about 15% SrO,
about 2-20% ZnO,
0-about 15% $Al_2O_3$,
0-about 15% PbO, provided that the amount of acid-durability-and-glass-network-strengthener (ADAGNS) selected from the group consisting of MgO, ZnO, $Al_2O_3$, PbO and CaO is from about 2% to 35%,
0-about 15% $B_2O_3$,
0-about 3% F, Br and I,
0-about 6% Cl, and
about 50-89% $SiO_2$, said IIES layer having been exposed to high energy beams in a predetermined pattern to reduce at least a portion of the silver ions of said IIES layer to elemental silver to produce the recorded image, said IIES layer comprising, silver ion,
elemental silver, and
water in a concentration of between about 0.01 and 12 weight percent $H_2O$, the method comprising etching the surface of the IIES layer bearing the recorded image of the glass article by wet chemical etching or plasma etching.

104. An article bearing a recorded image readable in actinic radiation comprising a high energy beam-sensitive glass, said glass composed of a glass composition consisting essentially of, in mole percent on the anhydrous glass basis, 3-25% of one or more alkali metal oxides,
at least 1.5% $TiO_2$, but not exceeding 35% $TiO_2$, the composition containing at least an effective amount of $TiO_2$ to render the glass insensitive to actinic radiation,
up to 20% MgO,
up to 20% CaO,
up to 20% ZnO,
up to 15% $Al_2O_3$, up to 20% PbO,
up to 20% BaO,
up to 25% B$_2$O$_4$,
up to 25% P$_2$O$_5$,
2–35% of at least one acid-durability-and-glass-network-strengthener (ADAGNS) selected from the group consisting of MgO, ZnO, Al$_2$O$_3$, PbO and CaO,
up to 4% F,
up to 2% Br,
up to 2% I,
up to 6% Cl,
0.1–25% Ag$_2$O,
50–89% SiO$_2$, and
water in a concentration of between about 0.01 and 12 weight percent H$_2$O,
said glass having been exposed to high energy beams in a predetermined pattern to reduce at least a portion of silver ions in said glass to elemental silver to produce the recorded image.

105. An article bearing a recorded image readable in actinic radiation comprising a high energy beam-sensitive glass, said glass composed of a glass composition consisting essentially of, in mole percent on the anhydrous glass basis,
3–25% of one or more alkali metal oxides,
3% to 10% TiO$_2$, the glass composition containing a sufficient amount of TiO$_2$ to render said glass insensitive to at least a spectral portion of the actinic radiation,
4–10% ZnO,
0.5–5% Al$_2$O$_3$,
0.8–6% Cl,
0.1–25% Ag$_2$O,
68–75% SiO$_2$, and
water in an amount of between about 0.01% and 12% by weight H$_2$O,
said glass having been exposed to high energy beams in a predetermined pattern to reduce at least a portion of silver ions in said glass to elemental silver to produce the recorded image.

106. An article bearing a recorded image readable in actinic radiation comprising a high energy beam-sensitive glass, said glass composed of a glass composition consisting essentially of, in mole percent on the anhydrous glass basis,
3–25% of one or more alkali metal oxides,
0.5–8.4% total of photosensitivity inhibitors (PI agents) and RS-suppression agents (RSS agents), the composition containing at least an effective amount of PI agents to render said glass insensitive to at least a spectral portion of the actinic radiation, including 0.5 to 7.4% TiO$_2$,
3.6–7.6% ZnO,
0.6–2.4% Al$_2$O$_3$,
up to 10.8% MgO,
up to 4% CaO,
up to 4% BaO,
up to 3.5% PbO,
up to 4% SrO,
up to 7.2% B$_2$O$_3$,
up to 7.2% P$_2$O$_5$,
up to 1.5% halide selected from the group consisting of F, Br, I and combinations thereof,
0–3.8% Cl,
0.1–25% Ag$_2$O,
58.5–73.2% SiO$_2$, and
water in an amount of between about 0.01% and 12% by weight H$_2$O,
said glass having been exposed to high energy beams in a predetermined pattern to reduce at least a portion of silver ions in said glass to elemental silver to produce the recorded image.

107. An article bearing a recorded image readable in actinic radiation comprising a high energy beam-sensitive glass, said glass composed of a glass composition consisting essentially of, in mole percent on the anhydrous glass basis,
5–25% of one or more alkali metal oxides,
0.5–35% total of at least one photosensitivity inhibitor (PI agent) and RS-suppression agent (RSS agent), selected from oxides of transition metals having 1 to 4 d-electrons in the atomic state,
up to 20% MgO,
up to 20% CaO,
2–20% ZnO,
up to 15% Al$_2$O$_3$,
up to 20% PbO, provided that the amount of acid-durability-and-glass-network-strengthener (ADAGNS) selected from the group consisting of MgO, ZnO, Al$_2$O$_3$, PbO and CaO is from 2% to 35%,
up to 20% BaO,
up to 25% B$_2$O$_3$,
up to 25% P$_2$O$_5$,
up to 4% F,
up to 2% Br,
up to 2% I,
up to 6% Cl,
0.1–25% Ag$_2$O,
50–89% SiO$_2$, and
water in a concentration of between about 0.01% and 12% by weight H$_2$O,
said glass having been exposed to high energy beams in a predetermined pattern to reduce at least a portion of silver ions in said glass to elemental silver to produce the recorded image.

108. An article bearihg a recorded image readable in actinic radiation comprising a high energy beam-sensitive glass, said glass composed of a glass composition consisting essentially of, in mole percent on the anhydrous glass basis,
3–25% of one or more alkali metal oxides,
0.5–35% total of photosensitivity inhibitors (PI agents) and RS-suppression agents, provided an effective amount of PI agents is included to render said glass insensitive to at least a spectral portion of actinic radiation, including at least 0.5% TiO$_2$,
up to 35% of acid-durability-and-glass-network strengtheners (ADAGNS),
up to 20% BaO,
up to 25% P$_2$O$_5$,
up to 25% B$_2$O$_3$,
up to 4% F,
up to 6% Cl,
up to 2% Br,
up to 2% I,
0.1–25% Ag$_2$O
20–93% SiO$_2$, and
water in a concentration of betweeen about 0.01 and 12 weight percent H$_2$O,
the sum amount of the above components consisting at least 75 mole percent of the glass composition, said glass having been exposed to high energy beams in a predetermined pattern to reduce at least a portion of silver ions in said glass to elemental silver to produce the recorded image.

109. A high energy beam-sensitive article comprising a body portion and a film of high energy beam-sensitive glass, said glass affixed to and supported by said body portion, said glass composed of a glass composition comprising of, in mole percent,
3-25% of one or more alkali metal oxides,
3% to 10% $TiO_2$, the glass composition containing a sufficient amount of $TiO_2$ to render said glass insensitive to at least a spectral portion of the actinic radiation,
4-10% ZnO,
0.5-5% $Al_2O_3$,
0.8-6% Cl,
0.1-25% $Ag_2O$,
68-75% $SiO_2$, and
water in an amount of between about 0.01 and 12 weight percent $H_2O$.

110. A high energy beam-sensitive article comprising a body portion and a film of high energy beam-sensitive glass, said glass affixed to and supported by said body portion, said glass composed of a glass composition comprising of, in mole percent,
3-25% of one or more alkali metal oxides
0.5-8.4% total of photosensitivity inhibitors (PI agents) and RS-suppression agents (RSS agents), the composition containing at least an effective amount of PI agents to render said glass insensitive to at least a spectral portion of the actinic radiation, including 0.5 to 7.4% $TiO_2$,
3.6-7.6% ZnO,
0.6-2.4% $Al_2O_3$,
up to 10.8% MgO,
up to 4% CaO,
up to 4% BaO,
up to 3.5% PbO,
up to 4% SrO,
up to 7.2% $B_2O_3$,
up to 7.2% $P_2O_5$,
up to 1.5% halide selected from the group consisting of F, Br, I and combinations thereof,
0-3.8% Cl,
0.1-25% $Ag_2O$,
58.5-73.2% $SiO_2$, and
water in an amount of between about 0.01 and 12 weight percent $H_2O$.

111. A high energy beam-sensitive article comprising a body portion and a film of high energy beam-sensitive glass, said glass affixed to and supported by said body portion, said glass composed of a glass composition comprising of, in mole percent,
3-25% of one or more alkali metal oxides,
0.5-35% total of photosensitivity inhibitors (PI agents) and RS-suppression agents, provided an effective amount of PI agents is included to render said glass insensitive to at least a spectral portion of actinic radiation, including at least 0.5% $TiO_2$,
up to 35% of acid-durability-and-glass-network strengtheners (ADAGNS),
up to 20% BaO,
up to 25% $P_2O_5$,
up to 25% $B_2O_3$,
up to 4% F,
up to 6% Cl,
up to 2% Br,
up to 2% I,
0.1-25% $Ag_2O$
20-93% $SiO_2$, and
water in an amount of between about 0.01 and 12 weight percent $H_2O$,
the sum amount of the above components constituting at least 75 mole percent of the glass composition.

112. A high energy beam-sensitive article comprising a body portion and a film of high energy beam-sensitive glass, said glass affixed to and supported by said body portion, said glass composed of a glass composition comprising of, in mole percent,
5-25% of $Li_2O$, $Na_2O$ and $K_2O$,
1.2-35% total of photosensitivity inhibitors (PI agents) and RS-suppression agents selected from the group consisting of $TiO_2$, $Ta_2O_5$, $ZrO_2$, $Nb_2O_5$, $La_2O_3$, $Y_2O_3$ and $WO_3$, provided an effective amount of PI agents is included to render the glass insensitive to at least a spectral portion of actinic radiation, including 1.2% to 25% $TiO_2$,
2-20% ZnO,
up to 10% $Al_2O_3$,
up to 20% MgO,
up to 20% CaO,
up to 20% PbO, provided that the amount of acid-durability-and-glass-network strengtheners (ADAGNS) selected from the group consisting of MgO, ZnO, $Al_2O_3$, PbO and CaO, is from 2 to 35%,
up to 20% BaO
up to 25% $B_2O_3$,
up to 25% $P_2O_5$,
up to 3% total of F, Br, and I,
up to 6% Cl,
0.1-25% $Ag_2O$,
50-89% $SiO_2$, and
water in a concentration greater than about 0.01% by weight $H_2O$.

113. The high energy beam-sensitive article of claim 112 wherein the glass composition contains in mole percent about 0.2-6% Cl.

114. The high energy beam-sensitive article of claim 112 wherein the glass composition contains in mole percent about 0.4-3% Cl.

115. The high energy beam-sensitive article of claim 112 wherein the glass composition contains in mole percent about 3-10% $TiO_2$, and 0-about 10% transition metal oxides selected from the group consisting of $Ta_2O_5$, $ZrO_2$, $Nb_2O_5$, $La_2O_3$, $Y_2O_3$, $WO_3$ and mixtures thereof.

116. The high energy beam-sensitive article of claim 112 wherein the glass composition contains in mole percent 0-15% $B_2O_3$.

117. The high energy beam-sensitive article of claim 112 wherein the glass composition contains in mole percent 0-7.2% $B_2O_3$.

118. The high energy beam-sensitive article of claim 112 wherein the concentration of water in said glass is between about 0.1-6% by weight $H_2O$.

119. The high energy beam sensitive article of claim 112 wherein the glass composition contains in mole percent 0.6-2.4% $Al_2O_3$.

120. The high energy beam-sensitive article of claim 112 wherein the glass composition contains in mole percent about 4-10% ZnO.

121. The high energy beam-sensitive article of claim 112 wherein the thickness of said film is less than about 10 micrometers.

122. A high energy beam-sensitive article comprising a body portion and a film of high energy beam-sensitive glass, said glass affixed to and supported by said body portion, said glass composed of a glass composition comprising of, in mole percent,
- 0–about 25% of one or more alkali metal oxides,
- about 0.5–35% of photosensitivity inhibitors (PI agents) and RS-suppression agents (RSS agents) selected from oxides of transition metals having 1 to 4 d-electrons in the atomic state,
- 0–about 6% Cl,
- about 0.1–25% $Ag_2O$,
- about 50–89% $SiO_2$, and
- silanol and/or water in a concentration of between about 0.01 and 12 weight percent $H_2O$.

123. The article of claim 122 wherein the glass composition includes in mole percent,
- 0–about 20% MgO,
- 0–about 20% CaO,
- 0–about 20% ZnO,
- 0–about 15% $Al_2O_3$,
- 0–about 20% SrO,
- 0–about 20% PbO,
- 0–about 20% BaO,
- 0–about 25% $P_2O_5$,
- 0–about 35% $B_2O_3$, and
- 0–about 3% halide selected from the group consisting of F, Br, I and mixtures thereof, provided that the total mole percent of ZnO, $Al_2O_3$, CaO, MgO and/or PbO is from 2 to about 35%.

124. The article of claim 123 wherein the alkali metal oxides are $Li_2O$, $Na_2O$ and $K_2O$, and the PI agents and RSS agents are selected from the group consisting of $TiO_2$, $Ta_2O_5$, $ZrO_2$, $Nb_2O_5$, $La_2O_3$, $Y_2O_3$, $WO_3$ or mixtures therof.

125. The article of claim 124 wherein the glass composition comprises in mole percent,
- 0–about 15% alkali metal oxides,
- about 1.2–25% $TiO_2$,
- about 2–20% ZnO,
- 0–about 10% $Al_2O_3$, and
- about 0.2–6% Cl.

126. The article of claim 125 wherein the glass composition comprises in mole percent,
- about 3–10% $TiO_2$, and
- about 60–80 % $SiO_2$.

* * * * *